(12) United States Patent
Maruyama et al.

(10) Patent No.: US 8,833,511 B2
(45) Date of Patent: Sep. 16, 2014

(54) INSULATOR FOR AUDIO AND METHOD FOR EVALUATING SAME

(75) Inventors: Teruo Maruyama, Hirakata (JP); Kozo Okamoto, Kawanishi (JP); Satoki Yamaguchi, Osaka (JP); Akio Tajima, Osaka (JP)

(73) Assignee: Tokkyokiki Corporation, Amagasaki-shi (JP)

( * ) Notice: Subject to any disclaimer, the term of this patent is extended or adjusted under 35 U.S.C. 154(b) by 0 days.

(21) Appl. No.: 13/813,151

(22) PCT Filed: Jul. 29, 2011

(86) PCT No.: PCT/JP2011/067444
§ 371 (c)(1),
(2), (4) Date: Jan. 29, 2013

(87) PCT Pub. No.: WO2012/015032
PCT Pub. Date: Feb. 2, 2012

(65) Prior Publication Data
US 2013/0206499 A1    Aug. 15, 2013

(30) Foreign Application Priority Data

Jul. 30, 2010  (JP) ................................. 2010-172115
Dec. 10, 2010  (JP) ................................. 2010-276420
Jan. 26, 2011  (JP) ................................. 2011-014224
Apr. 25, 2011  (JP) ................................. 2011-097606

(51) Int. Cl.
*F16F 15/06* (2006.01)
*F16F 15/00* (2006.01)

(52) U.S. Cl.
USPC ........... 181/207; 181/209; 267/290; 248/638; 248/616

(58) Field of Classification Search
USPC ............... 181/207, 209; 267/180, 166.1, 290; 248/188.8, 638, 615, 616
See application file for complete search history.

(56) References Cited

U.S. PATENT DOCUMENTS 2,270,335 A * 1/1942 Parkinson et al. ......... 267/140.2
2,597,800 A * 5/1952 Hussman ....................... 248/565
(Continued)

FOREIGN PATENT DOCUMENTS

JP    59070946 U    4/1984
JP    61012426  *   1/1986
(Continued)

OTHER PUBLICATIONS

ISA Japan, International Search Report of PCT/JP2011/067444, Nov. 1, 2011, WIPO, 3 pages.

*Primary Examiner* — Edgardo San Martin
(74) *Attorney, Agent, or Firm* — Alleman Hall McCoy Russell & Tuttle LLP

(57) ABSTRACT

In a conventional hard material insulator, reproduced sound can be tuned with use of characteristics of the material; however, various types of acoustic materials have specific high frequency characteristics, and thus their acoustic effects lack versatility, require compatible audio devices, and change with environment, musical genre, etc. To address this, a wind-bell member (resonant member) is arranged in parallel with a main propagation path of vibration transferred from an audio device to an insulator. Accordingly, a vibration system of a wind-bell having a tone determined by many factors such as a fundamental tone, harmonic tones, lingering sound, and fluctuation assists (enhances) high frequency vibration propagated from the audio device. As a result, due to the above assist action that is different in principle from a conventional type, acoustic characteristics such as a sense of localization, resolution, and a sense of transparency and scale a sound image can be dramatically improved.

19 Claims, 51 Drawing Sheets

(56) References Cited

U.S. PATENT DOCUMENTS

| | | | | |
|---|---|---|---|---|
| 3,814,357 | A | * | 6/1974 | Rontgen ............... 248/573 |
| 4,362,287 | A | * | 12/1982 | Grongstad ............. 248/563 |
| 4,633,973 | A | * | 1/1987 | Kitano ................ 181/207 |
| 4,722,505 | A | * | 2/1988 | Kaiser ................ 248/561 |
| 4,880,077 | A | * | 11/1989 | Verse et al. .......... 181/207 |
| 4,922,478 | A | * | 5/1990 | Verhagen .............. 720/694 |
| 5,344,116 | A | * | 9/1994 | Winkler ............... 248/677 |
| 5,386,962 | A | * | 2/1995 | Adriance et al. ....... 248/624 |
| 5,425,531 | A | * | 6/1995 | Perrault .............. 267/180 |
| 5,771,990 | A | * | 6/1998 | Liang ................. 181/208 |
| 5,864,533 | A | * | 1/1999 | Yamada et al. ......... 720/693 |
| 5,956,314 | A | * | 9/1999 | Ishimatsu et al. ...... 720/693 |
| 6,402,219 | B1 | * | 6/2002 | Hopf et al. ........... 296/70 |
| 6,648,295 | B2 | * | 11/2003 | Herren et al. ......... 248/636 |
| 2003/0218957 | A1 | * | 11/2003 | Tanishima ............. 369/75.1 |
| 2006/0054379 | A1 | * | 3/2006 | Chang ................. 181/207 |

FOREIGN PATENT DOCUMENTS

| | | | | | |
|---|---|---|---|---|---|
| JP | 61021426 | Y2 | | 1/1986 | |
| JP | 1995038786 | U | | 7/1995 | |
| JP | 07248043 | A | | 9/1995 | |
| JP | 08054041 | A | | 2/1996 | |
| JP | 08210439 | A | * | 8/1996 | ............ F16F 15/067 |
| JP | 09078650 | A | * | 3/1997 | ................ E03C 1/20 |
| JP | 10246284 | A | | 9/1998 | |
| JP | 10304484 | A | | 11/1998 | |
| JP | 11101300 | A | | 4/1999 | |
| JP | 2001263415 | A | | 9/2001 | |
| JP | 2002031187 | A | | 1/2002 | |
| JP | 2002079178 | A | | 3/2002 | |
| JP | 2004308811 | A | | 11/2004 | |
| JP | 3107462 | U | | 2/2005 | |
| JP | 2005291424 | A | * | 10/2005 | ................ F16F 1/12 |
| JP | 2006200734 | A | * | 8/2006 | |
| JP | 3848987 | B1 | | 11/2006 | |
| JP | 2008019890 | A | * | 1/2008 | |

* cited by examiner

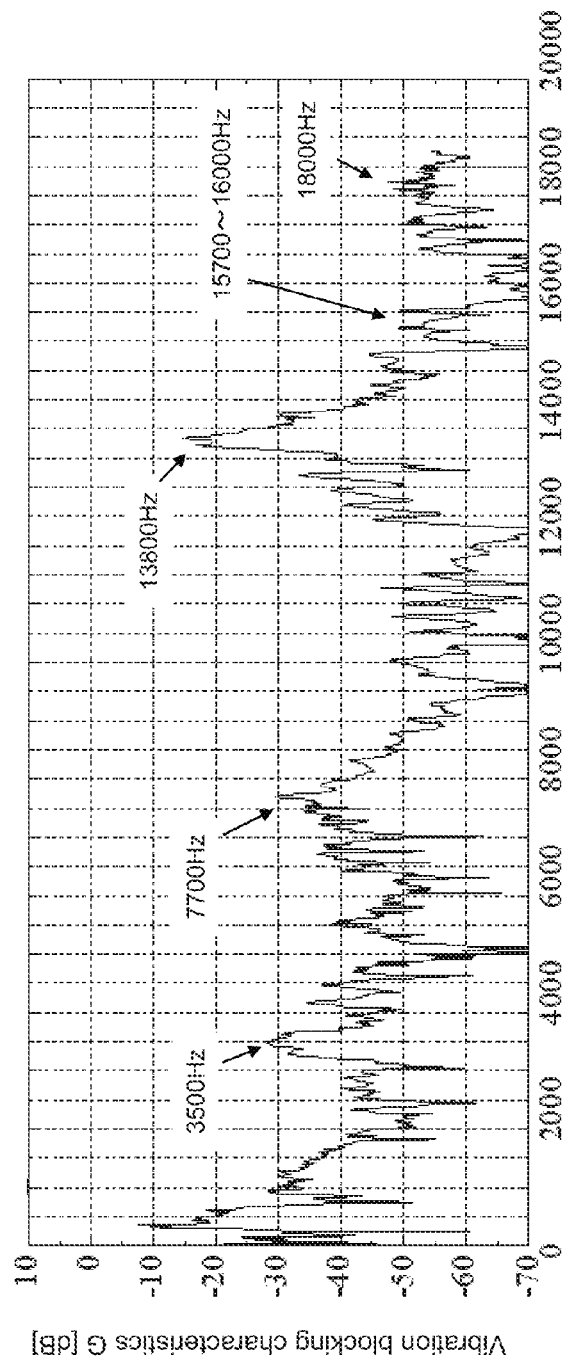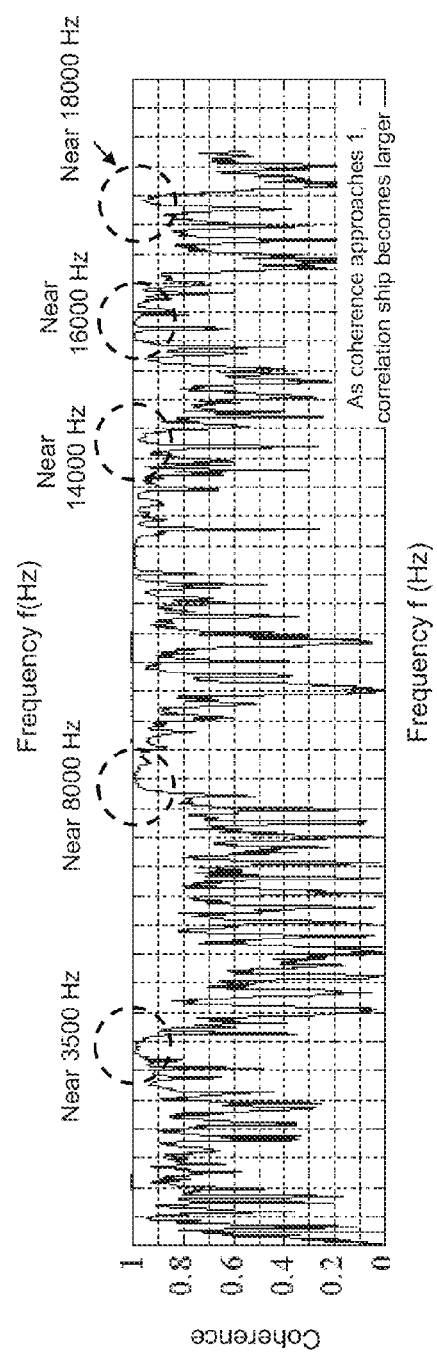
Fig.8a
Fig.8b

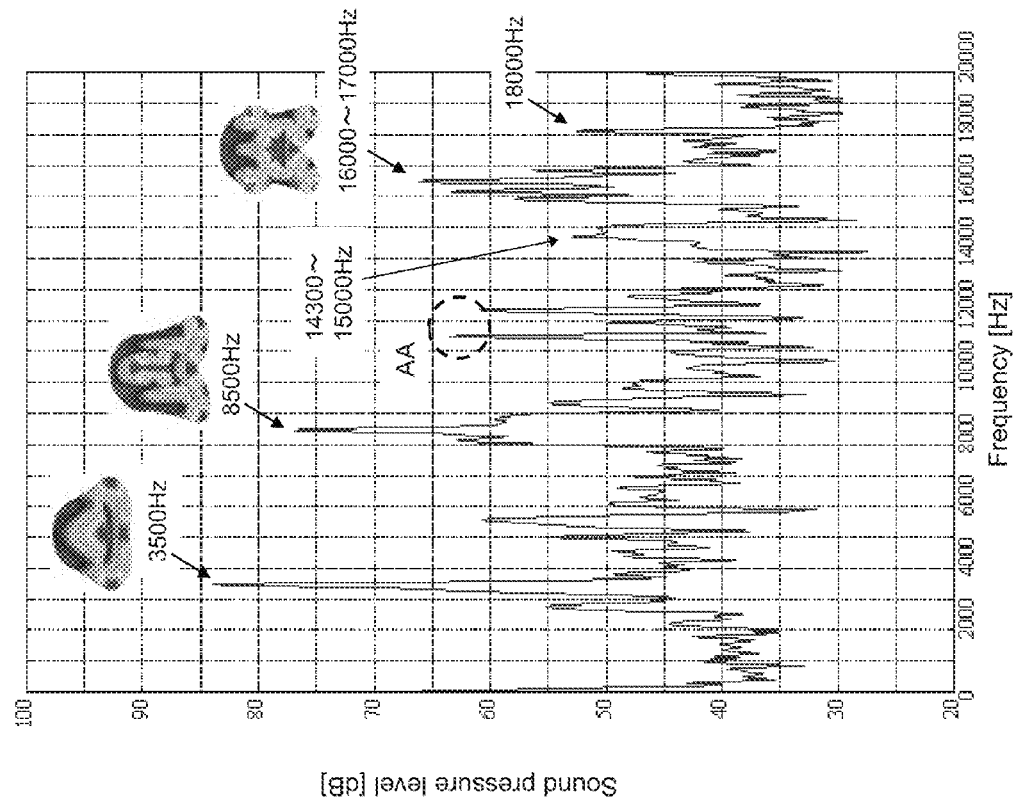

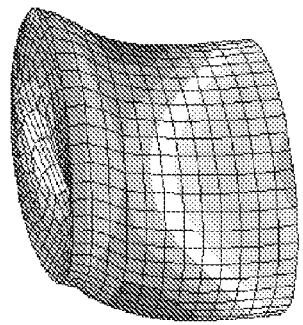
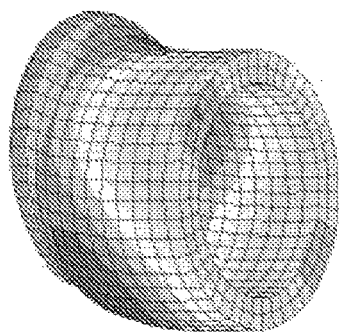
4870Hz
FIG. 17c
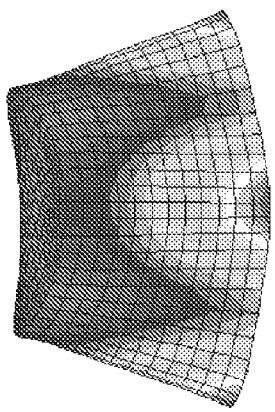
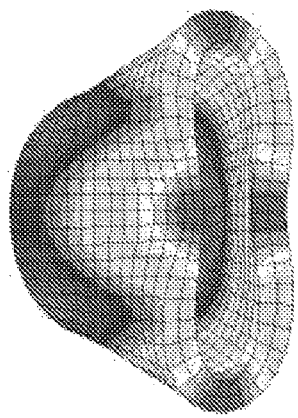
3880Hz
FIG. 17b
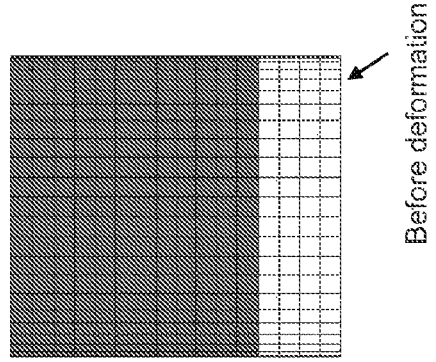
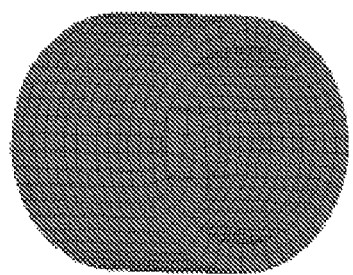
46.5Hz
FIG. 17a

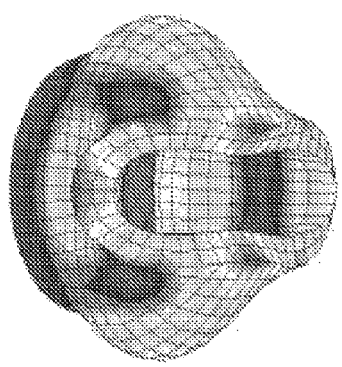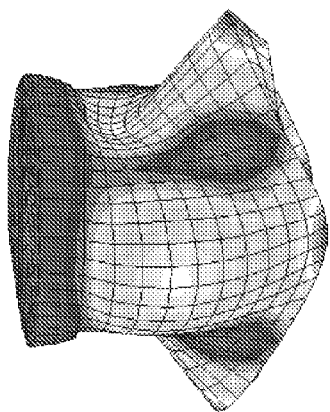
FIG. 18c 11000Hz
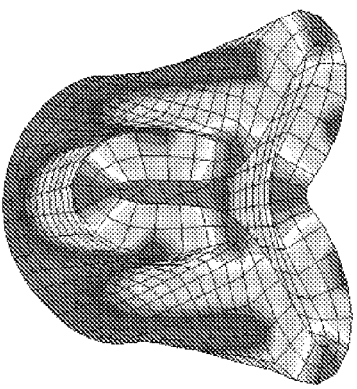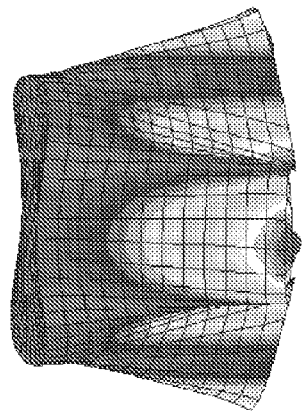
FIG. 18b 9700Hz
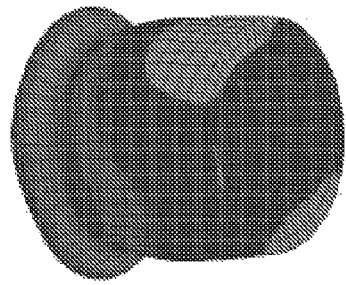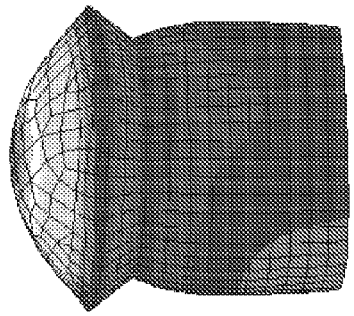
FIG. 18a 7490Hz

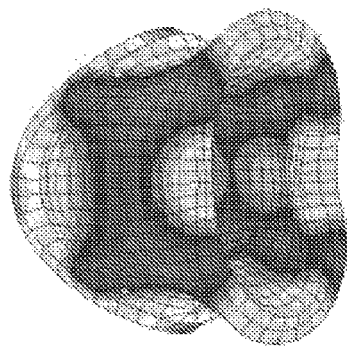
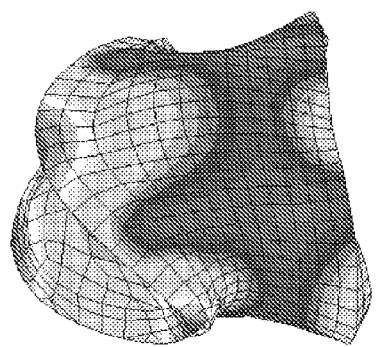
16200Hz
FIG. 19c
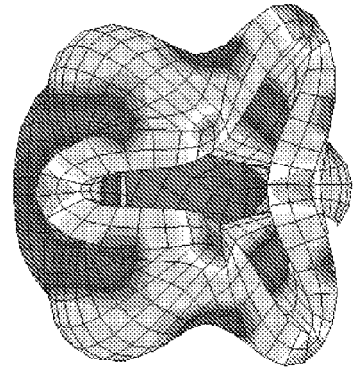
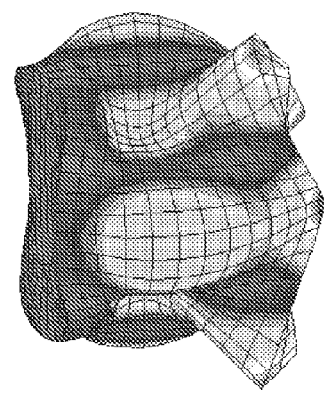
15100Hz
FIG. 19b
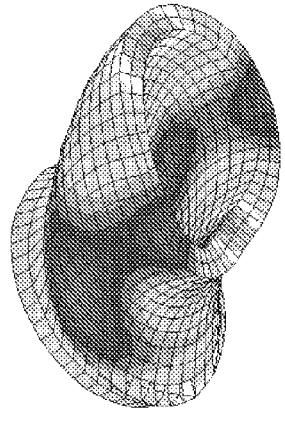
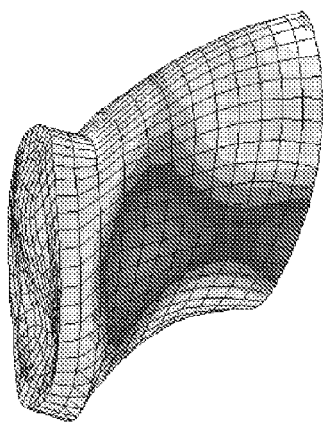
13400Hz
FIG. 19a

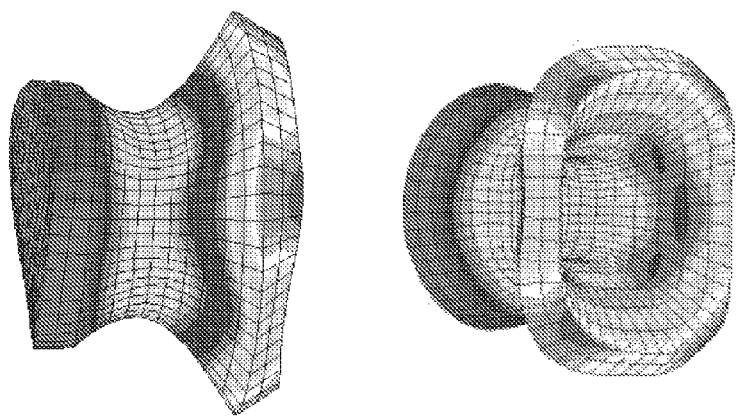
FIG. 20c 17100Hz
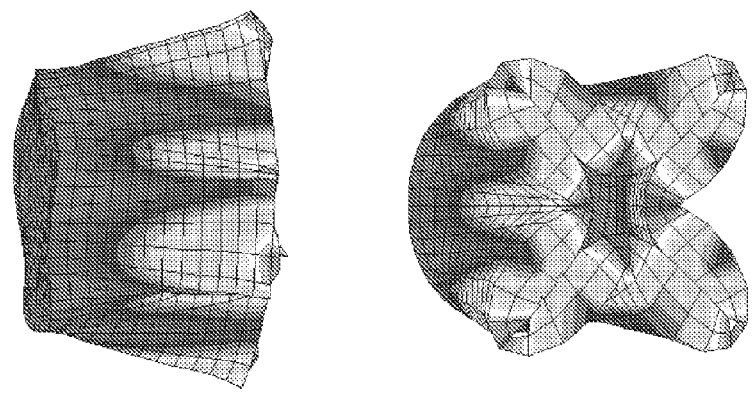
FIG. 20b 17100Hz
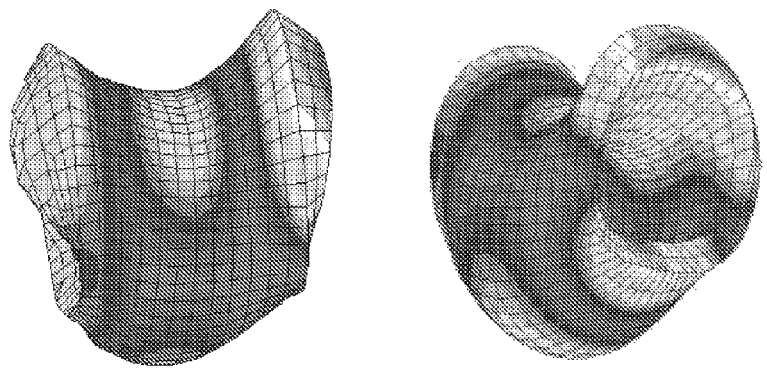
FIG. 20a 16900Hz

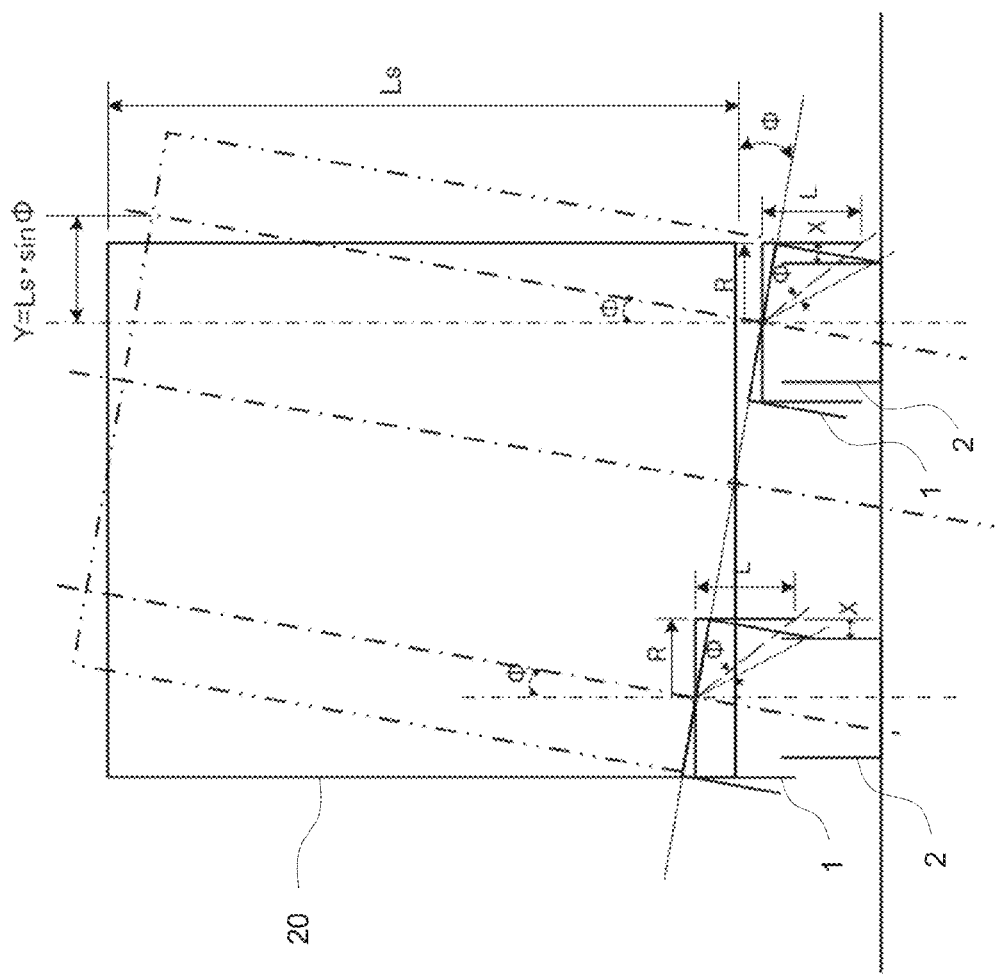

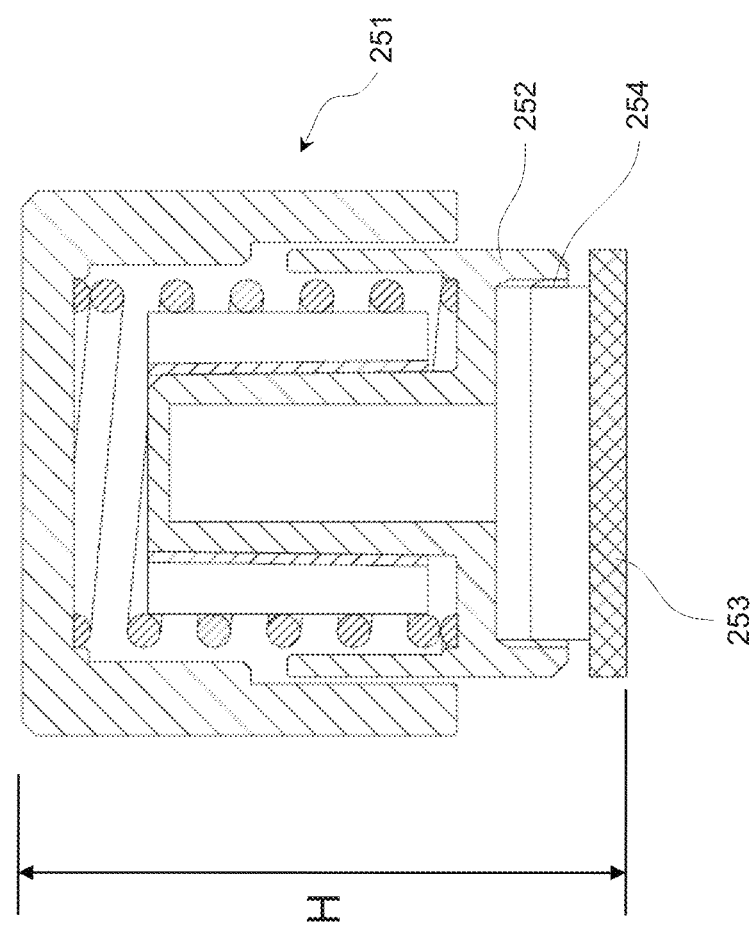

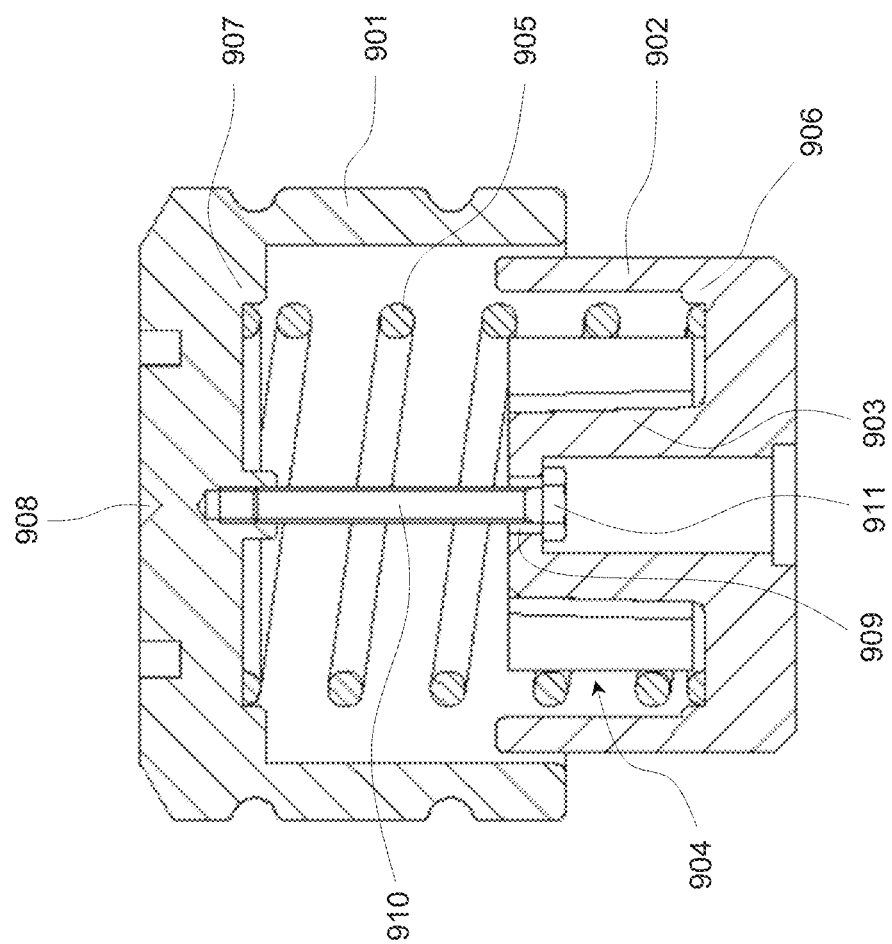

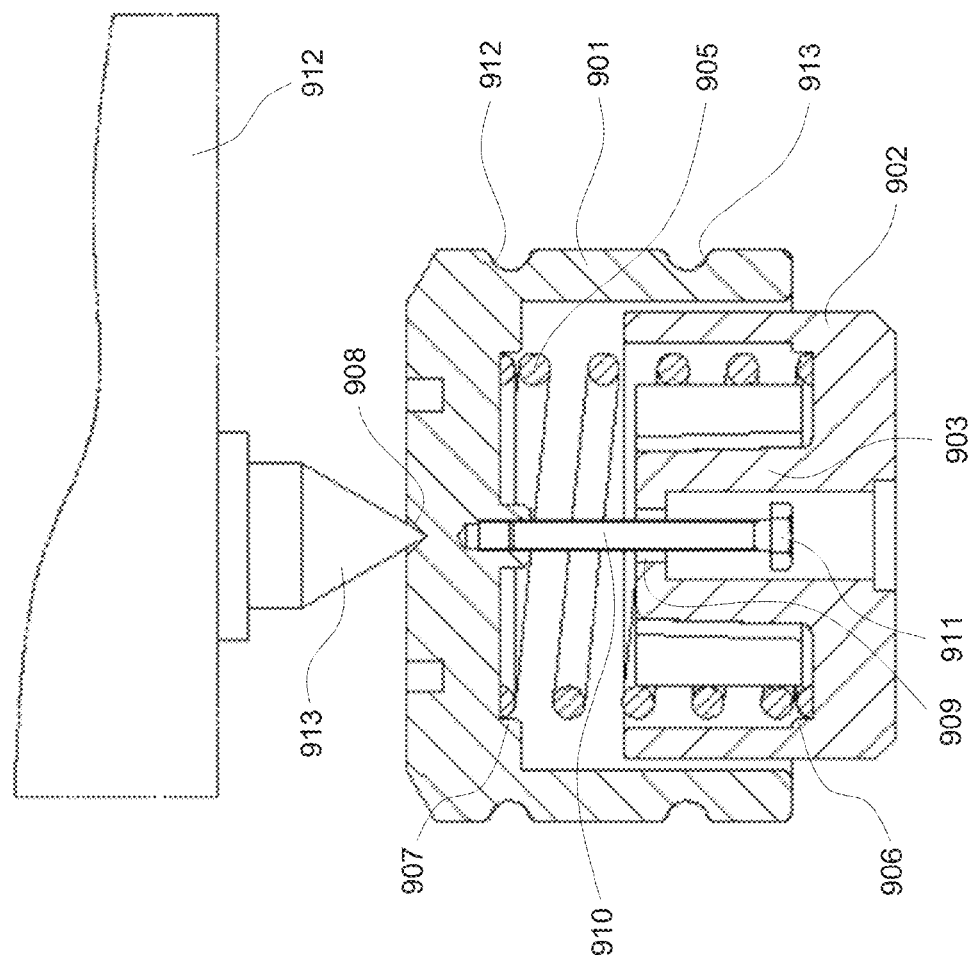

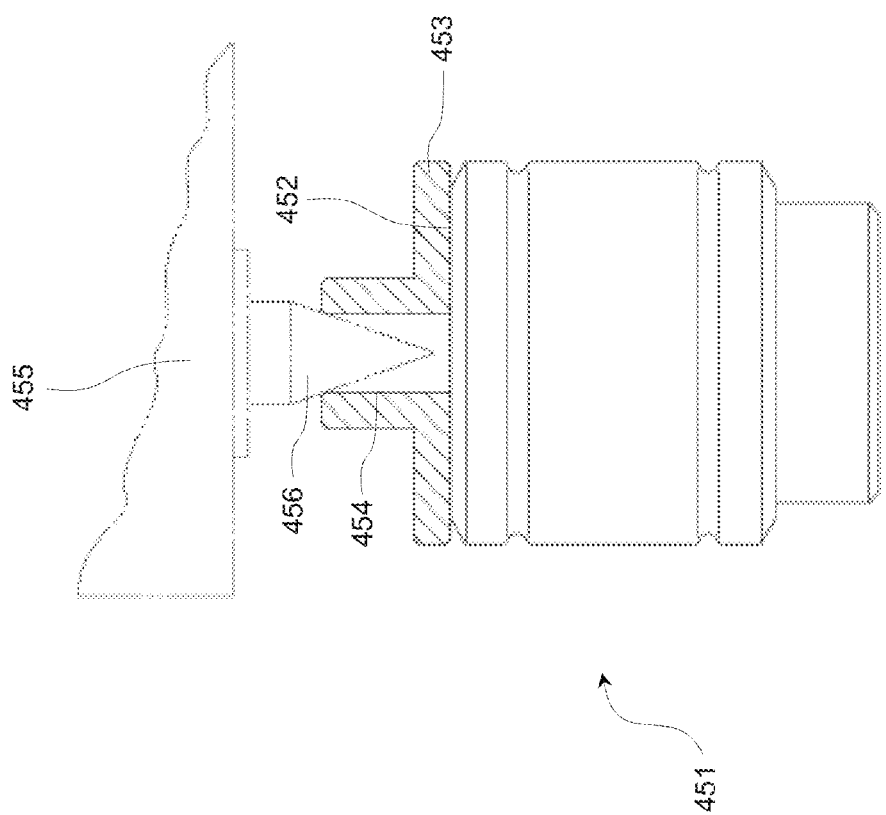

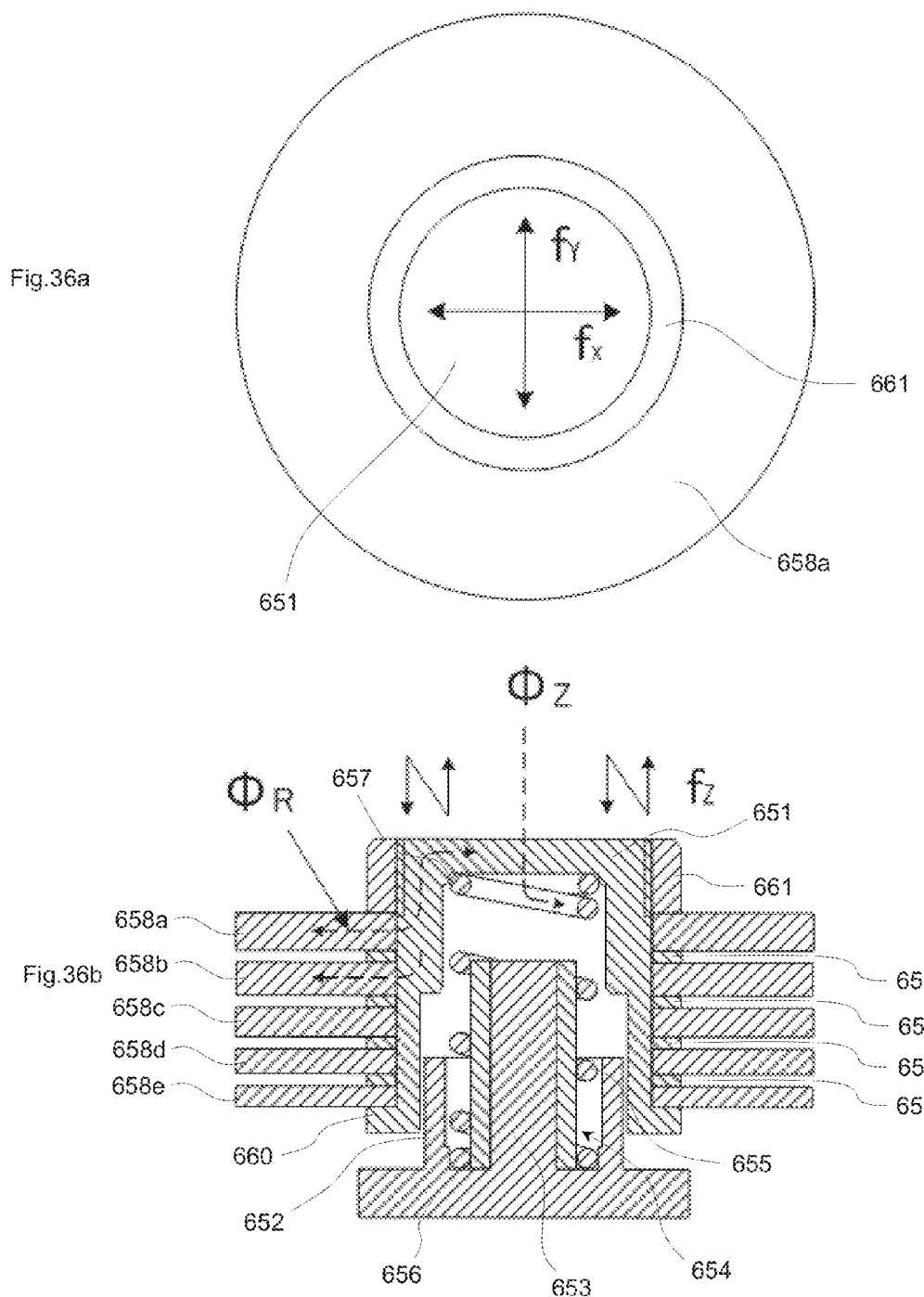

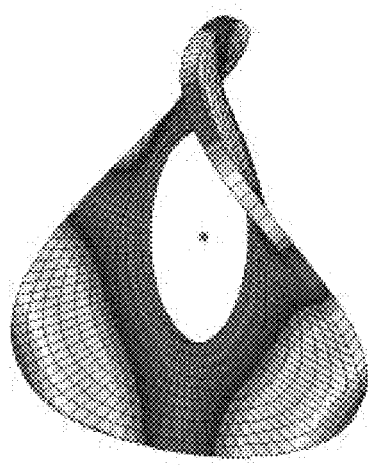
Fig.37c 4910Hz
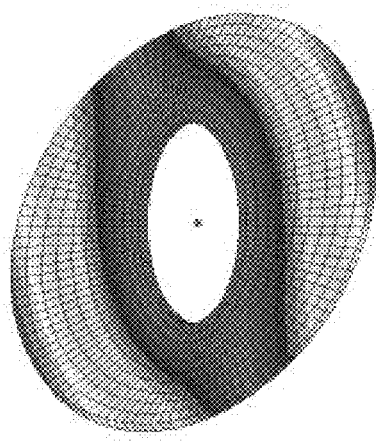
Fig.37b 4470Hz
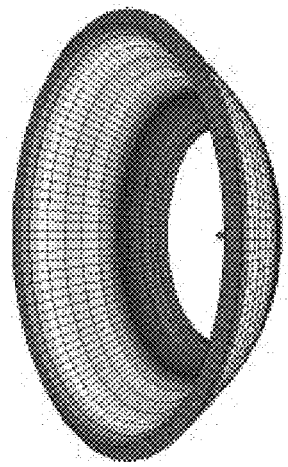
Fig.37a 4400Hz

12000Hz

8580Hz

6200Hz

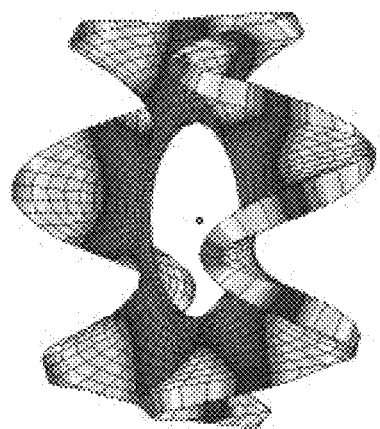
16200Hz Fig.39

INSULATOR FOR AUDIO AND METHOD FOR EVALUATING SAME

TECHNICAL FIELD

The present invention relates to an insulator used for a speaker, an amplifier, a CD player, an analog player, and the like as audio devices, and to a method for evaluating the insulator.

BACKGROUND ART

In the field of audio, sound as close to original sound as possible has been pursued in respective components such as an amplifier, a speaker, a CD player, and a cable as audio devices. Even though a transition from an analog era to a digital era has been made, and various innovative technologies have been applied, technologies used in the process of recording to reproduction still have a limitation, and the current situation is that original sound cannot be reproduced as faithfully as the human sense of hearing perceives. One of the factors that prevent an audio device from pursuing original sound (e.g., sound of live music by an orchestra) is an influence of vibration on the audio device. As is well known, an audio device generates vibration by itself, and is externally influenced by various vibrations. In the case of an amplifier, "beats" due to an AC elementary signal of a power transformer and its harmonic components occur. In the case of a CD player, a motor that rotates a disk serves as a vibration source. In the case of a speaker, reaction force of a voice coil that drives a cone vibrates a speaker enclosure main body. This vibration is propagated to a floor surface where the speaker is placed, and excites complex natural vibration modes of the whole of a room including the floor surface. The disturbance vibration superimposed on the original sound in a complex manner again vibrates the speaker main body. A hypothesis that cross modulation distortion (sub-harmonics) generated at the time of the revibration deteriorates sound quality of the audio device has been proposed; however, the point that vibration due to mutual interference between the audio device and the placement surface is an important factor reducing quality of reproduced sound is considered to be an accurate fact.

One of the means adapted to improve sound quality of an audio device is an insulator. In the analog era, in order to suppress howling, the insulator was mainly placed between an analog player and a floor surface, and indispensable as a means adapted to block vibration from transferring. After the transition from the analog player to the CD player, the insulator has been used not as a measure to prevent the howling but as a tuning means adapted to improve sound quality of an audio device or make an adjustment to obtain the listener's favorite sound. It is well known that by applying an insulator, sound quality is changed; however, it cannot be said that a mechanism that brings the effect of the change in sound quality is not sufficiently theoretically elucidated, and many of the insulators are developed in an empirical or trial-and-error manner. Materials that have been used as an insulator in the past include the following two types.

(1) Floating Type Insulator

This type of insulator is intended to block (shut out) vibration, and as the insulator, a buffer having small stiffness is used. As the buffer, there is one using a rubber material, one using a spring coil, an air floating board that seals air therein, one using repulsive force based on magnetic force, or the like.

(2) Insulator Using Hard Material

Another type of insulator is one using a hard material. In recent years, in place of the above-described buffer, one using a hard material intended to effectively absorb vibration generated by an audio device to release the vibration outside, such as wood, resin, metal, or ceramic, or a composite type in which such materials are formed into a multilayered structure has been devised and commercialized. The composite type is disclosed in JPA H10-246284 (Patent literature 3). The hard insulator is used as a reproduced sound tuning means using characteristics of a good quality acoustic material. For example, (i) Metal Materials Brass: Bright and brilliant sound Copper: Heavy and powerful Silver: Good passage of core, and quick attack/decay of sound Gold: Rich and fascinating (ii) Wood Materials African ebony: Hard but not stimulus sound (used for music instruments)

Macassar ebony: Softer than African ebony

Cherry: Soft and mellow

On the other hand, a cone-shaped spike is one that utilizes an effect of easily transferring vibration in a direction of "column→cone→apex of cone→floor surface" but not easily transferring it in a direction opposite to the above direction, and is frequently used for placement of a speaker. For example, a structure in which a plurality of spikes are arranged in series is disclosed in Japanese patent No. 3848987 (Patent literature 1).

A vibration-preventing support apparatus having double spike structure illustrated in FIG. 52 is configured to include: a spike support 980; a first spike 981; a second spike 982; and liquid 983 filled in the spike support 980. The first spike 981 is inserted down to a lower end of the spike support 980 such that a columnar part thereof comes into contact with an inner wall of a cylinder of the spike support 980. The second spike 982 is also inserted such that an apex of a conical part thereof is placed in a depression provided in the center of an upper surface of the first spike 981. The liquid 983 filled in a narrow gap between the spike support 980 and the first spike 981 has an effect of insulating vibration between the both members 981 and 980.

CITATION LIST

Patent Literature

Patent literature 1: Japanese patent No. 3848987
Patent literature 2: JPA 2006-200734
Patent literature 3: JPA H10-246284

SUMMARY OF INVENTION

Technical Problem

A summary of problems that the above-described two conventional types have as an insulator for audio is as follows.

(1) Problems in Floating Type Insulator

In the case of the above-described insulator made of rubber, an excessive damping action due to viscoelasticity of the rubber damps even high frequency components that animate sound, and therefore there is a disadvantage that a profile of the sound becomes unclear, and consequently a sense of opaqueness occurs in sound quality.

In the case of the spring type, natural vibration determined by spring stiffness and a mass of a mounted object, and a plurality of harmonic vibrations occur over a wide frequency range, and therefore how to avoid the influence of the vibrations on sound is a big issue.

In the cases of the air floating board and the insulator using repulsive force based on magnetic force, an audio device can float with being in completely non-contact with a floor surface. An effect of improving senses of transparency and stereophony, and resolution of sound based on the complete non-contact floating attracts attention. On the other hand, vibration transferred from the audio device to the floor surface is completely blocked by the insulator, and therefore it is difficult to tune sound quality according to a listener's taste, a genre of music, or the like as compared with the case of the hard material insulator, which gives rise to a disadvantage that sound becomes impersonal. Also, in the case of the complete non-contact floating type, there are pointed out disadvantages that depending on a speaker to be applied, powerfulness/a sense of localization in a low range is reduced, and low-pitched sound is not tightened but becomes an unnatural (boomy) sound like floating in space. Any reported case that makes theoretical investigation of such a phenomenon has not been found; however, the following is a result of a study by the present inventors. If a natural frequency determined by spring stiffness of an insulator and a mounted object (speaker) is too small, a main body of the speaker having a vibration excitation source (reaction force of a voice coil motor) vibrates back and forth. This vibration is considered to bring the boomy phenomenon.

(2) Problems in Hard Material Insulator

In the case of the hard material insulator, as described above, by selecting a good quality acoustic material, reproduction sound can be tuned with use of characteristics of the acoustic material. However, a relationship between a mechanism of vibration transfer in the hard material insulator and an acoustic effect has not been theoretically solved, and most of the hard material insulators have been developed by trial and error. An acoustic material to be applied has specific high frequency characteristics, and therefore there are disadvantages that the effect does not have diversity or versatility, depends on compatibility with an audio device, and changes when a placement environment of an audio device, a genre of music, or the like is changed. For this reason, the hard material insulator has a problem that it is difficult to meet permanent use by a listener.

Also, the hard material insulator cannot damp vibration having a low frequency (e.g., a few tens Hz or less). The same holds true for the case of the cone-shaped spike, and for the case where the cone-shaped spikes are combined in series in a multistage manner. Patent literature 1 discloses a method that fills the narrow gap between the cylindrical surface of the spike and the spike support containing the cylinder with silicone oil that is viscous fluid. However, a vibration damping action of the viscous fluid is proportional to a frequency, and therefore it is difficult to obtain a vibration damping effect at a low frequency.

A floor surface of a private house where a speaker is placed has a distributed vibration mode typically having an eigenvalue of 20 to 100 Hz. As described above, when vibration of a speaker is transferred to a floor surface, complex natural vibration modes of the whole of a room including the floor surface is excited. Deterioration in sound quality due to mutual interference between the floor surface vibration having a low frequency and the vibration of the speaker main body cannot be fundamentally avoided by the hard material insulator.

In many cases, a vibration absorbing body (e.g., Patent literature 2) that has conventionally been used for an antivibration device in the industrial field is only practically required to block vibration transfer in the range of a few Hz to approximately 500 Hz. As a material constituting the vibration absorbing body, vinyl chloride-based or polypropylene-based resin having weather resistance and shock resistance, thermoplastic elastomer, or the like is used. In the antivibration device in the industrial field, a concept of using high frequency vibration for sound tuning is absent, and for this reason, propagation characteristics of acoustic vibration in terms of structure and material is not taken into account at all.

Solution to Problem

The present invention is made in consideration of the above-described problems. That is, an audio device is regarded as a vibration generation source, and a wind-bell member is arranged in parallel with a main propagation path of vibration transferred toward an elastic member that supports the audio device. A vibration system of a wind-bell having a tone that is determined by many factors such as a fundamental tone, harmonic tones, lingering sound, and fluctuation assists (enhances) high frequency vibration propagated from the audio device. It has turned out that on the basis of the above assist action in a high frequency range, which is different in principle from a conventional type, an acoustic effect of dramatically improving a sense of localization, resolution, a sense of transparency, a sense of scale, and the like of a sound image is obtained. This effect found by the present study is referred to as a "wind-bell effect".

Specifically, an invention according to a first aspect of the present invention is one provided with: an elastic member that is held between an upper support member and a lower support member and supports a load of an audio device; and a resonant member that has a plurality of resonance points, wherein the resonant member is arranged in parallel with the elastic member such that, given that vibration propagated from the audio device toward the elastic member is main vibration, vibration of the resonant member is superimposed on the main vibration.

That is, in the present invention, given that the audio device is the vibration generation source, and a main propagation path of the main vibration transferred from the audio device toward the elastic member is $\Phi_Z$, the resonant member having a vibration propagation path $\Phi_R$ branching from $\Phi_Z$ is arranged in parallel with $\Phi_Z$. The vibration system $\Phi_R$ of the resonant member having many resonance points assists (enhances) the high frequency vibration propagated from the audio device. On the basis of the assist action in the high frequency range, which is different in principle from a conventional type, acoustic characteristics such as senses of localization, depth, density, and transparency, and resolution of a sound image are improved. Incidentally, sound produced by music instruments has harmonic tone components, and an effect of sound image localization, which enables a direction of a sound source to be specified in stereo reproduction, depends on characteristics in a high range. That is, in the present insulator, the assist action in the high range emphasizes harmonic tone components of reproduced sound of each music instrument, and thereby the acoustic characteristics are improved.

Specifically, a second aspect of the present invention is one, wherein the resonant member is configured to be a substantially tubular-shaped member of which one end is a fixed end and the other end is a free end.

That is, in the present invention, the resonant member is configured to be the substantially tubular-shaped member having a wind-bell shape. The vibration system $\Phi_R$ of a wind-bell having a tone that is determined by many factors such as a fundamental tone, harmonic tones (tones having frequencies equal to integral multiples of a frequency of the fundamental tone), lingering sound, and beats (fluctuation) assists (enhances) the high frequency vibration propagated from the audio device, and also the lingering sound and beats appearing when the vibration decays provides an extent and depth of acoustic space and mellow flavor to reproduced sound.

Specifically, a third aspect of the present invention is one configured such that the elastic member is a mechanical spring, air, or a magnetic body used for a floating type insulator.

That is, the present invention is characterized by "simultaneously having both" of the following (1) and (2):

(1) Complete Vibration Blocking Effect in Low Frequency Audible Range

On the basis of frequency characteristics of a secondary vibration system, which are determined by a mass of a mounted object and spring stiffness, an almost complete blocking action on low frequency vibration in an audible range can be obtained. The vibration blocking effect enables an influence (occurrence of cross modulation distortion) of vibration due to mutual interference between an audio device and a placement surface on reproduced sound to be avoided.

(2) High Frequency Vibrations Assist Effect Overcoming Conventional Hard Material Insulator The high frequency vibration assisted by the resonant member (wind-bell member) on the basis of the above effect (1) corresponds to only components of original sound generated by the audio device (speaker). In the case of the conventional hard material insulator, there is a problem that vibration due to a rebound from a floor surface, i.e., the cross modulation distortion (sub-harmonics) corresponding to vibration components not originally included in original sound is also assisted (enhanced). In the present invention, there is no vibration due to a rebound from a floor surface, and therefore the cross modulation distortion does not occur. As a result, on the basis of a synergistic effect based on the above (1) and (2), the acoustic characteristics such as the senses of localization, depth, density, and transparency, and resolution of a sound image are further improved.

Specifically, a fourth aspect of the present invention is one wherein the elastic member is configured to include a mechanical spring, and also configured to include a resonance prevention member that keeps a state of being in close contact with the mechanical spring.

That is, in the present invention, the elastic member is configured to use, for example, a spring coil as the mechanical spring, and include a surging resonance prevention member that keeps the state of being in close contact with the spring coil and made of a viscoelastic member. In the case of forming the surging resonance prevention member in a shape in which a plurality of viscoelastic pieces that are protruded with extending in a radial direction are in partial contact with an inner or outer circumferential surface of the spring coil, the probability that the vibration in the high frequency range where a wavelength is shorter avoids an influence of a vibration damping action by the viscoelastic pieces to pass is increased.

Alternatively, as the mechanical spring, a conical coil spring, disc spring, structure in which the disc springs are stacked in a multistage manner, volute spring, ring spring, spiral spring, flat spring, laminated leaf spring, U-shaped spring, or the like can be selected in consideration of a shape, size, and the like required as the insulator for audio.

Specifically, a fifth aspect of the present invention is one provided with: a fixing part that grips an end part of the elastic member, and a tubular sleeve that grips the other end part of the elastic member with containing inside part of the elastic member, and has a shape substantially tubularly extending toward the fixing part, wherein the tubular sleeve and the fixing part are placed so as to be fitted into each other with a narrow radial direction gap being provided between the tubular sleeve and the fixing part.

That is, the present invention is one that indicates a structure that, even in the case where an impulsive horizontal disturbance load due to an earthquake or the like is applied to the audio device (e.g., a speaker) mounted on the insulator, minimizes a tilt of the audio device to prevent the audio device from falling with use of the long tubular sleeve (resonant member) provided in order to obtain the "wind-bell effect". That is, the tubular sleeve having a long shape has both roles of producing the "wind-bell effect" and a "fall prevention effect" on the mounted object.

Also, given that L is an effective length of the tubular sleeve and δ is a radial direction gap between the tubular sleeve and a coil fixing part, δ and L are set so as to meet δ/L≤0.03.

That is, in the present invention, by setting the effective length L of the tubular sleeve and the radial direction gap δ between the tubular sleeve and the fixing part so as to meet the above expression, even in the case where an impulsive horizontal load is applied to the speaker (or another audio device) mounted on the present insulator, the speaker can be prevented from falling.

Specifically, a sixth aspect of the present invention is one wherein the gap is set so as to meet δ≤1.0 mm.

That is, in the present invention, by setting the radial direction gap δ between the tubular sleeve and the coil fixing part so as to meet the above expression, even in the case where an impulsive horizontal load is applied to the speaker or another audio device mounted on the present insulator, the speaker or audio device can be prevented from falling, regardless of specifications of the speaker or audio device.

Specifically, a seventh aspect of the present invention is one provided with a load support part that supports the load of the audio device, wherein a concave part that contains a whole or part of a spike, a roller for movement, or the like attached to the audio device is formed on the load support part.

That is, the present invention is one that focuses on the finding that, by bringing the insulator and the audio device into contact with each other not through a point but through a plane having a large area, various vibration modes of the wind-bell member can be effectively utilized as the assist action in the high frequency range. By disabling a function of a spike placed for the audio device contrary to common sense, the wind-bell effect can be further obtained.

Specifically, an eighth aspect of the present invention is one wherein given that impulse excitation is applied to a single body of the resonant member with a central part of the single body of the resonant member being fixed, and a time period during which an envelope of a sound pressure waveform obtained from a sound collecting microphone arranged near the wind-bell member decays to 36.8% of an initial value is a wind-bell time constant T, the wind-bell time constant T is set so as to meet T>0.05 seconds.

That is, the present invention is one that focuses on the finding that a distribution of resonant peak values in vibration transfer characteristics of the insulator main body and a resonant peak value distribution in sound pressure characteristics of a single body of the wind-bell member nearly coincide with each other, and therefore without necessarily using the insulator main body, by measuring tap tone characteristics of the single body of the wind-bell member, the vibration transfer characteristics of the insulator main body can be estimated. A measurement condition for the tap tone characteristics is in accordance with a "reference condition" described in Section [1-4-1] herein. The most important wind-bell characteristic condition to be met by the wind-bell member is that the wind-bell time constant T has a certain value or more. As a result of the present study, it has turned out that the lingering sound of the wind-bell brings a sense of spatial extent (sense of depth, sense of presence) to reproduced sound. On the basis of this effect, in stereo reproduction, magnificent orchestra space is separated from the speaker and appears behind the speaker, which is spread as a deep and holographic image. From many preview experimental results, in the case where a material and shape of the wind-bell member are selected to meet T>0.05 seconds, as compared with the case of little lingering sound (in the case T≈0), the effect of obviously improving the "sense of spatial extent" is obtained.

Further, in the case where the wind-bell member is configured such that the wind-bell time constant meets T>0.1 seconds, regardless of a reproduced music genre, a further satisfactorily result is obtained.

Specifically, a ninth aspect of the present invention is one wherein a material and a shape of the resonant member are set such that with a central part of a single body of the resonant member being fixed, a fundamental tone frequency of the resonant member meets $f_1 > 1500$ Hz.

That is, the present invention is one that summarizes results on the basis of a speaker preview experiment with many listeners. In the results of the preview experiment, it is pointed out that in the case where the fundamental tone frequency of the wind-bell member is too low, an eigentone becomes harsh in the high range depending on a genre of reproduced music. A primary resonant frequency $f_1$ can be set by selecting the shape and material of the wind-bell member. In the case where the fundamental tone frequency is set so as to meet $f_1 > 1500$ Hz, a result satisfiable by many of the listeners is obtained.

In the case of setting the fundamental frequency to a higher fundamental tone frequency meeting $f_1 > 2500$ Hz, extremely natural acoustic characteristics approved by almost all of the listeners are obtained.

Specifically, a tenth aspect of the present invention is one wherein the resonant member is configured such that with a central part of a single body of the resonant member being fixed, beats are superimposed on a decay curve of an impulse response of the resonant member.

That is, in the present invention, it has turned out that in the case of applying a resonant member of which a decay curve of an impulse response has beats observed, comfortableness (sense of mellifluousness, sense of fruitfulness, and the like) is brought to the reproduced sound.

Specifically, an eleventh aspect of the present invention is one configured such that given that a resonant frequency due to a rigid body mode determined by a spring stiffness of the elastic member and a mass of the audio device mounted on the upper support member is $f_0$, and a lowest-order resonant frequency due to elastic deformation of the resonant member is $f_1$, vibration characteristics of the upper support member appearing when the upper support member is excited have no resonance point in a range between the resonant frequencies $f_0$ and $f_1$.

That is, in the present invention,
(i) In the low frequency range ($f_0 < f < f_1$), vibration transfer between the audio device and the floor surface is blocked, and
(ii) On the other hand, in the high frequency range ($f > f_1$), the vibration characteristics of the resonant member assists high frequency vibration transfer.

The insulator having characteristics that have both of the vibration blocking effect by the floating type insulator and the high range assist effect far overcoming the conventional hard material insulator, i.e., both of the above (i) and (ii) is obtained. Further, given that a lower limit of a human audible range is 20 Hz, the resonant frequency $f_0$ is preferably set so as to meet $f_0 < 20$ Hz.

In the case where the resonant member is configured to be a substantially tubular-shaped member, it is only necessary that a frequency of the fundamental tone having the lowest frequency among the plurality of resonant frequencies that the single body of the resonant member has with the central part of the single body of the resonant member being fixed, and the longest lingering sound is set to $f_1$.

Specifically, a twelfth aspect of the present invention is one wherein: the upper support member is made to have a role as a spike fixing part; the lower support member is made to have a role as a spike receiving part; and the elastic member is made to have a role as a spike supporting part.

That is, in the present invention, the spike type insulator is made to have the wind-bell effect. A spike side sleeve has inside a cavity that contains a spike columnar part and a spike conical part, and is formed in a tubular shape of which one end part has sealed structure and the other end part is an open-to-air end, i.e., formed in a shape close to a "wind-bell". On the basis of this configuration, the wind-bell effect can be obtained with a simple structure in which the conventional spike type is only attached with a wind-bell member.

Further, the audio device (e.g., a speaker) excites the present insulator from directions of three axes of X, Y, and Z, and therefore by supporting the spike receiving part in an elastically deformable manner in the three-axis directions, the wind-bell member can easily excite more resonance modes in the high frequency range.

Specifically, a thirteenth aspect of the present invention is one that is configured to, in an audio system supported by an actuator according to the first aspect of the present invention, include a control device that is configured to include: the actuator provided between the audio device and a base; and a sensor that detects a displacement and/or a vibration state of the audio device, and performs active control of the displacement and/or the vibration state of the audio device on the basis of information from the sensor so as to suppress vibration of the audio device itself, the vibration being generated by a vibration excitation source that the audio device itself has.

That is, in the present invention, various problems (e.g., a boomy phenomenon) caused by the vibration of the audio device itself having the vibration generation source can be resolved.

Specifically, a fourteenth aspect of the present invention is one wherein on an outer circumferential surface or an inner circumferential surface of the resonant member, at least one groove in a longitudinal direction, a circumferential direction, or a tilted direction, or a concavo-convex surface is formed.

That is, in the present invention, by forming the plurality of grooves on the inner or outer circumferential surface of the resonant member, the resonant member can be made to have more natural vibration modes.

Also, in the case of forming the grooves or irregular concavo-convex surface on the inner circumferential surface, a fine appearance of the insulator as an audio device requiring an interior property can be prevented from being spoiled.

Specifically, a fifteenth aspect of the present invention is one wherein the resonant member is formed of a material having an intrinsic acoustic impedance of $10^7$ Ns/m$^3$ or more.

That is, in the present invention, in the case of using a good-quality acoustic member having an intrinsic acoustic impedance of $10^7$ Ns/m$^3$ or more for the resonant member, more resonance modes are easily excited in the high frequency range, and therefore the vibration assist action can effectively work to thereby improve the acoustic characteristics.

Further, a copper alloy used as a material for a wind-bell is used for the resonant member. A copper alloy that has long lingering sound and low decay property and easily excites more resonance peaks in the high frequency range is preferable as a material for the resonant member of the present invention insulator. Further, by using a copper alloy for the resonant member and setting a tin Sn content percentage, the sense of spatial extent, and the senses of mellifluousness and fruitfulness to be added to reproduced sound can be adjusted. It is only necessary to set the tin content percentage of the copper alloy within the range of 1% to 25%.

Specifically, a sixteenth aspect of the present invention is one wherein a vibration propagation path from the upper support member to the lower support member is formed of a material having an intrinsic acoustic impedance of $10^7$ Ns/m$^s$ or more.

That is, in the present invention, in the case of using a mechanical spring as the elastic member, by using materials having low decay properties and high intrinsic acoustic impedances z at the same level, specifically, materials having $z > 10^7$ Ns/m$^3$ for the respective members forming the vibration propagation path $\Phi_Z$, the wind-bell effect can be further obtained because the resonant member easily excites the high frequency vibration.

Also, it is only necessary that the respective members are selected so as to have characteristics of a "highpass filter" that blocks vibration in the low frequency range and passes the vibration in the high frequency range.

Specifically, seventeenth and eighteenth aspects of the present invention are ones configured such that in an audio device supported by an insulator for audio, an auxiliary unit intended for placement stabilization of the audio device is arranged in parallel with the insulator for audio, and a gap between a bottom surface of the audio device and a support part of the auxiliary unit can be set by height adjustment of the auxiliary unit so as to be able to suppress a tilt amount of the audio device.

That is, in the present invention, even in the case where the audio device (e.g., a speaker) mounted on the insulator is applied with an impulsive disturbance load due to an earthquake or the like, a tilt of the audio device can be minimized to prevent the audio device from falling.

Specifically, a nineteenth aspect of the present invention is one that, on the basis of wind bell characteristics such as a length of lingering sound before vibration at a time of exciting a resonant member decays, beats included in a decay curve, a resonance mode of the resonant member in a high frequency range, selects the resonant member according to a music genre, characteristics of an audio device, or a listener's taste.

That is, the present invention is one that focuses on the finding that, by selecting the wind-bell characteristics determined by a material, shape, and the like of the resonant member, the sense of localization, resolution, senses of spatial extent, mellifluousness, and fruitfulness, and the like of a sound image can be adjusted.

Besides, in the present invention, the following addition or modification is possible.

For example, in the following manner, the upper and lower support members can be prevented from being separated from each other.

The present invention may be provided with: a tubular part that is formed in any of the upper support member and the lower support member; a through-hole that is formed in the tubular part in an axial direction; and a fastening member that is inserted into or attached to the upper support member and the lower support member through the through-hole, wherein the fastening member limits an upper limit of a relative axial distance between the upper support member and the lower support member.

That is, the fastening member attached through the through-hole can limit the stroke upper limit of the upper support member relative to the lower support member and also prevent both members from being separated.

For example, the following tuning method for reproduced sound can be applied. A detachable different configuration insulator is arranged in series with the insulator for audio according to the first aspect of the present invention on a device mounting side of the insulator for audio.

That is, on the present invention insulator, the different configuration insulator (e.g., a hard material insulator) is detachably arranged. Reproduced sound tuning that is, in addition to the high range assist effect brought by the resonant member of the present invention insulator, added with an assist effect by the different configuration insulator can be easily performed.

For example, the following audio device tilt correcting method can be applied. An end part of the upper support member or the lower support member is attached with a base part that adjusts an axial insulator height with a screw.

That is, by attaching the base part, a tilt of an audio device that is mounted on a plurality of insulators and has a position of the center of gravity not coincident with a geometric center can be corrected.

Advantageous Effects of Invention

Differently from the conventional hard material insulator that is made to have various high frequency characteristics by using quartz, titanium, natural quartz crystal, marble, or the like, or stacking such materials, the insulator of the present invention using the wind-bell effect can dramatically improve acoustic characteristics and tune sound by selecting a single material and a wind-bell shape. Vibration characteristics of the present invention insulator, and main acoustic effects brought by the vibration characteristics are substantially summarized as follows:

(1) Many resonance modes of resonant member in high frequency range: improvement of sense of localization (sense of focus) and resolution of sound image
(2) Lingering sound of resonant member: improvement of sense of spatial extent (sense of depth, sense of presence)
(3) Beats (fluctuation) of resonant member: improvement of comfortableness, sense of mellifluousness, and sense of fruitfulness
(4) Vibration blocking characteristics in low frequency range: makes above (1) to (3) more effective Differently from the conventional insulator for audio that must be dependent on developer's feelings and has been developed by trial and error, in the present invention insulator, the above (1) to (4) can be theoretically designed. Also, the effects above are remarkable.

BRIEF DESCRIPTION OF DRAWINGS

FIG. 1 illustrates an insulator for audio according to a first embodiment of the present invention, in which

FIG. 7 illustrates FFT-processed vibration acceleration characteristics with respect to a frequency, in which

FIG. 8a is a graph illustrating a transfer function G(s) (=$X_B/X_A$) of the above $X_B$ relative to $X_A$, and FIG. 8b is a graph illustrating a coherence function that indicates a degree of a causal relationship between the input $X_A$ and output $X_B$ of the system.

FIG. 11 is a graph illustrating a measurement result of an FFT-processed sound pressure level with respect to a frequency.

FIGS. 17a-17c are diagrams illustrating results of an FEM eigenvalue analysis made on an upper sleeve.

FIGS. 18a-18c are diagrams illustrating results of the FEM eigenvalue analysis made on the upper sleeve.

FIGS. 19a-19c are diagrams illustrating results of the FEM eigenvalue analysis made on the upper sleeve.

FIGS. 20a-20c are diagrams illustrating results of the FEM eigenvalue analysis made on the upper sleeve.

FIG. 25 is a model diagram illustrating a size relationship between a speaker and the insulator in the first embodiment of the present invention.

FIG. 26 is a front cross-sectional view of an insulator for audio according to a second embodiment of the present invention.

FIG. 27 is a front cross-sectional view of an insulator for audio according to a third embodiment of the present invention.

FIG. 28 is a front cross-sectional view of the insulator for audio according to the third embodiment, in which a state where an audio device is mounted is illustrated.

FIG. 29 illustrates an insulator for audio according to a fourth embodiment of the present invention, in which

FIG. 30 illustrates an insulator for audio according to a fifth embodiment of the present invention, in which

FIG. 32 is a front cross-sectional view of an insulator for audio according to a seventh embodiment of the present invention.

FIG. 36 illustrates an insulator for audio according to an eleventh embodiment of the present invention, in which FIG. 36a is a top view, and FIG. 36b is a front cross-sectional view.

FIGS. 37a to 37c are diagrams illustrating results of the FEM eigenvalue analysis made on thin disks.

FIG. 39 is a diagram illustrating a result of the FEM eigenvalue analysis made on the thin disks.

FIG. 40 illustrates an insulator for audio according to a twelfth embodiment of the present invention, in which

FIG. 41 illustrates an insulator for audio according to a thirteenth embodiment of the present invention, in which

FIG. 43 illustrates an insulator for audio according to a fourteenth embodiment of the present invention, in which

REFERENCES CHARACTERS LIST

1: Upper support member (upper sleeve), resonant member
2: Lower support member (lower sleeve)
5: Elastic member (spring coil)

DESCRIPTION OF EMBODIMENTS

The present invention will be described below according to the following steps:
[1] Embodiments of insulator for audio according to the present invention; and
[2] Speaker preview experiment on insulator for audio according to the present invention.
First, the above [1] is described on the basis of a [first embodiment].

[First Embodiment]

[1-1] Basic Structure of Insulator in Embodiment

Figure 1A:
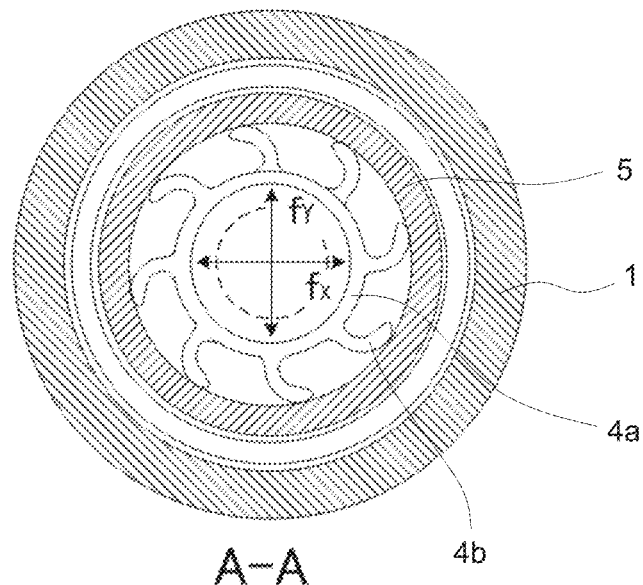
FIG. 1a is a top cross-sectional view (A-A cross-sectional view in FIG. 1b)
Figure 1B:
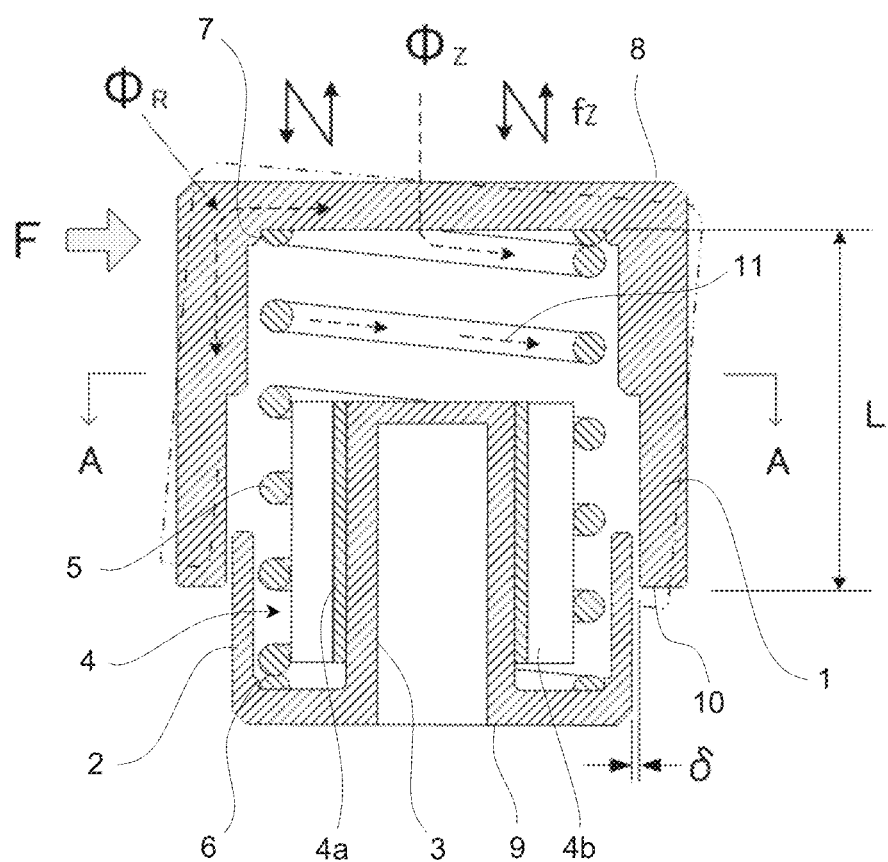
FIG. 1b is a front cross-sectional view.

FIG. 1 illustrates an insulator for audio according to the first embodiment of the present invention, in which FIG. 1a is a top cross-sectional view (A-A cross-sectional view in FIG. 1b), and FIG. 1b is a front cross-sectional view. Reference numeral 1 represents an upper sleeve (upper support member) as a wind-bell member, 2 represents a lower sleeve (lower support member), 3 represents a tubular part that is formed in the central part of the lower sleeve 2 with protruding, and 4 represents a surging prevention member (vibration generation prevention means) that is attached to an outer circumferential part of the tubular part 3. In the present embodiment, the upper sleeve 1 plays both roles as the upper support member and a resonant member (wind-bell member).

For the upper sleeve 1 and the lower sleeve 2, brass having good properties as an acoustic material (trial part A in Table 4) is used. The surging prevention member 4 is configured to include a cylindrical tubular part 4a and a plurality of viscoelastic pieces 4b that are protruded with extending in a radial direction. The upper sleeve 1 is arranged above the lower sleeve 2, and inside the both sleeves 1 and 2, a spring coil 5 as an elastic member is provided. Note that the elastic member herein is broadly interpreted as a "member that is held between the upper and lower members and supports a load of an audio device". In the case of the floating type insulator, the elastic member refers to a spring coil as a mechanical spring, air spring, magnet, or the like, and in the case of the hard material insulator, the elastic member refers to wood, resin, metal, quartz, or the like. Alternatively, in the case of the spike type insulator, the elastic member refers to a part configured to include a conical part and a columnar part. Reference numerals 6 and 7 represent aligning parts that are intended for keeping a state where axes of both sleeves 1 and 2 coincide with each other with the spring coil 5 being attached, and formed on both sleeves. In the case of using a spring to configure a damper, a surging resonance phenomenon becomes a big problem. Surging is a resonance phenomenon that is determined by a surge speed at the time when a shock wave propagating along a coil wire reciprocates along an effective part of the spring, and a plurality of harmonic wave vibrations with respect to a fundamental frequency occur over a wide frequency range. The surging prevention member 4 (4a, 4b) used in the present embodiment is formed of viscoelastic rubber. The viscoelastic rubber is a publicly known damping material characterized by being superior in vibration absorbing and internal damping properties with respect to shock, almost no repulsion even when receiving external force, and absorbing vibration energy. The viscoelastic pieces 4b keep a state of being in constant contact with an inner circumferential surface of the spring coil 5 with being deformed. The surging prevention member 4 is formed such that a height thereof is smaller than a minimum size at the time when the spring coil 5 is compressed by a mounted object such as a speaker. Reference numeral 8 represents a load support part that mounts an audio device (not illustrated) on an upper end surface of the upper sleeve 1, 9 represents an insulator placement surface (floor surface), and 10 represents an opening end 10 of the upper sleeve. That is, the upper sleeve has an inside cavity that contains a spring structure part, and is formed in a tubular shape of which one end part has a sealed structure and the other end part is an open-to-air end (free end), i.e., formed in a shape close to a "wind-bell". Also, in order for a wind-bell (FIG. 51) to be able to produce a sweet tone with being hung with string, an upper end part of the upper sleeve 1 is not completely fixed, but elastically supported by the spring coil 5 in X, Y, and Z-axis directions. The audio device (such as a speaker) mounted on the load support part 8 excites the present insulator from the directions of three axes of X, Y, and Z, as shown in FIGS. 1a and 1b. That is, the respective axes have exciting force components of fx, fy, and fz, and a vector representation of exciting force is F=fx·i+fy·j+fz·k. For this reason, in the upper sleeve 1 supported by the spring coil 5, after-mentioned various vibration mode at high frequencies are excited by the exciting force F. In this specification, a part corresponding to the upper sleeve constituting the insulator is referred to as the "wind-bell member" or the "resonant member".

Meanwhile, the insulator in the present embodiment is characterized by "simultaneously having both" of the following (1) and (2).

(1) Complete Vibration Blocking Effect in Low Frequency Audible Range

On the basis of frequency characteristics of a secondary vibration system, which are determined by a mass of the mounted object and spring stiffness, an almost complete blocking action on low frequency vibration in an audible range can be obtained. The vibration blocking effect enables an influence of vibration (e.g., occurrence of cross modulation distortion) due to mutual interference between the audio device and the placement surface on reproduced sound to be avoided.

(2) High Frequency Vibration Assist Effect Overcoming Conventional Hard Material Insulator The wind-bell members are arranged in parallel with a main propagation path of main vibration propagated from the audio device. As a result, it has turned out that effects of considerably improving acoustic characteristics such as senses of localization, depth, density, and transparency, and resolution of a sound image, and adding deep tones and lingering sound to reproduced sound to dramatically improve a sense of scale (extensity) can be obtained.

That is, the insulator of the present embodiment can have both of advantages of the conventional floating type insulator and hard material insulator, and also improve the acoustic characteristics far overcoming the conventional hard material insulator. Even in the case of not providing the tubular-shaped resonant member (upper sleeve 1), the acoustic characteristics can be improved by the vibration blocking effect in the low range; however, an effect based on attaching the resonant member (upper sleeve 1) further significantly exceeds the low range vibration blocking effect.

[1-2] Hypotheses on Wind-bell Effect

Meanwhile, hypotheses on the wind-bell effect proposed by the present inventors are as follows.

(i) The audio device is regarded as a source of vibration, and a main propagation path of main vibration, along which the vibration is propagated from the audio device toward the spring coil 5 through the load support part 8 mounted with the audio device is denoted by $\Phi_Z$. The resonant member having a vibration propagation path $\Phi_R$ branching from the main propagation path $\Phi_Z$ is arranged in parallel with $\Phi_Z$. The resonant member is configured to be the substantially tubular-shaped member of which one end has the sealed structure and the other end is the open-to-air end (free end). The vibration system $\Phi_R$ of the wind-bell having a tone that is determined by many factors such as a fundamental tone, harmonic tones (tones having frequencies equal to integral multiples of a frequency of the fundamental tone), lingering sound, beats (fluctuation) assists (enhances) high frequency vibration propagated from the audio device.

(ii) The assist action in the high frequency range, which is different in principle from a conventional type, improves the acoustic characteristics such as the senses of localization, depth, density, and transparency, and resolution of a sound image. Incidentally, sound produced by a music instrument has harmonic-tone components, and a sound image localization effect that enables a direction of a sound source to be specified in stereo reproduction depends on characteristics in the high range. That is, the present insulator improves the acoustic characteristics because the assist action in the high range emphasizes harmonic-tone components of reproduced sound of each music instrument. Also, lingering sound and beats at the time when sound decays provide an extent and depth of acoustic space, and mellow flavor to reproduced sound. The acoustic characteristics improvement effect found by the present study is referred to as the "wind-bell effect".

(iii) The present embodiment is configured not to make a material having small intrinsic acoustic impedance, such as rubber or resin, intervene in the main vibration propagation path $\Phi_Z$ (load support part 8→spring coil 5→lower sleeve 2). In this case, the spring coil 5 having a thick wire diameter plays a role as a "sound tube" that propagates the vibration generated by the audio device to the floor surface. Also, the high frequency vibration assisted by the wind-bell member is propagated from the audio device toward the floor surface through the sound tube with transferring through the vibration propagation path $\Phi_Z$ together with the main vibration.

In addition to the above (i), one insulator that has been commercialized as a hard material insulator is one that utilizes vibration transfer characteristics of the material only in a longitudinal direction of the main vibration propagation path $\Phi_Z$. A multilayer structured insulator (e.g., Patent literature 3) is one in which various materials respectively having different acoustic impedances are stacked on each other in a longitudinal direction (direction of the main vibration propagation path $\Phi_Z$). None of these has a vibration system that branches from the vibration propagation path $\Phi_Z$ and is arranged in parallel as in the present invention.

In addition to the above (ii), high-order harmonic tones and nonconsonance components (frictional movement noise and scratch noise) generated at the time of playing many music instruments do not spoil original sounds of the music instruments, but on the contrary, provide a depth and flavor to the sounds. In the present invention insulator as well, a problem that a natural frequency of the resonant member (upper sleeve 1) and its harmonic components cause unnatural echoes in reproduced sound of audio is not present. The hypothesis in the above (ii) is examined in the preview experiment in Section [4]. Further, in the present embodiment, the low frequency vibration propagation between the audio device and the floor surface in the audible range is completely blocked. For this reason, the high frequency vibration assisted by the resonant member corresponds to only original sound components generated from the audio device (speaker). In the case of the conventional hard material insulator, there is a problem that vibration due to a rebound from a floor surface, i.e., cross modulation distortion (sub-harmonics) corresponding to vibration components not originally included in original sound is also assisted (enhanced). In general, vibration due to a rebound from a floor surface is low frequency vibration (20 to 100 Hz); however, in the case where transfer characteristics are nonlinear, high frequency cross modulation distortion occurs from a plurality of low frequency vibrations respectively having different frequencies. In the insulator of the present embodiment, the vibration due to the rebound from the floor surface is absent in the low frequency range because of the secondary damping characteristics determined by the spring stiffness and mass, and therefore the cross modulation distortion does not occur.

In addition to the above (iii), the vibration system $\Phi_R$ of the wind-bell is present in parallel with the vibration system $\Phi_Z$, and therefore using only materials having large intrinsic acoustic impedances for the main vibration propagation path $\Phi_Z$ is not an indispensable condition for obtaining the wind-bell effect. However, in the case of using a mechanical spring as the elastic member, in order for the resonant member to easily excite the high frequency vibration, for the respective members forming the vibration propagation path $\Phi_Z$, materials having low damping properties and high intrinsic acoustic impedances z at the same level, specifically, materials having $z > 10^7$ Ns/m$^3$ are preferably used.

[1-3] Vibration Analysis for Examining Hypothesis on the Wind-bell Effect

In order to examine, among the above hypotheses (i) to (iii) on the wind-bell effect, the hypothesis in the above (i), i.e., "in the high frequency range, the vibration characteristic of the resonant member assists the high frequency vibration", a frequency response analysis on the insulator of the first embodiment was made.

Figure 2:
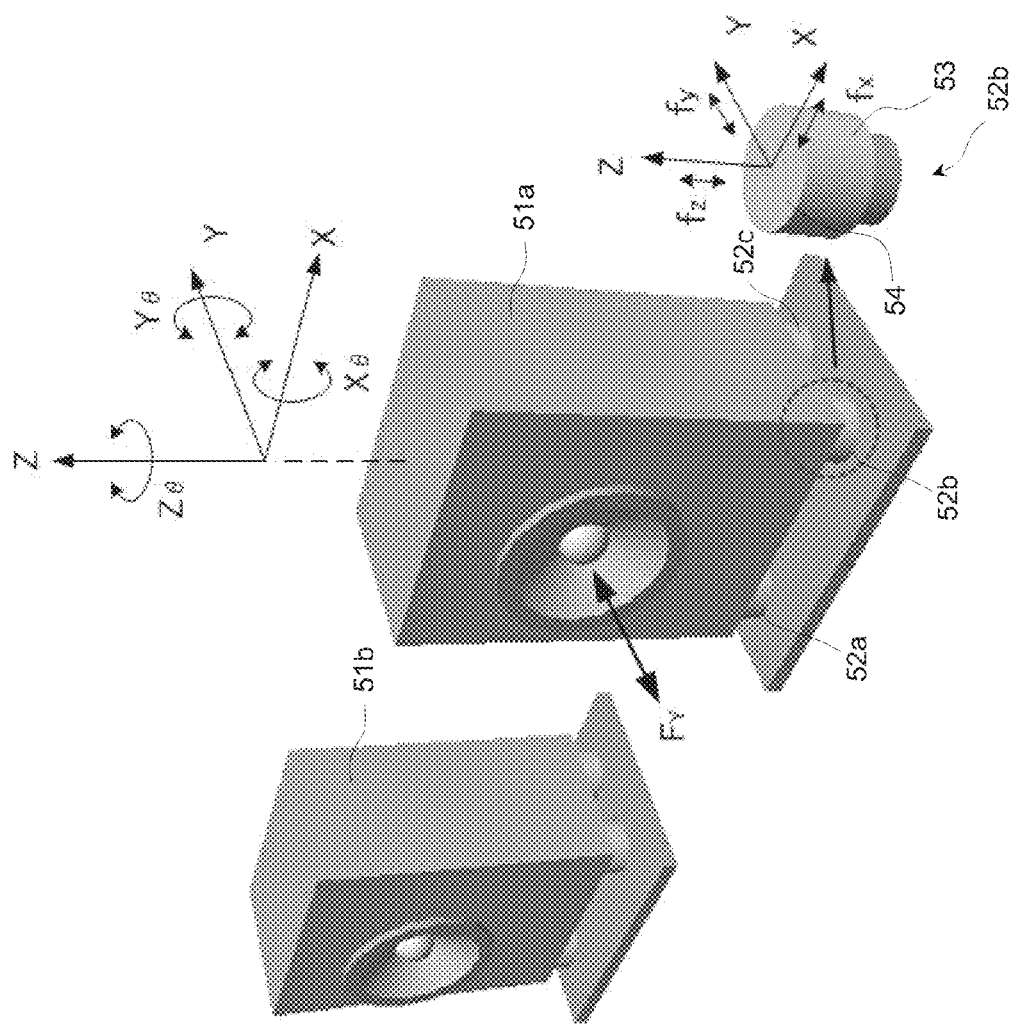
FIG. 2 is a model diagram of an audio system in the case where two speakers are supported by the present invention insulators.

FIG. 2 is a diagram illustrating a model diagram in the case where speakers are supported by the insulators of the present embodiment. Reference numerals 51a and 51b represent the speakers, 52a to 52d (52d is not illustrated) represent the insulators arranged on a bottom surface of each of the speakers, 53 represents the upper sleeve, and 54 represents the load support part of the insulator, on which the speaker is mounted. In the diagram, six coordinate axes of an X axis, Y axis, Z axis, $X_\theta$ axis, $Y_\theta$ axis, $Z_\theta$ axis are defined with a position of the center of gravity of the speaker being set as an origin. In the case of supporting the speaker with the four insulators, the speaker is applied with a variable load $F_Y$ corresponding to reaction force of a voice coil in a Y axis direction. In this case, it can be considered that, in a rotational direction vibration mode excited by the reaction force of a voice coil motor, pendular movement (oscillation around $X_\theta$ axis) in which the speaker main body part is displaced in the Y axis direction is dominant, and oscillations around the $Y_\theta$ axis and $Z_\theta$ axis are insignificant. Accordingly, it can be considered that the upper surface of the insulator is applied with variable loads (exciting forces fY, fZ) in the Y and Z-axis directions.

Figure 3:
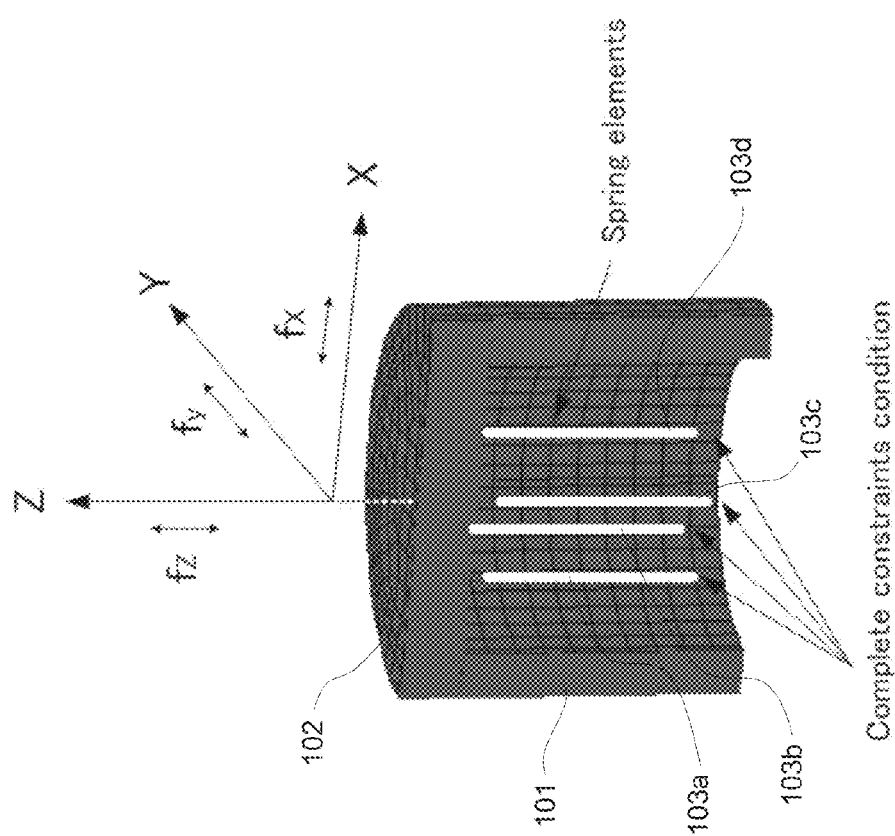
FIG. 3 is a diagram illustrating a model for an insulator numerical analysis made in order to examine hypotheses on a wind-bell effect.

FIG. 3 illustrates a numerical analysis model for the insulator. Reference numeral 101 corresponds to the upper sleeve, and 102 to the load support part (54 in FIG. 2). In the embodiment, the surging prevention member (4 in FIG. 1) suppresses the harmonic vibration due to the surging resonance. For this reason, in this analysis mode, only primary resonance determined by the mass and the static stiffness of the spring coil is focused on, and the spring coil that should be essentially treated as a distribution constant model is replaced by spring elements 103a to 103d corresponding to a lumped-constant model. A constraint condition for a lower end part of each of the spring elements is set as complete fixation.

Figure 4:
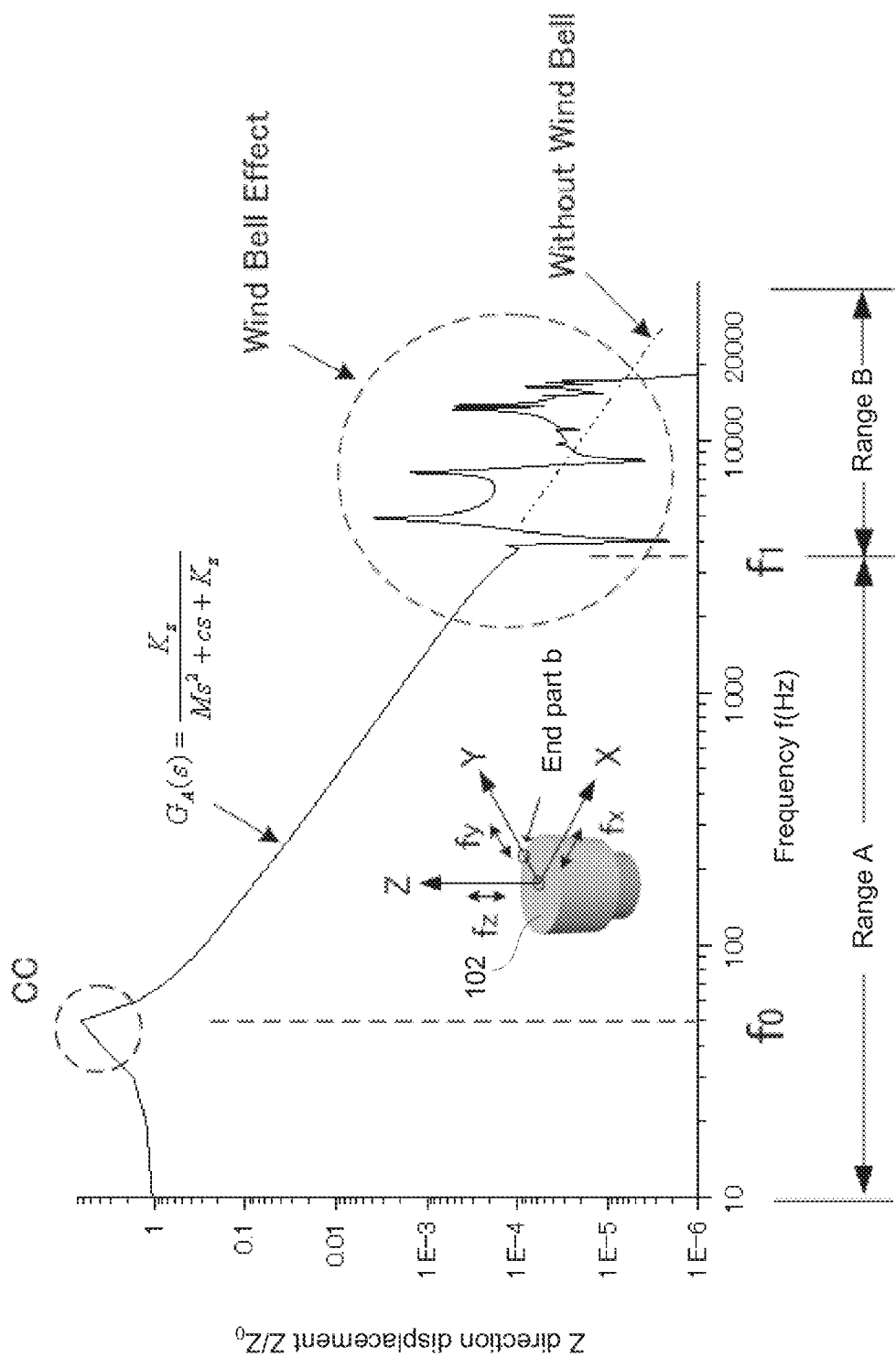
FIG. 4 is a graph illustrating a frequency response analysis result in the range of 10 to 20000 Hz.

FIG. 4 is a diagram in which under the condition that the upper surface 102 corresponding to the load support part is applied with the Y direction variable load (amplitude $f_Y$) and the Z direction variable load (amplitude $f_Z$), the numerical analysis model in FIG. 3 is used to obtain a Z axial displacement of an end part point b with respect to a frequency. Analysis conditions are that a sleeve outside diameter is set to ϕ74 mm; a sleeve inside diameter is set to ϕ 57 mm; a sleeve height is set to 63 mm, and a material is brass [longitudinal elastic modulus E=98 GPa (9990 kgf/mm), density ρ=8.5 g/cm³]. The Z axial displacement is made dimensionless and rearranged as $Z/Z_0$, where the static stiffness of the spring coil is $K_Z$, and $Z_0 = f_Z/K_Z$. Characteristics of the Z axial displacement with respect to the frequency can be divided into two frequency ranges (range A and range B) described below.

(1) Range A ($0 < f < f_1$)

In this range, the Z axial displacement can be obtained from the damping characteristics of the secondary vibration system expressed by the following expression.

$$G_A(s) = \frac{K_z}{Ms^2 + cs + K_z} \quad \text{[Expression 1]}$$

In FIG. 4, the reason why a resonant frequency $f_0$ (46.5 Hz) at a primary resonance point (CC in the diagram) determined by the mass M and the static stiffness $K_Z$ is high is because a mass of the mounted object (e.g., speaker) on the insulator is not taken into account in the numerical analysis, and the resonant frequency $f_0$ is determined by a mass $M_W$ of a single body of the upper sleeve (resonant member) and the static stiffness $K_Z$ of the spring coil. A rigid body vibration mode at the point CC in the diagram is illustrated in an eigenvalue analysis result (FIG. 17a) in Section [1-4-5]. In actual use conditions, for example, in the case where the speaker mass is $M_S$=41 kg and the spring stiffness is $K_Z$=8.13 N/m, $f_0$=4.49 Hz. As the frequency is made larger than the resonance point $f_0$, a vibration blocking level more largely falls. If expressed in dB (decibel) unit, as well known, a gradient of the vibration blocking characteristics with respect to the frequency is −40 dB/dec (vertical axis×20, dec is an interval during which a frequency increases ten times).

(2) Range B ($f > f_1$)

In the higher frequency range meeting $f > f_1$, there is obtained a vibrational distribution that over a wide frequency range, has pluralities of resonance points and antiresonance points respectively having high peak values. Such a singular vibrational distribution causes the "wind-bell effect" that improves the acoustic characteristics. That is, the resonance of the wind-bell member excited by the variable loads in the Y and Z directions causes a resonance mode that deforms the load support part 102 (54 in FIG. 2) corresponding to the upper end surface of the wind-bell member in the Z axis direction.

Figure 5:
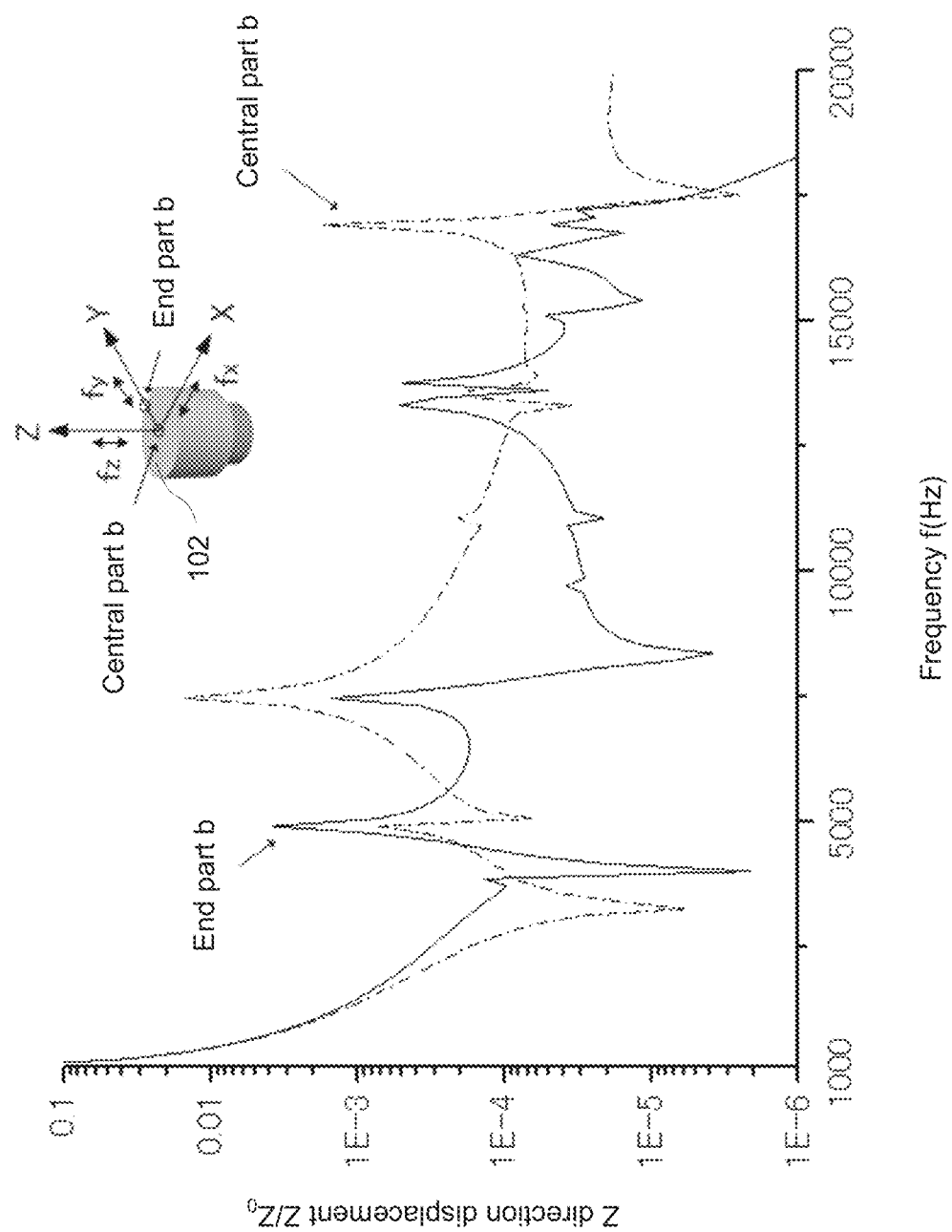
FIG. 5 is a graph illustrating a frequency response analysis result in the range of 1000 to 20000 Hz.
Figure 51:
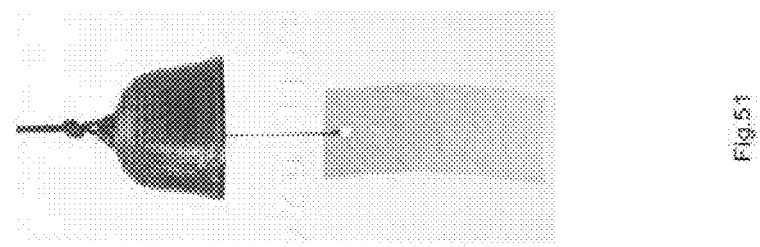
FIG. 51 is a diagram illustrating a wind-bell.
Figure 52:
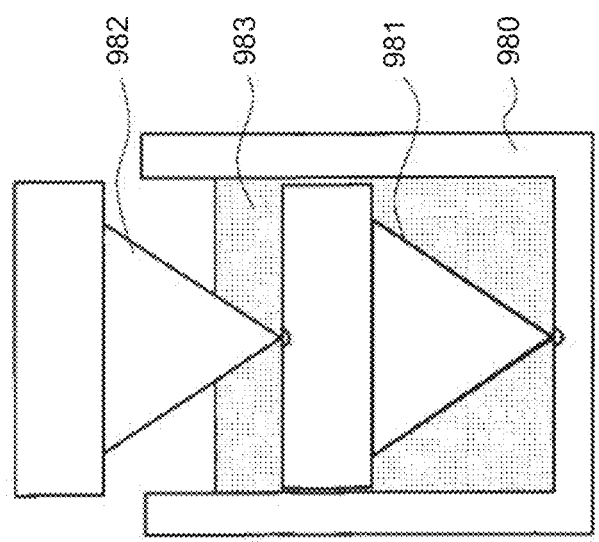
FIG. 52 is a diagram illustrating a conventional example of an insulator for audio, in which a two-stage spike structure is illustrated.

FIG. 5 is a diagram in which under the same analysis conditions as those in FIG. 4, with a frequency range being limited to a range of 1000 to 20000 Hz, Z axial displacements of the end part point b and central part point a of the load support part 102 with respect to the frequency are obtained. Vibrational distributions at the points a and b are largely different from each other, and even in a location where resonant frequencies at the points a and b coincide with each other, amplitude of vibration at the point a and amplitude of vibration at the point b are different from each other. That is, a dynamic contact state between the audio device and the insulator is different depending on a position in an XY plane where the both face to each other. From this analysis result, it turns out that in order to utilize the various vibration modes of the wind-bell member as the assist action in the high frequency range, it is only necessary to bring the insulator and the audio device into contact with each other not through a point but through a plane (load support part 102) having a large area. The wind-bell member applied to the insulator of the present invention is, in this regard, different in ideal shape as compared with a typical wind-bell (FIG. 51).

[1-4] Experiment for Examining Hypotheses on Wind-Bell Effect

Figure 6:
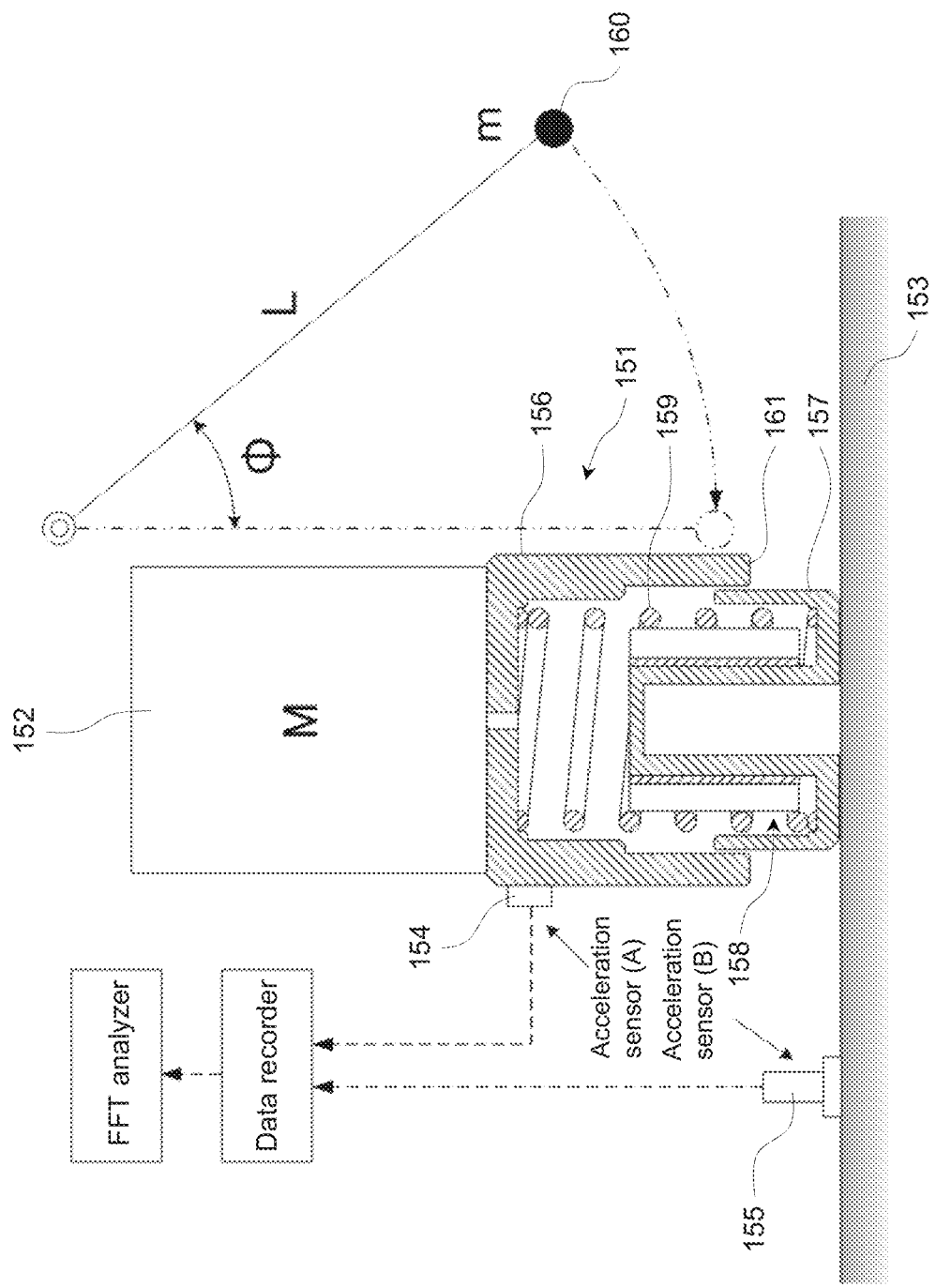
FIG. 6 is a model diagram illustrating a method for experiments using an insulator main body, which were made in order to examine the hypotheses on the wind-bell effect.

[1-4-1] Measurement of Vibration Blocking Characteristics in High Frequency Range A method for an experiment that was made in order to examine the hypotheses (i) and (iii) among the hypotheses (i) to (iii) on the wind-bell effect described in Section [1-2] is illustrated in FIG. 6. In FIG. 6, Reference numeral 151 represents a trial insulator, 152 represents a weight mounted on the trial insulator, 153 represents a floor surface, 154 represents an acceleration sensor (A) that is attached on an upper sleeve lateral side of the trial insulator and detects radial direction acceleration, and 155 an acceleration sensor (B) that is placed on the floor surface 153 and detects vertical direction acceleration. The trial insulator 151 is configured to include an upper sleeve 156 (upper support member) as the wind-bell member (resonant member), a lower sleeve 157 (lower support member), a surging prevention member 158, and a spring coil 159 (elastic member). Specifications of the upper sleeve are the same as those in the above vibration analysis conditions, and a material for the upper sleeve is brass (free-cutting brass steel: trail part A in Table 4). A material for the spring coil 159 used in the present embodiment is hard steel wire (SWC) used as a spring material, and used according to the following specifications.

TABLE 1

| Parameter | Symbol | Design value |
| --- | --- | --- |
| Coil outside diameter | D | 50 mm |
| Coil wire diameter | d | 4.5 mm |
| Free length | $L_S$ | 67 mm |
| Effective number of turns | $N_E$ | 5.2 |
| Spring constant | $K_Z$ | 8.13 N/mm |

A load mass of the weight 152 mounted on the upper sleeve 156 is M=4.5 kg. Also, the acceleration sensor (B) 155 is placed on the floor surface 20 mm apart from the insulator lateral side.

Here, a "reference condition" of an impulse excitation experiment in the present invention is set as follows. A weight (eggplant-shaped fishing weight No. 4) 160 with m=15 g is hung with a string having a length of L=280 mm, and dropped from an angle of Φ=45 degrees, and thereby the weight 160 is used in place of an impact hammer (source of excitation applied to the resonant member) that is used to obtain an impulse response. Also, an arrangement is made such that when the weight m is dropped to the lowermost point, the weight m collides with the vicinity of an opening end 161 of the upper sleeve.

Figures 7A, 7B:
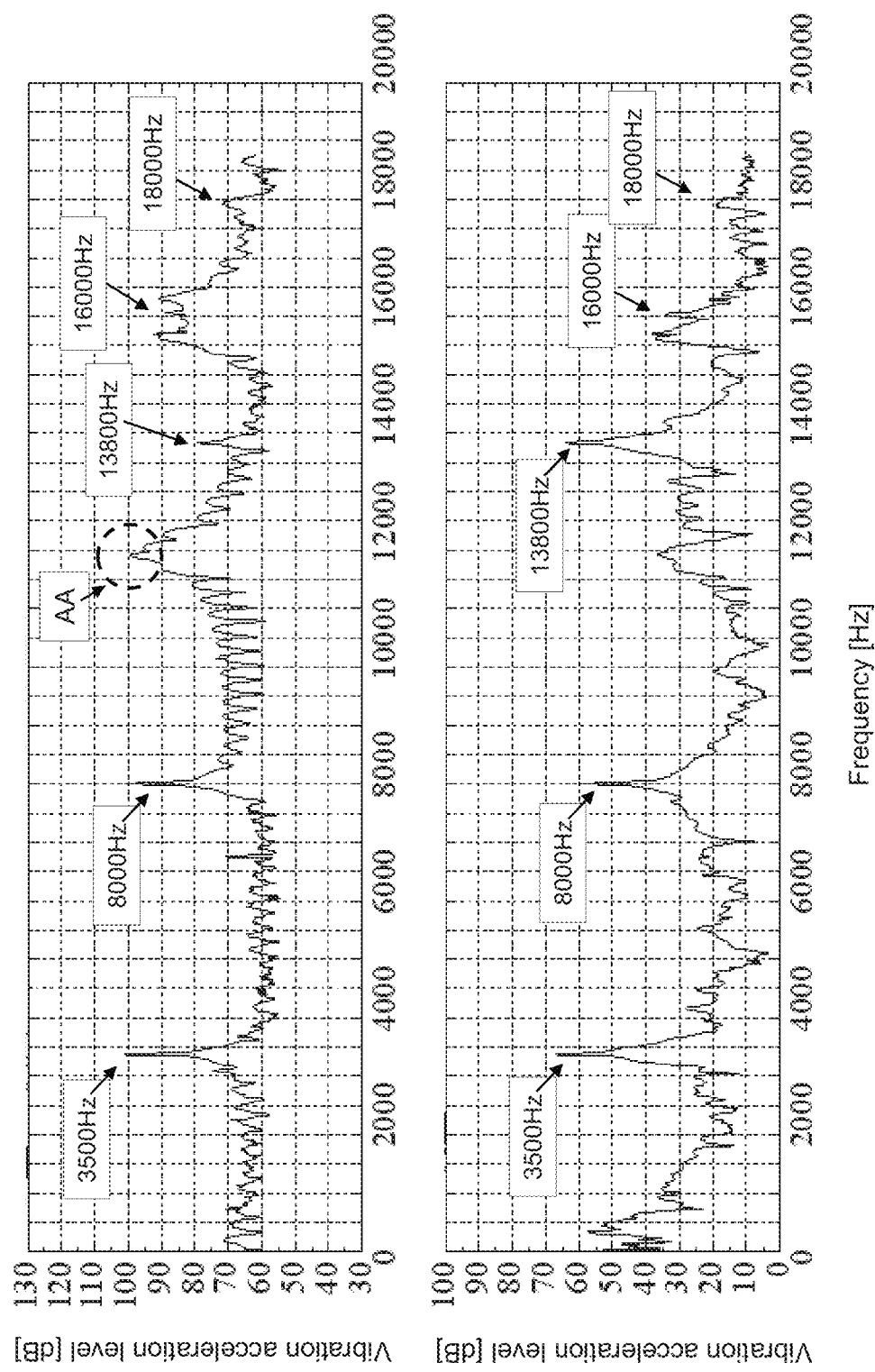
FIG. 7a is a graph illustrating a vibration level $X_A$ detected by an acceleration sensor (A) and FIG. 7b is a graph illustrating a vibration level $X_B$ detected by an acceleration sensor (B).

FIG. 7 illustrates FFT-processed vibration acceleration characteristics with respect to a frequency, in which FIG. 7a illustrates a vibration level $X_A$ that is detected by the acceleration sensor (A) 154 attached to the upper sleeve. That is, FIG. 7a is a diagram illustrating vibration characteristics at the time when the upper sleeve is excited by an audio device (e.g., speaker) mounted on the upper sleeve. FIG. 7b illustrates a vibration level $X_B$ that is detected by the acceleration sensor (B) 155 placed on the floor surface 153.

FIG. 8a illustrates vibration blocking characteristics as a transfer function $G(s)(=X_B/X_A)$ of $X_B$ relative to $X_A$. From another perspective, FIG. 8a is a diagram illustrating "ease of vibration transfer" appearing when the vibration applied to the upper sleeve is propagated to the lower sleeve (floor surface 153) through the spring coil. FIG. 8b illustrates a coherence function γ that indicates a degree of a causal relationship between the input $X_A$ and output $X_B$ of the system, where γ takes a vale between 0 and 1 inclusive. The case of γ=1 represents that an output of the system is entirely caused by a measured input at a corresponding frequency, whereas the case of γ=0 represents that an output of the system is totally independent of a measured input at a corresponding frequency f. That is, as the coherence function γ approaches 1, reliability of a measured result increases. A result of extracting frequencies (approximate values) at which the coherence function is γ≈1 and the vibration has peak values is listed in Table 2.

TABLE 2

| Vibration mode No. | Resonant frequency at which coherence function is γ ≈ 1 and vibration has peak value |
| --- | --- |
| 1 | 3500 Hz |
| 2 | 7700 |
| 3 | 13800 |
| 4 | 15700 to 16000 |
| 5 | 18000 |

Meanwhile, the upper sleeve that is the tubular shaped member (resonant member) of which the one end part has the sealed structure and the other opening end 161 is the open-to-air end has the various vibration modes as will be indicated by an after-mentioned FEM analysis result. As typical vibration modes appearing when the lateral side of the resonant member is excited, from comparison with the FEM analysis result, it is estimated that a mode in which the opening part of the upper sleeve is deformed in an "elliptical shape" appears at f=3500 Hz (FIG. 17b), a mode in which the opening part is deformed in a "trefoil shape" appears at f=8500 Hz (FIG. 18b), and a mode in which the opening part is deformed in a "cross shape" appears at f=15000 Hz (FIG. 20b).

As was estimated by the vibration analysis in Section [1-3], in the experimental result (FIG. 8a), in the high frequency range meeting f>3500 Hz, there are a plurality of resonance points respectively having high peak values over a wide frequency range. That is, there is obtained a vibrational distribution that has, for example, peak values of −30 dB at f=3500 Hz and 7700 Hz, and a peak value of −15 dB at f=13800 Hz. However, peak values other than the above peak values are −40 dB or less, and therefore vibration blocking performance is kept even in the high frequency range. The numerical value of −30 dB (1/31.6 times) that is a practically trouble-free value in industrial vibration insulation is a value that is not negligible for an excellent human sense of hearing in audio reproduction.

Figure 9:
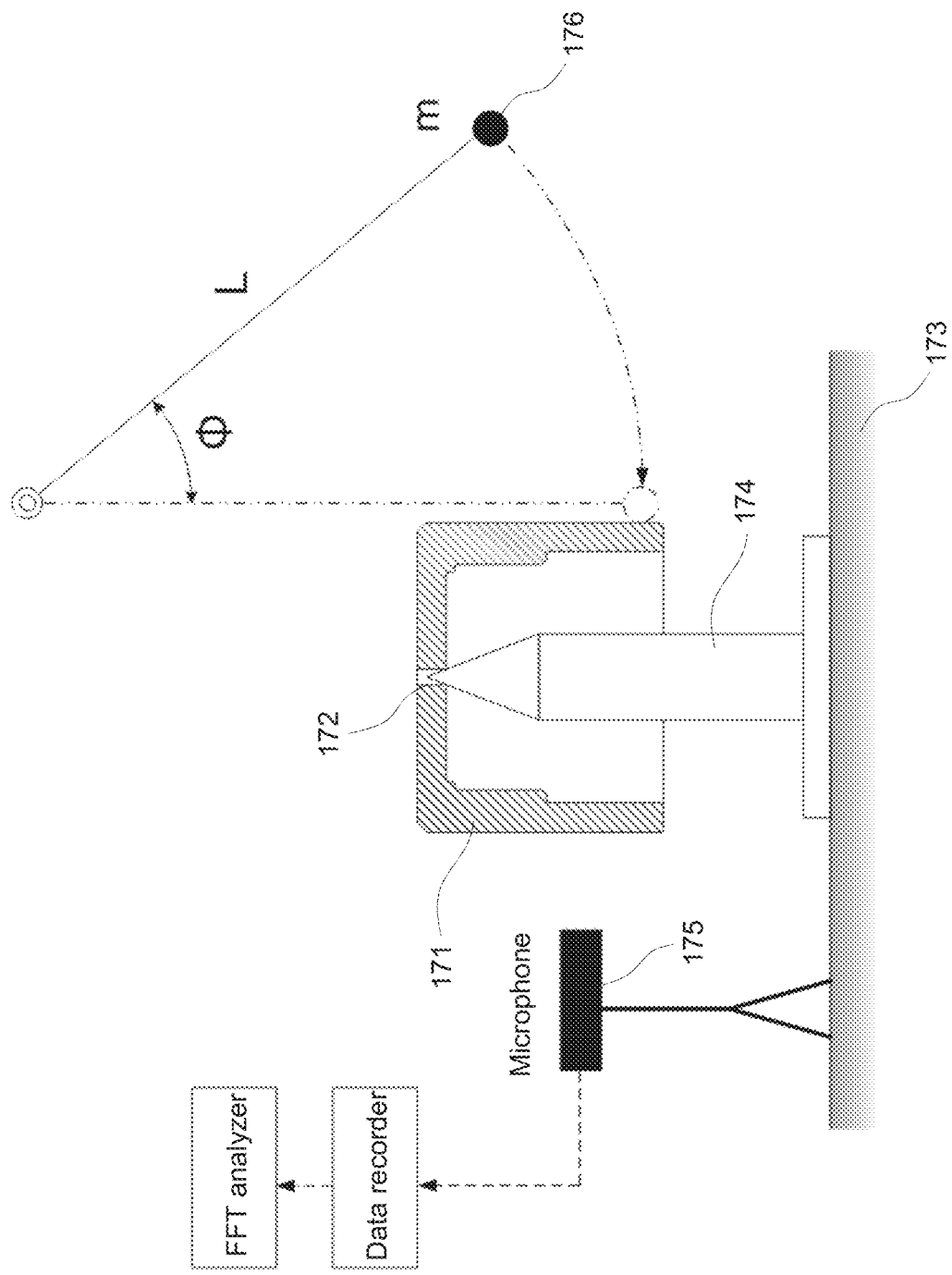
FIG. 9 is a model diagram of an experimental method for obtaining an impulse response of a single body of an upper sleeve.

[1-4-2] Impulse Excitation Experiment on Single Body of Upper Sleeve (1) Experimental Method The above-described experiment (FIG. 6) is an experiment for obtaining the vibration transfer characteristics of the insulator through the impulse excitation experiment using the whole of the insulator configured to include the plurality of parts. The insulator used for the experiment is, as described above, configured to include the upper sleeve (plays both roles as the upper support member and the resonant member) 156, lower sleeve (lower support member) 157, surging prevention member 158, and spring coil (elastic member) 159. An experiment for evaluating a level at which, among these parts, vibration characteristics of a single body of the upper sleeve 156 constituting the wind-bell influences the vibration transfer characteristics of the insulator main body was made. FIG. 9 illustrates a method for the experiment. An upper sleeve 171 (resonant member) that is a trial part is one having the same specifications (made of brass: trial part A) as those of the insulator component part used for the above-described experiment (FIG. 3). A bolt fastening hole 172 formed in the central part of an upper surface of the upper sleeve is used to support the upper sleeve with a wooden spike 174 placed on a floor surface 173. The impulse excitation experiment here for obtaining an impulse response is in accordance with the "reference condition" in Section [1-4-1].

Figures 10A, 10B:
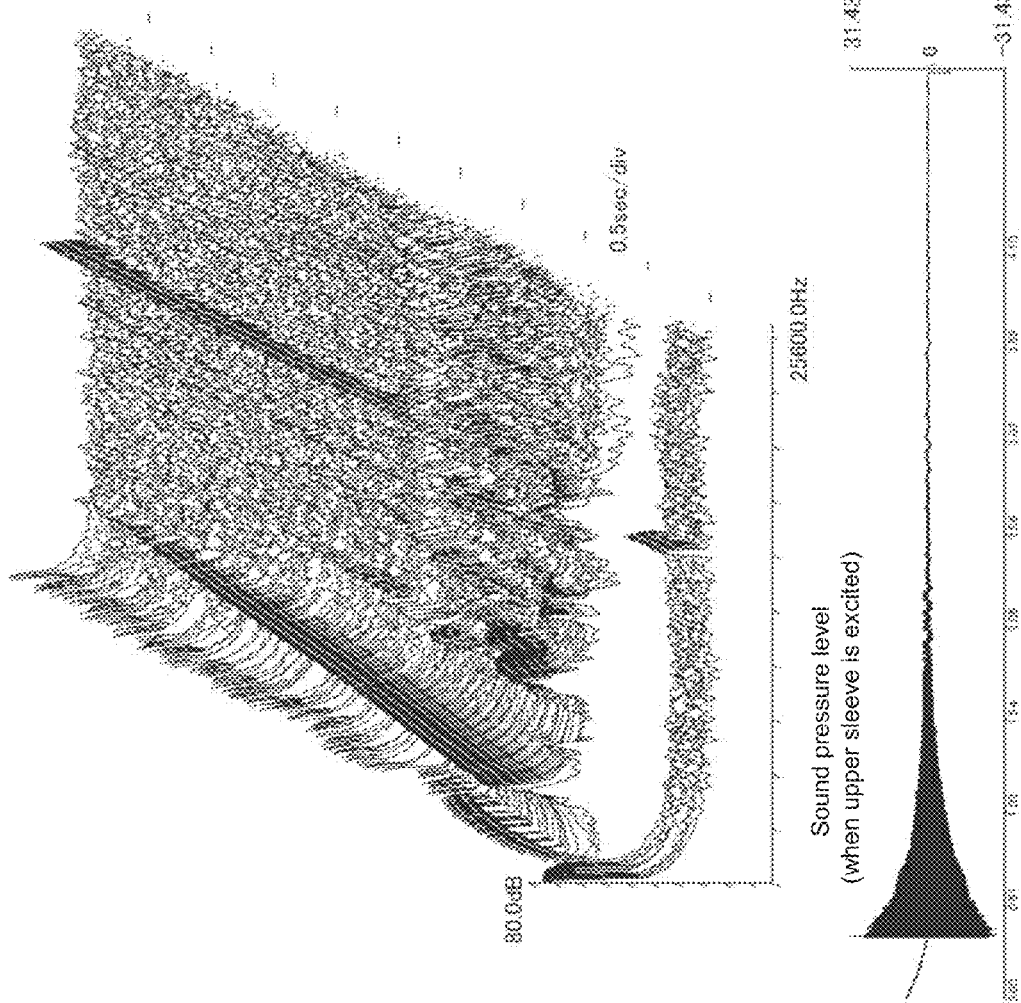
FIG. 10a illustrates a three-dimensional waveform diagram of sound pressure obtained through the experiment illustrated in FIG. 7.
FIG. 10b is a graph illustrating impulse response characteristics.

FIG. 10a illustrates a three-dimensional waveform diagram of sound pressure obtained through the experiment illustrated in FIG. 9, in which the vertical axis represents intensity of the sound pressure (dB), the horizontal axis represents a frequency, and the oblique axis represents time (second). FIG. 10b illustrates an example of after-mentioned impulse response characteristics.

(2) Sound Pressure Level with Respect to Frequency

FIG. 11 illustrates a measurement result of an FFT-processed sound pressure level with respect to a frequency, and Table 3 lists respective frequencies having peak values. From a comparison between Tables 2 and 3, the distribution of the resonant peak values in the vibration transfer characteristics of the insulator main body and a resonant peak value distribution in sound pressure characteristics of the single body of the upper sleeve 156 nearly coincide with each other. That is, it turns out that the vibration characteristics of the single body of the upper sleeve 156 dominantly influence the vibration transfer characteristics of the insulator main body. From this result, it turns out that even without use of the insulator main body, by measuring tap tone characteristics of the single body of the upper sleeve 171, the vibration transfer characteristics of the insulator main body can be estimated.

TABLE 3

| Vibration mode No. | Frequency having peak value |
|---|---|
| 1 | 3500 Hz |
| 2 | 8000 to 8500 |
| 3 | 14300 |
| 4 | 16000 to 17000 |
| 5 | 18000 |
| Supplement (AA in FIG. 9) | 11500 to 12500 |

Figure 12:
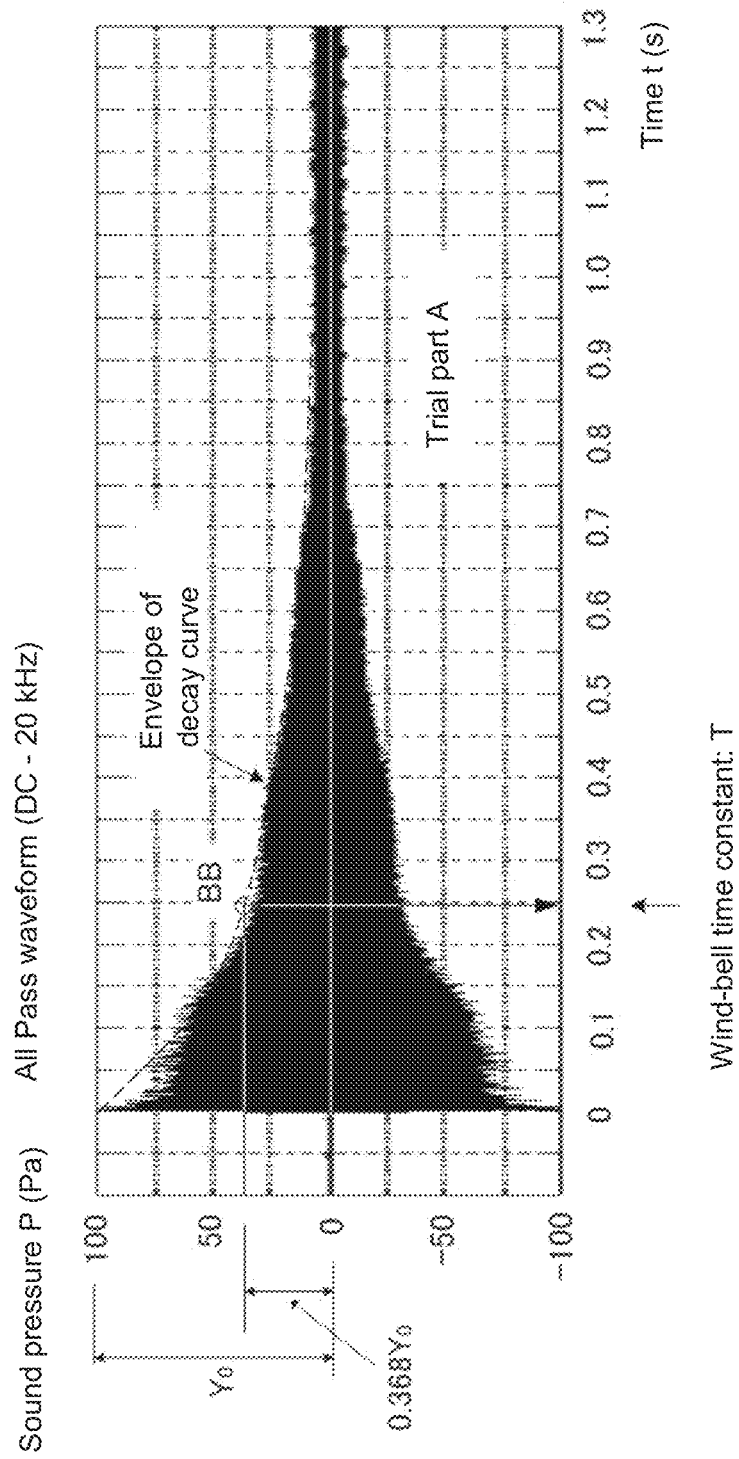
FIG. 12 is a graph illustrating impulse response characteristics of a trial part A.

[1-4-3] Impulse Response Characteristics (1) Case where Free-Cutting Brass Steel is Used for Upper Sleeve FIG. 12 is a diagram in which the impulse response characteristics (lingering sound of a tap tone of wind-bell) are obtained through the experiment illustrated in FIG. 9. Here, an envelope of a waveform due to the impulse response is approximated to an envelope due to the following response of a primary delay system.

$$y(t) = Y_0 e^{-t/T}$$ 
Expression 2

Figure 13A:
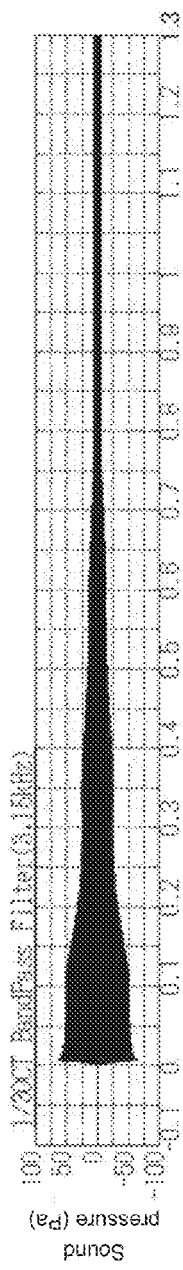
FIGS. 13a to 13e are graphs of an impulse response of a trial part A with a center frequency being variously set and a ⅓ octave bandpass filter being used.
Figure 13B:
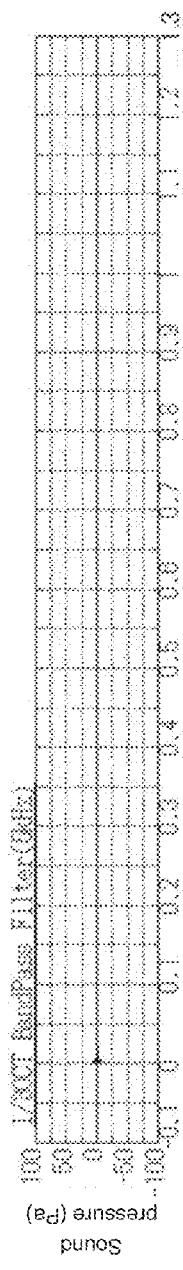

Here, time meeting $Y(t)=0.368Y_0$ is defined as a time constant T of the wind-bell. $Y_0$ is an initial value at t=0. From FIG. 12, the time constant is T=0.25 seconds. FIGS. 13(a) to 13(e) are diagrams in which impulse response characteristics are obtained with a center frequency being variously set and a ⅓ octave bandpass filter being used, and for example, in the case of setting the center frequency to $f_m$, a bandwidth of the above bandpass filter has a lower limit of $f_1=0.8909 \times f_m$ and an upper limit of $f_2=1.1225 \times f_m$ on the basis of JIS. The center frequency in FIG. 13a is $f_m=3.15$ kHz, and the primary resonance mode (f=3500 Hz) in which the opening part of the wind-bell is deformed in the "elliptical shape" is included.

From a comparison with amplitude and a length of decay time in each of the other graphs, it turns out that the primary resonance mode at f=3500 Hz have the largest influence on the acoustic characteristics of the wind-bell.

Figure 13C:
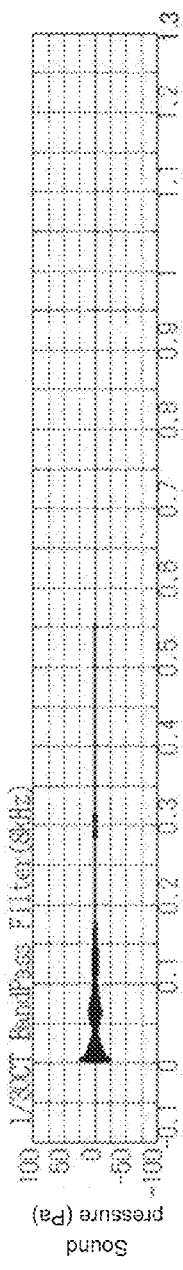
Figure 13D:
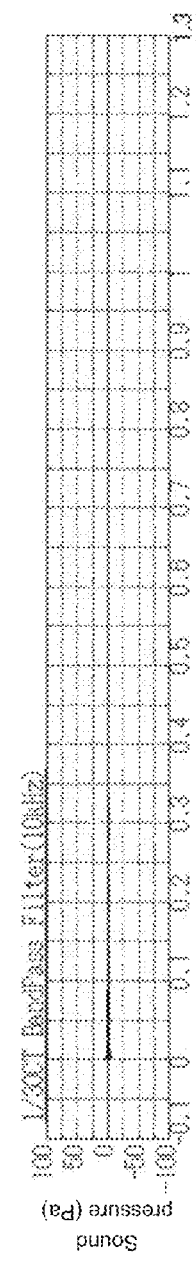
Figure 13E:
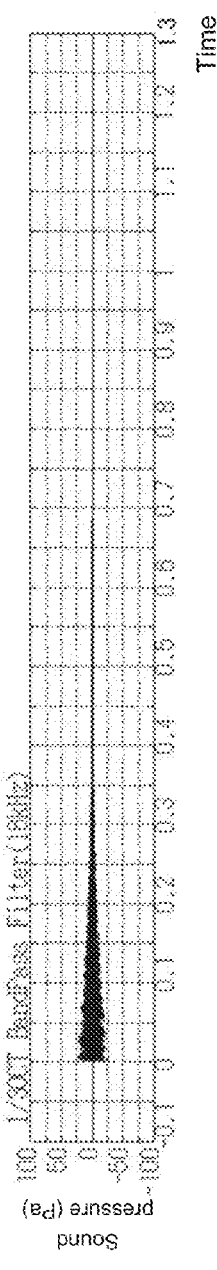

The graph having the center frequency of $f_m=8$ kHz in FIG. 13c includes the resonance mode (f=8500 Hz) in which the opening part of the wind-bell is deformed in the "trefoil shape". The graph having the center frequency of $f_m=16$ kHz in FIG. 13e includes the resonance mode (f=in the range of 16000 to 17000 Hz) in which the opening part of the wind-bell is deformed in the "cross shape". The amplitude and decay time in the graph having the center frequency of $f_m=8$ kHz and the amplitude and decay time in the graph having the center frequency of $f_m=16$ kHz are both too large to ignore. It is considered that such resonance characteristics of the wind-bell member (the upper sleeve) in the high frequency range contribute to the improvement in senses of localization, density, transparency, and the like, and also the length of the decay time (lingering sound) causes the effect of improving the sense of scale (extensity). Also, on the All Pass waveform obtained without any bandpass filter in FIG. 12, or a decay curve envelope in any of FIGS. 13a, 13b, and 13c obtained with the bandpass filter, beats having a small period is superimposed.

[1-4-4] Summary of Measurement Result of High Frequency Vibration Transfer Characteristics The results of this experiment are intended to examine the hypotheses [1-2] on the wind-bell effect. That is, (1) In the above measurement result of the vibration transfer characteristics between the upper sleeve (resonant member) and the floor surface, it turns out from a height of the coherence γ (FIG. 8b) that the high frequency vibration at each of the resonance points (Table 2) is obviously propagated to the placement surface from the upper sleeve through the spring coil. That is, the spring coil plays a role as the "sound tube" that propagates the high frequency vibration generated by the audio device toward the placement surface.

(2) From the comparison between the vibration transfer characteristics of the insulator main body and those of the single body of the upper sleeve (Tables 2 and 3), it turns out that many of the resonance modes in the high frequency range are determined by the vibration characteristics of the single body of the upper sleeve. Also, the impulse response characteristics of the single body of the upper sleeve are, as illustrated in the graphs of FIG. 13, accompanied with the long decay time (lingering sound) and low frequency beats (fluctuation) even at higher frequencies. Accordingly, even in the case where not the impulse hammer but an audio device is used as the excitation source to excite the upper sleeve, the vibration characteristics of the upper sleeve is propagated from the audio device toward the placement surface through the sound tube with being superimposed on the main vibration generated by the audio device itself.

(3) However, in the high frequency range other than the resonance points, the vibration transfer level is −40 dB or less, and therefore the sufficient vibration blocking effect can be obtained. As will be described later in an experiment in Section [1-6], in the case where a sine sweep signal having a low frequency of 50 Hz to 1000 Hz is provided to the excitation source, in the above low frequency range, the sufficient vibration blocking effect is obtained.

The primary resonant frequency of the insulator of the present invention, which can obtain the sufficient vibration blocking effect in the low frequency range, is sufficiently high in the high frequency range, i.e., f=3500 Hz. In the high frequency range, a factor that excites the high frequency vibration is not usually present on the placement surface, and therefore vibration due to mutual interference between an audio device and the floor surface does not deteriorate quality of reproduced sound. Incidentally, the reason why, in the measurement result (FIG. 7a) by the acceleration sensor (A) attached to the upper sleeve, even though a peak value appears around f=12000 Hz (AA in FIG. 7a), no peak value appears around the same frequency in the vibration transfer characteristics (FIG. 8a) is considered to be because an influence of the impulse excitation on the wind-bell member remains within local vibration.

Figure 14:
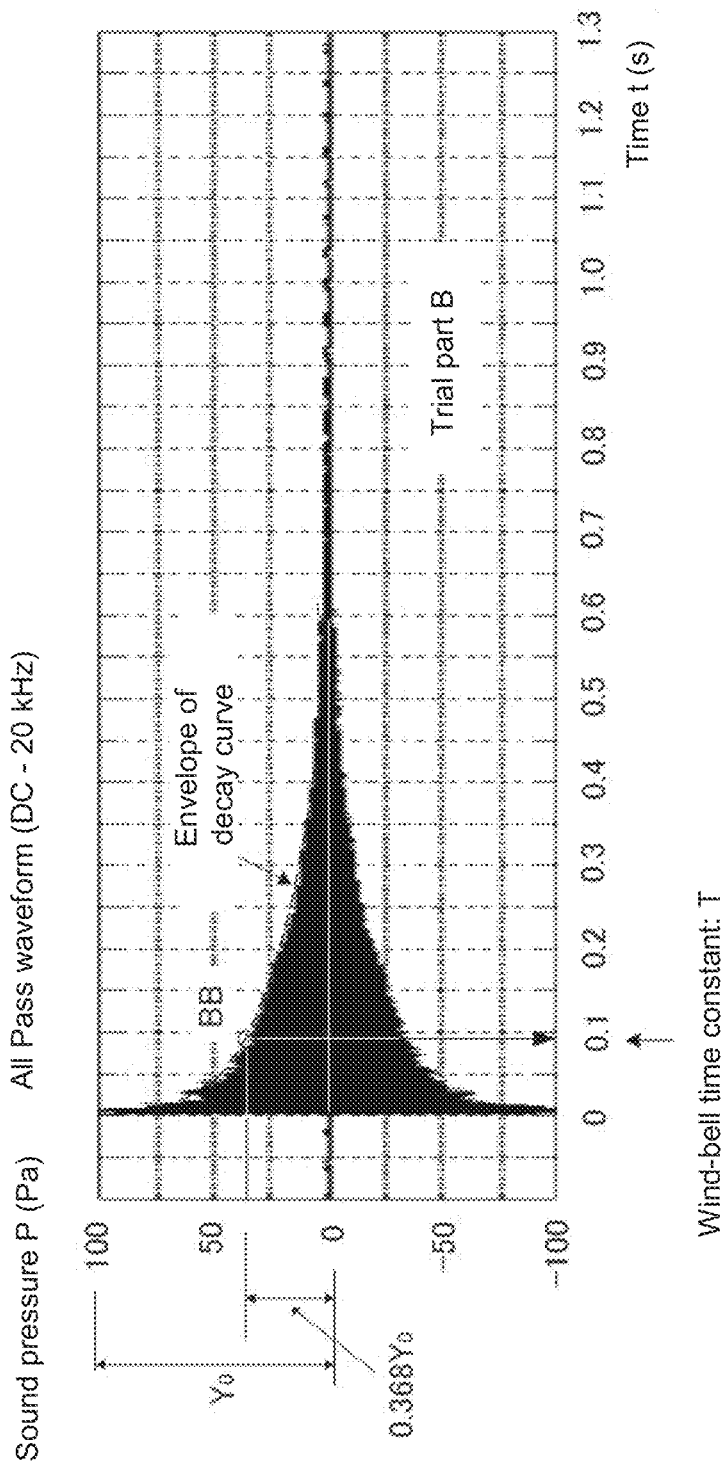
FIG. 14 is a graph illustrating impulse response characteristics of a trial part B.
Figure 15:
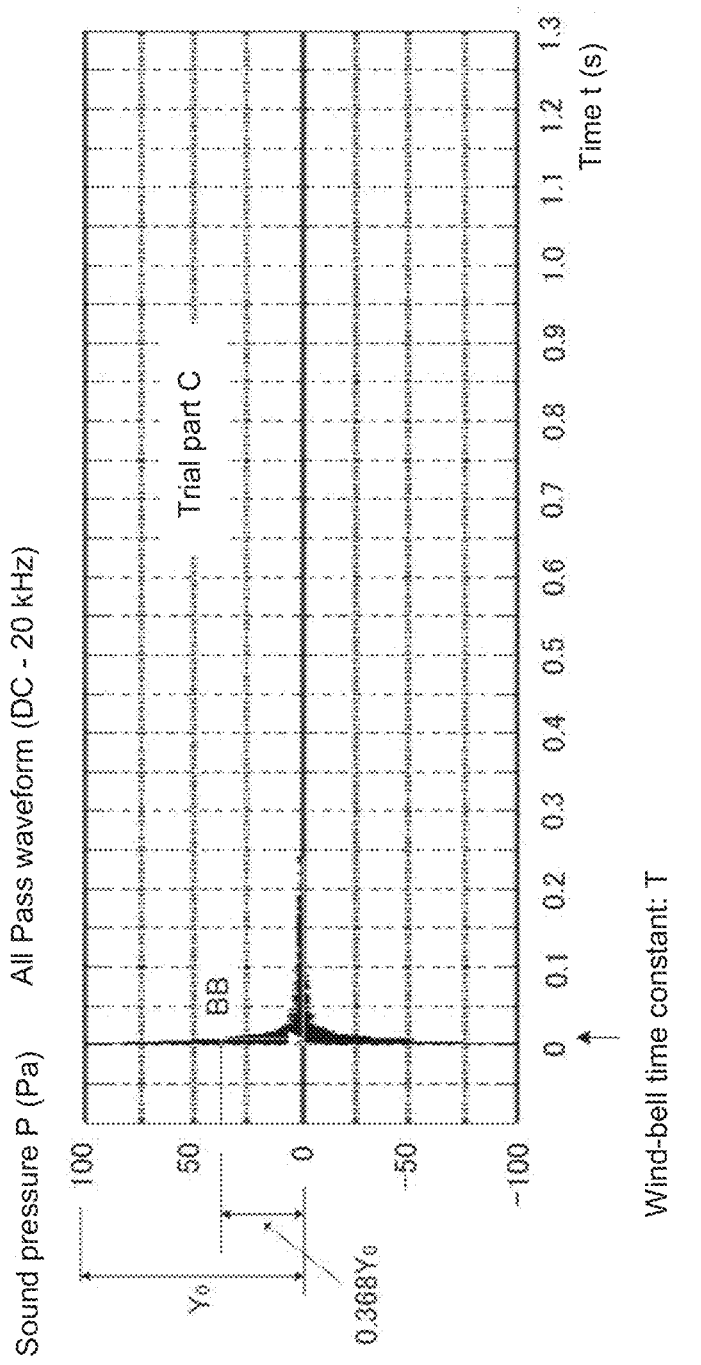
FIG. 15 is a graph illustrating impulse response characteristics of a trial part C.
Figure 16:
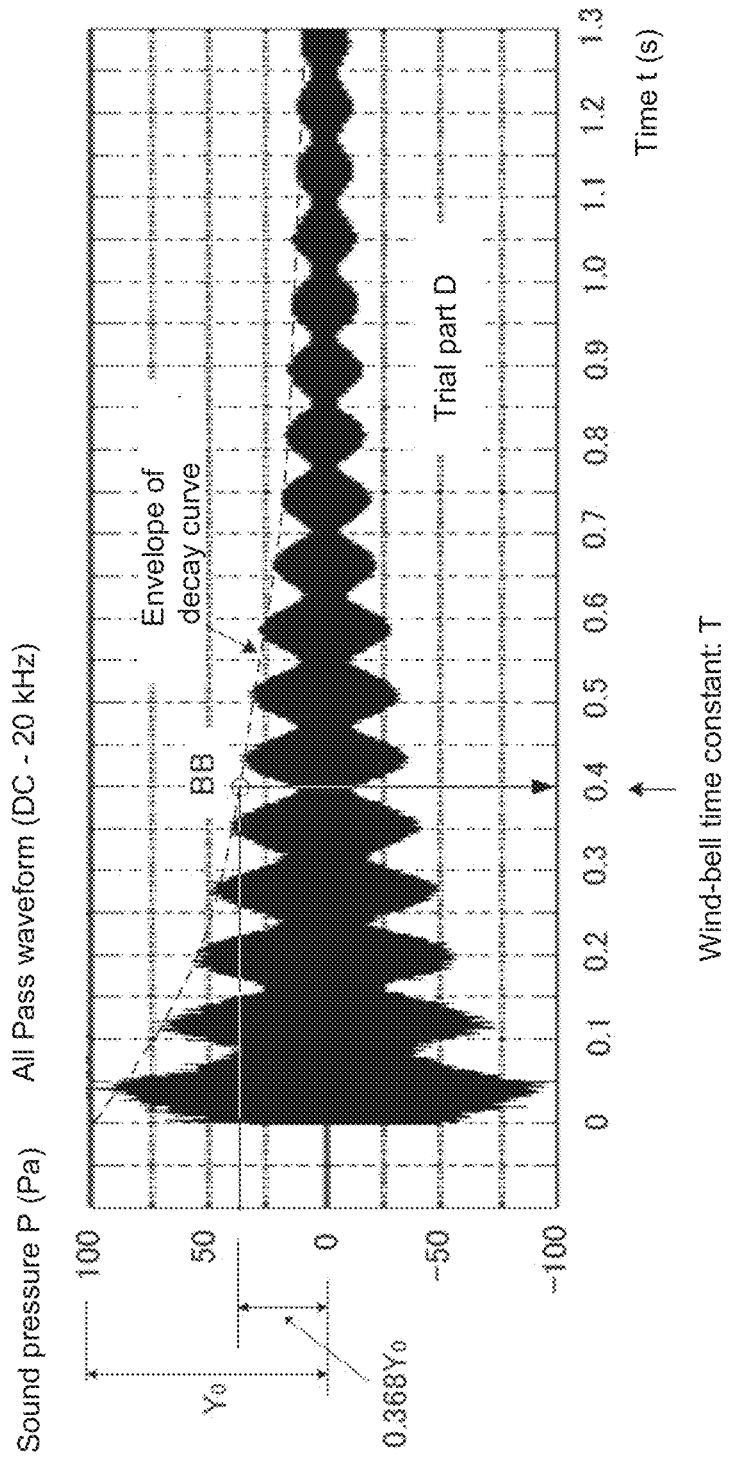
FIG. 16 is a graph illustrating impulse response characteristics of a trial part D

[1-4-5] Supplement (1) Impulse Response Characteristics Upon Change Of Material For Upper Sleeve In the following, impulse response characteristics upon change of a material (trial part B to D) for the upper sleeve (resonant member) are illustrated in FIGS. 14 to 16. Also, results of obtaining wind-bell time constants of the respective trial parts including the above-described experimental result (trial part A) are listed in Table 4.

TABLE 4

| Trial part | Wind-bell time constant T | Material |
|---|---|---|
| A | 0.25 seconds | Free-cutting brass steel (Cu: 59%, Pb: 2.7%, Fe + Sn: 1.2%, Zn: other) |

TABLE 4-continued

| Trial part | Wind-bell time constant T | Material |
|---|---|---|
| B | 0.09 seconds | Cu alloy (large amount of impurities) |
| C | 0.01 seconds or less | Duracon (industrial plastic) |
| D | 0.40 seconds | Phosphor bronze (Cu: 89%, Sn: 10.5%, Fe: 0.05%, Zn: other) |

In the case of the trial part B (FIG. 14), the wind-bell time constant T is small as compared with the trial part A (FIG. 12), also no beat is observed in an envelope of a decay curve. What is notable is the impulse response characteristics (FIG. 16) of the trial part D (phosphor bronze), which has the largest wind-bell time constant among the trial parts, i.e., T=0.4 seconds, and has beats having a large amplitude. A percentage of tin Sn content of the trial part A (free-cutting brass steel) is less than 1.2%, whereas the phosphor bronze is a copper alloy having a tin Sn content percentage of 10.5%. A "Sahari" material known for the Odawara wind-bell is a copper alloy containing tin Sn having a content percentage of 20% or more. Incidentally, a wind-bell is not a culture unique to Japan, and the wind-bell history is long and present all over the world. A deep tone having a sense of transparency and sounds having a lingering sound produced by a wind-bell echoes long, and every time the wind blows, a wind-bell echoes thinly and dignifiedly. In the case of using a copper alloy for a wind-bell, as a content percentage of tin Sn is increased, a longer wind-bell time constant and beats having larger amplitude are obtained. As will be described later, it turns out that the presence of moderate beats (fluctuation) observed in the impulse response characteristics of some of the wind-bell members provides senses of mellifluousness and fruitfulness to reproduced sound. Accordingly, by using a copper alloy for the wind-bell member to set a content percentage of tin Sn, a sense of spatial extent, and the senses of mellifluousness and fruitfulness added to reproduced sound can be adjusted.

(2) Comparison Between Eigenvalue Analysis Result and Experiment

FIGS. 17 to 20 are diagrams illustrating results of using the numerical analysis model illustrated in FIG. 3 to make an eigenvalue analysis for the upper sleeve (trial part A) used in the above experiment. In the following, vibration modes that dominantly appear when the lateral side of the upper sleeve (resonant member) is excited (the above impulse excitation experiment) are described. FIG. 17b is a diagram illustrating a primary resonance mode (f=3880 Hz in the analysis) in which the opening part of the wind-bell is deformed in the "elliptical shape", which corresponds to the resonance at f=3500 Hz in the experimental result illustrated in FIG. 11. FIG. 18b is a diagram illustrating a resonance mode (f=9700 Hz in the analysis) in which the opening part of the wind-bell is deformed in the "trefoil shape", which corresponds to the resonance at f=8500 Hz in the experimental result. FIG. 20b is a diagram illustrating a resonance mode (f=17100 Hz in the analysis) in which the opening part of the wind-bell is deformed in the "cross shape", which corresponds to the resonance at near f=16000 Hz in the experimental result. The reason why the eigenvalues in the analysis result are higher than those in the experimental result is considered to be because of difference in constraint condition, i.e., in the experiment (FIG. 9), the center of the upper sleeve is supported by a point of the spike, whereas in the analysis model (FIG. 3), the assumption that the upper sleeve is supported by points of the four springs is used. Also, resonance modes (f=15100 to 17100 Hz in the analysis) illustrated in FIGS. 19b to 20c are considered to correspond to resonances in the range of f=16000 to 17000 Hz where in the experimental result, resonant peaks are concentrated.

Meanwhile, the vibration modes causing the resonant peaks corresponding to the Z axial displacements obtained in the frequency response analysis in Section [1-3] are different from those in the above-described case where the lateral side of the resonant member is excited. In this case, a vibration mode that largely deforms the upper surface (load support part 102 in FIG. 3) of the upper sleeve causes a resonant peak corresponding to Z axial displacement. For example, $f=f_0=46.5$ Hz in FIG. 17a corresponds to the rigid body vibration mode that is determined by the mass $M_W$ of the upper sleeve and the static stiffness $K_Z$ of the spring coil. f=4870 Hz in FIG. 17c, f=7490 Hz in FIG. 18a, and the like correspond to modes that largely deform the upper surface of the upper sleeve, which agrees with the result of the frequency response analysis (FIG. 5).

[1-5] Wind-Bell Characteristic Conditions to be Met by Resonant Member

Here, the following acoustic characteristics of the resonant member (in the case of the first embodiment, the upper sleeve 1) are defined as the "wind-bell characteristics" for audio. Specific numerical limitation values are assumed to be obtained from the condition of the impulse excitation experiment on the single body of the wind-bell member (the above upper sleeve) illustrated in FIG. 9.

(1) At a Frequency $f_1$ of a Fundamental Tone or Higher Frequencies, Many Resonance Points Respectively Having High Peak Values are Present.

A wind-bell has a plurality of tones respectively having resonant frequencies. Among the tones having the resonant frequencies, a tone that has the lowest frequency and longest lingering sound is the fundamental tone of the wind-bell. In the case where k=1 is set to correspond to the frequency $f_1$ of the fundamental tone, the wind-bell preferably has, in the range meeting the fundamental tone frequency $f_1<f<20000$ Hz, a plurality of (e.g., k=3 or more) harmonic tone components (resonant frequencies) of which sound pressures or vibration levels respectively have effective peak values. The presence of many resonance modes (harmonic tones) in the high frequency range largely improves the sense of localization (sense of focus) and resolution of a sound image in stereo reproduction. Also, as a wind-bell has more resonance modes, more natural sound without any peculiarity can be obtained. Differently from the conventional hard insulator that is configured to obtain various frequency characteristics by stacking a plurality of expensive and difficult-to-process members such as quartz and titanium, the present invention insulator can set the number and distribution of resonant frequencies by changing a shape of the resonant member. The frequency range of 15000 to 20000 Hz often exceeds the human audible range; however, it is known that even in the case where harmonic tone components of a music instrument are present in the audible or higher range, they have a considerable influence on quality of reproduced sound. Accordingly, it can be considered that a resonant peak present in the range of 15000 to 20000 Hz is effective in improving the sense of localization and resolution of a sound image in stereo reproduction. As such an effective resonant peak, it is only necessary to select one that has a coherence of $\gamma \approx 1$ and a significant peak value through, as a basic model, the experiment in FIG. 6 where the vibration transfer characteristics of the insulator main body are obtained.

(2) A Wind-Bell Time Constant T is Set to an Appropriate Value According to a Genre of Reproduced Music.

Note that an important wind-bell characteristic condition to be met by the resonant member is that the wind-bell time constant T has an appropriate value. As a result of the preview experiment, it has turned out that the lingering sound of the wind-bell (upper sleeve) brings the sense of spatial extent (sense of depth, sense of presence) to reproduced sound. This is the most important finding found by the present study. In any of the conventional insulators including the hard material type and the floating type, the idea that regards a part constituting the insulator as a wind-bell, and uses lingering sound of the wind-bell for improving the "sense of spatial extent" is absent. On the basis of this effect, in stereo reproduction, magnificent orchestra space is separated from a speaker and appears behind the speaker, which is spread as a deep and holographic image. From many preview experimental results, in the case where a material and shape of the resonant member are selected to meet T>0.05 seconds, as compared with the case of a little lingering sound (e.g., in the case of the material C in Table 4 and T≈0), the effect of obviously improving the "sense of spatial extent" is obtained. Further, in the case of T>0.1 seconds, regardless of a music genre, the effect is sufficiently satisfactorily obtained. As a result of repeating the speaker preview experiment, it has turned out that an appropriate value is present in setting of the wind-bell time constant T depending on a music genre reproduced by an audio device. In general, in the case of classic music played in a spacious concert hall, it is preferable to set the wind-bell time constant larger. On the other hand, in the case of jazz music that is often played in a relatively narrow hall, it is preferable to set the wind-bell time constant T slightly smaller. Generally speaking, in classic, live echo is preferred, whereas in jazz, dead echo is preferred.

For example, according to a literature reference (Shinichiro Ishii, Listening Room Acoustics (Standing wave theoretical room acoustics), Seibundo Shinkosha Publishing Co., Ltd., 2009), a ratio of a sound absorbing wall to a total room area in a listening room is 17% for classic, 22% for jazz, and 27% for home theater.

In order to obtain the resonant member of which the wind-bell time constant T has an appropriate value, the selection of a material is key. As listed in Table 4, in the case of the trial part A, the free-cutting brass steel that is a copper alloy is used. As described in the experimental result (FIG. 16) on the trial part D (phosphor bronze), a copper alloy having a larger tin content percentage can make the wind-bell time constant T larger.

(3) The Fundamental Tone Frequency $f_1$ of the Resonant Member is Set within an Appropriate Range.

A wind-bell has tones respectively having a plurality of frequencies. Among the tones having the frequencies, a tone that has the lowest frequency and longest lingering sound is the fundamental tone of the wind-bell. Tones having frequencies equal to substantially integral multiples of the frequency of the fundamental tone are harmonic tone components. The frequency (primary resonant frequency) of the fundamental tone corresponds to, for example, in the embodiment illustrated in FIG. 1, the resonance mode in which the opening part of the wind-bell (upper sleeve 1) is deformed in the "elliptical shape". The range where the assist action by the resonant member in the high frequency range works is a range meeting f>$f_1$. That is, in the case of sweeping a frequency from a low range to a high range, as indicated by the result (FIG. 4) of the frequency response analysis, the frequency $f_1$ is a start point of the assist action. In the result of the speaker preview experiment with many listeners, it is pointed out that in the case where the fundamental frequency $f_1$ of the wind-bell is too low, a peculiar eigentone becomes harsh in a high range depending on the genre of reproduced music. In the case of setting the fundamental frequency so as to meet $f_1$>1500 Hz, a result satisfiable by many of the listeners is obtained, and in the case of setting the fundamental frequency to a higher frequency meeting $f_1$>2500 Hz, an extremely natural echo approved by almost all of the listeners is obtained.

Incidentally, in an investigation that identifies aurally harsh noise, it is reported that noise making a person feel most uncomfortable is peak noise in the range of 3000 to 4000 Hz where the sense of hearing is particularly sensitive. Also, in sound insulation (silent) characteristics targeted by a damping/muting material, a frequency range to be reduced as harsh sound is regarded as 1500 to 4500 Hz. The reason why even in the case of setting a lower limit of the fundamental frequency $f_1$ of the wind-bell relatively low as compared with such frequencies, the wind-bell is aurally trouble-free is as follows. If music reproduced by an audio device (e.g., a speaker) is directly sounded, an increase in sound pressure level due to a resonant peak with respect to the direct sound has a value that is inaudibly weak by itself. The weak increase in sound pressure level assists the excellent human sense of hearing as the effect of improving senses of localization and stereophony of a sound image.

An upper limit of the fundamental frequency $f_1$ of the wind-bell is as follows. As described above, in order to improve the sense of localization and resolution of a sound image in stereo reproduction, up to a tertiary (k=3) or higher resonance mode is preferably included in the audible range. If with reference to the eigenvalue analysis result [1-4-3], on the assumption that a human audible range value is 20000 Hz, the upper limit of the fundamental frequency (primary) with the tertiary resonance mode being included in the range equal to or less than 20000 Hz is obtained, $f_{MAX}$=4800 Hz. Accordingly, it is only necessary to set the fundamental frequency so as to meet $f_1$<4800 Hz. The fundamental frequency $f_1$ of the resonant member is, taking the first embodiment (FIG. 1) as an example, determined by a thickness and material of the upper sleeve 1. In the case of the same material, as the thickness (an average value of a difference between an external radius and an internal radius) of the upper sleeve is increased, or a length L is decreased, $f_1$ increases. In the case of the same shape, a material having a larger longitudinal elastic modulus results in a higher $f_1$.

(4) An Envelope of an Impulse Response Waveform has Moderate "Beats".

When a pure tone at a frequency $f_n$ and a pure tone at a frequency $f_{n+1}$ very close to $f_n$ are superimposed on each other, at a frequency $\Delta f = f_{n+1} - f_n$, an envelope of a waveform is changed to give rise to primary beats. Also in the case where a ratio between two frequencies is close to an integer, high-order beats having a frequency $\Delta f = m f_{n+1} - n f_n$ occurs. As the result of the speaker preview experiment, it has turned out that the presence of moderate beats (fluctuation) caused by the resonant member provides the senses of mellifluousness and fruitfulness to reproduced sound.

Incidentally, it is known that given that a frequency of a wave included in beats is f, a 1/f fluctuation is present in human biological rhythm or nature. It is said that a wavelength of the 1/f fluctuation acts on the brain through the sense of hearing, and adjustment of autonomic nerves of the brain stabilizes feelings and emotions.

In order to obtain the above-described "wind-bell characteristic conditions to be met by the resonant member", a material for the resonant member is preferably selected from materials having an intrinsic acoustic impedance meeting $z>10^7$ Ns/m³ (see Table 5). However, because listeners' tastes for sound are various, the material applied to the resonant member is not limited, and as in the case of the hard material insulator, it is only necessary to tune reproduced sound with use of characteristics of an acoustic material.

[1-6] Measurement of Vibration Blocking Characteristics in Low Frequency Range

Figure 21:
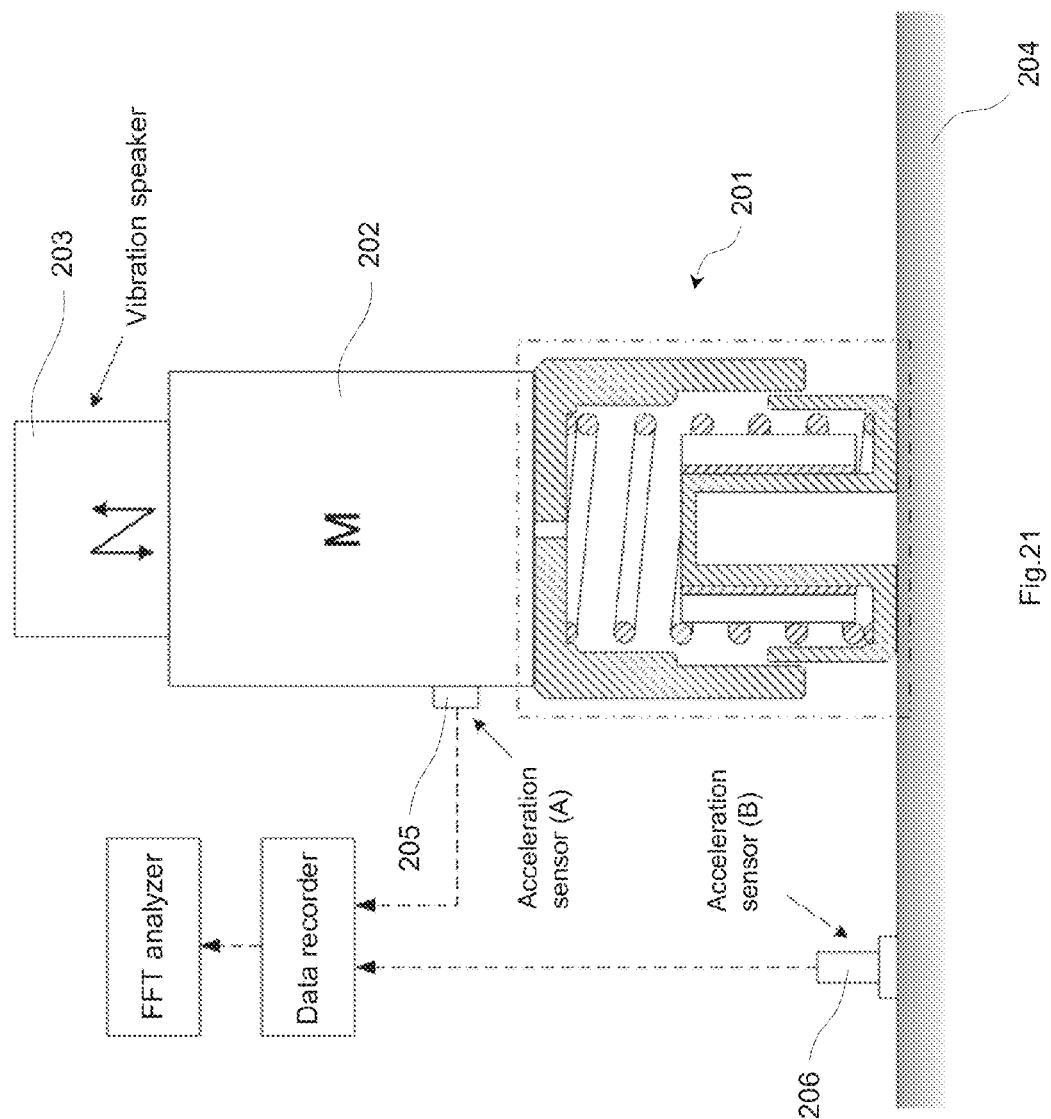
FIG. 21 is a model diagram illustrating an experimental method for obtaining a vibration blocking effect of the insulator in a low frequency range.
Figure 22A:
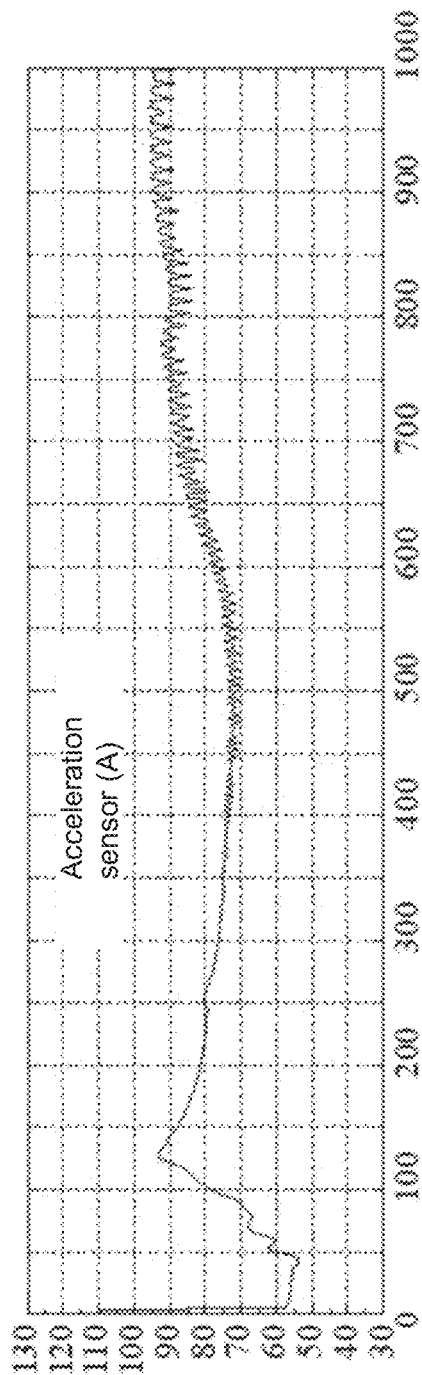
FIG. 22a is a graph illustrating a vibration level detected by an acceleration sensor (A) placed on the present invention insulator.
Figure 22B:
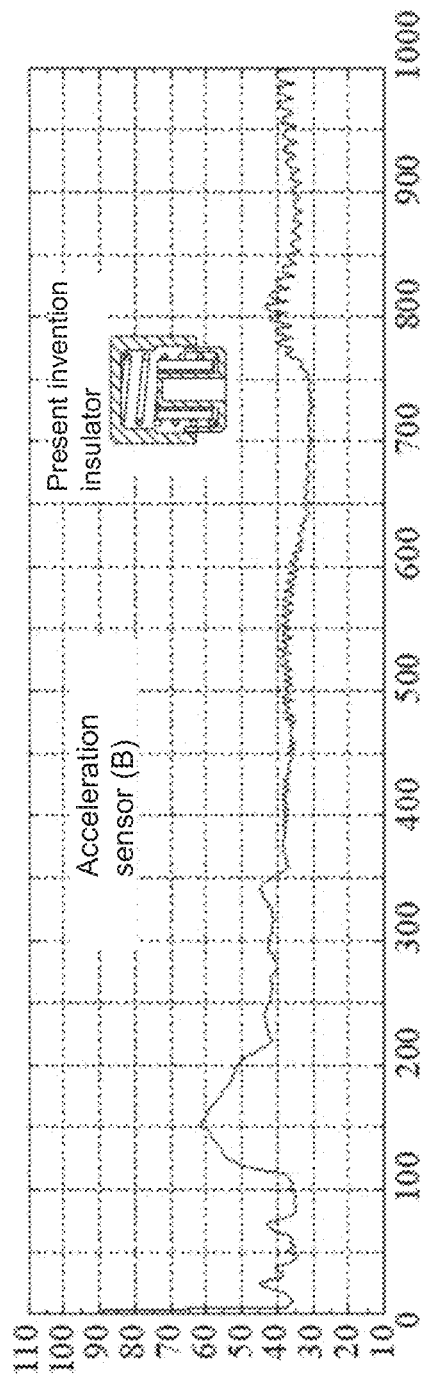
FIG. 22b is a graph illustrating a vibration level detected by an acceleration sensor (B).
Figures 23A, 23B:
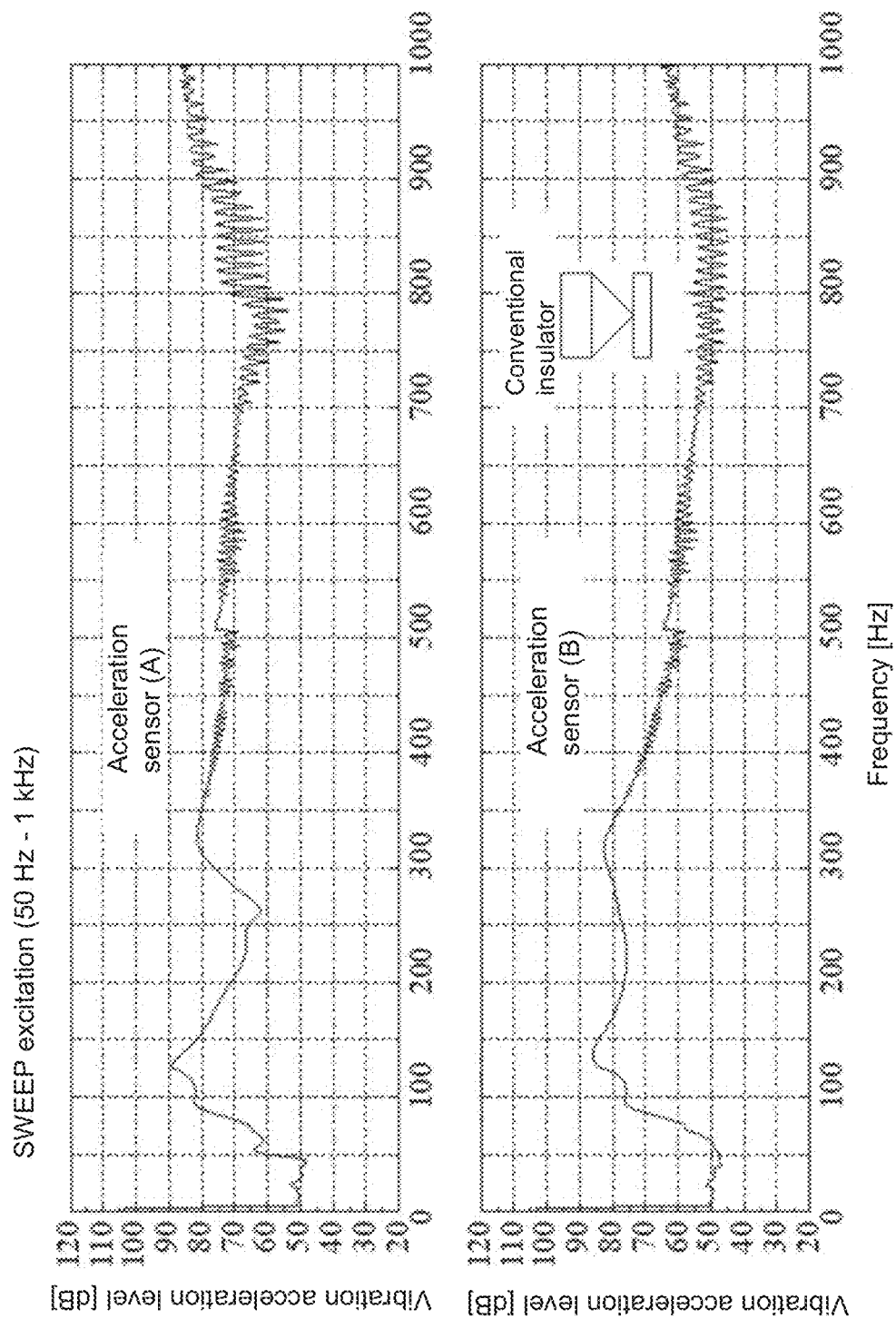
FIG. 23a is a graph illustrating a vibration level detected by the acceleration sensor (A) placed on a conventional spike type insulator.
FIG. 23b is a graph illustrating a vibration level detected by the acceleration sensor (B).
Figure 24:
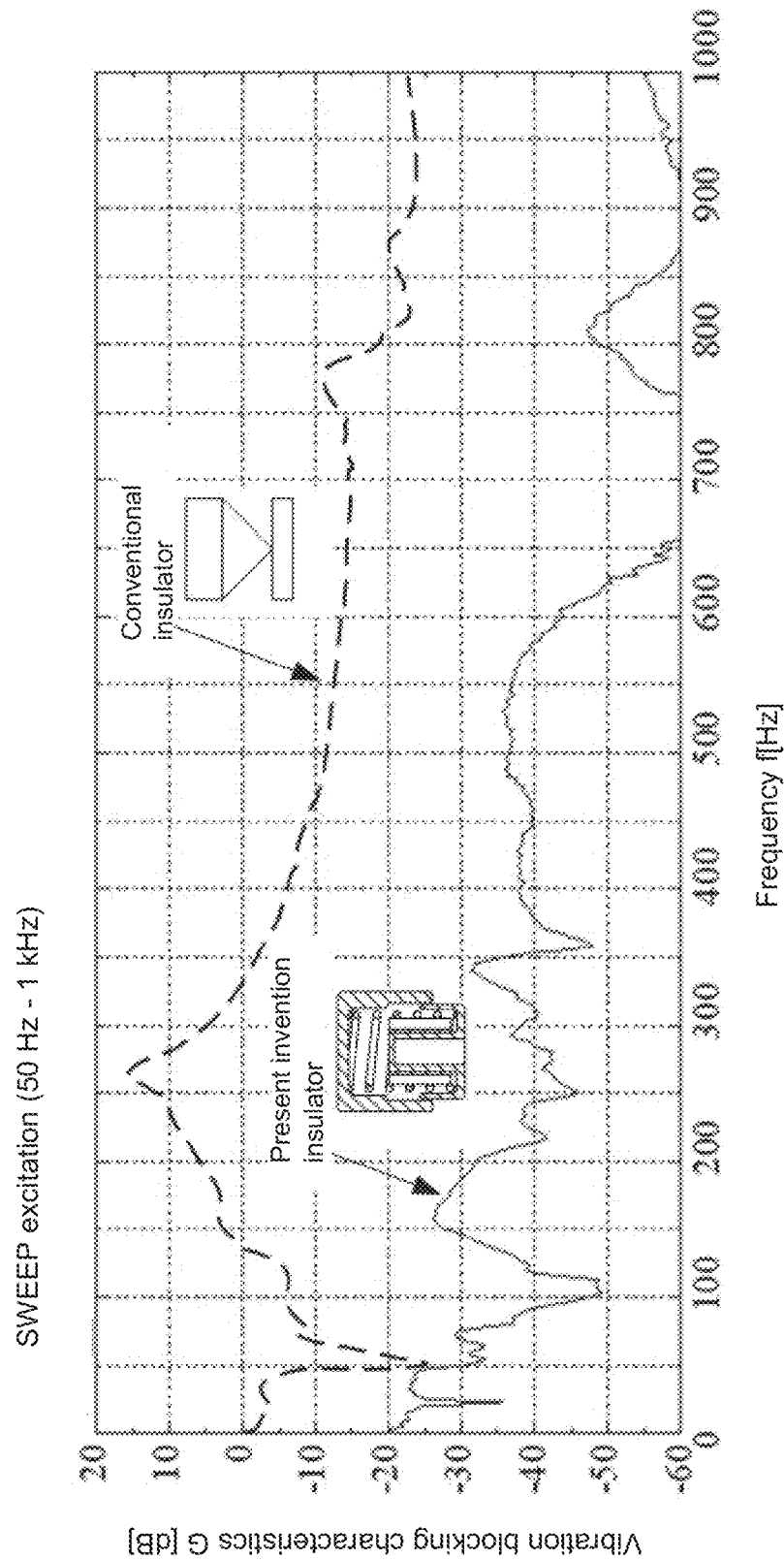
FIG. 24 is a graph in which FFT-processed vibration blocking characteristics of the present invention insulator with respect to a frequency are obtained on the basis of comparison with those of the conventional spike type insulator.

A method for an experiment made in order to obtain the vibration blocking effect of the present invention insulator in the low frequency range on the basis of comparison with a conventional insulator is illustrated in FIG. 21. Reference numeral 201 represents a trial insulator, 202 represents a weight mounted on the trial insulator, 203 represents a vibration speaker attached on the weight, 204 represents a floor surface, 205 represents an acceleration sensor (A) attached on a lateral side of the weight 202, and 206 represents an acceleration sensor (B) placed on the floor surface 204. The present invention insulator used in the present experiment has the same specifications as those of the insulator used in the experiment in FIG. 6 where the impulse response is obtained. Further, the points that a load mass of the weight 202 is M=4.5 kg and the acceleration sensor (B) is placed on the floor surface 20 mm apart from the lateral side of the insulate are also the same conditions as those for the experiment in FIG. 6. The conventional insulator (detailed structure is not illustrated) is one that has already been commercialized as the spike type. The vibration speaker 203 used as an excitation source for the insulator is one that does not have an enclosure by itself and transfers a music signal or the like to a hard flat plate through vibration. By using the vibration speaker as the excitation source, an adequate frequency measurement range where the insulator for audio is to be evaluated can be set. Also, it is not necessary to provide a pressurized structure like a structure of a piezo actuator, and it is only necessary to mount the speaker on an excitation target (e.g., the upper sleeve, or the weight mounted on the upper sleeve). FIG. 22 illustrates FFT-processed vibration acceleration characteristics of the present invention insulator with respect to a frequency in the case where a sine sweep signal with f=50 Hz to 1000 Hz is provided to the vibration speaker to excite the present invention insulator. FIG. 22a illustrates a vibration level $X_A$ that is detected by the acceleration sensor (A) 205 attached to the weight 202, and FIG. 22b illustrates a vibration level $X_B$ that is detected by the acceleration sensor (B) 206 placed on the floor surface 204. FIG. 23 illustrates results of the experiment made under the same conditions with the trial insulator being replaced by the conventional insulator (spike type). FIG. 24 is a graph in which transfer functions of $X_B$ relative to $X_A$, i.e., $G(s)(=X_B/X_A)$ are obtained, and illustrates the vibration blocking effect that suppresses vibration applied to the trial insulator from propagating to the floor surface.

(1) In the case of the present invention insulator, in the range of f=50 Hz to 600 Hz, the vibration blocking effect having the range of −30 dB to −40 dB is obtained, and also in the range of f>600, the vibration blocking effect having −50 dB or less is obtained.

(2) In the case of the conventional spike type insulator, at near f=260 Hz, a peak value of +15 dB is present. Also, up to near f=350 Hz, the vibration blocking characteristics is G>0, and therefore the vibration blocking effect cannot be obtained.

(3) At f=1000 Hz, the present invention insulator has the vibration blocking effect that is larger by approximately −30 dB than that of the conventional spike type.

Incidentally, in this experimental method, in order to obtain the vibration blocking characteristics of the present invention insulator, the vibration speaker is used as the driving source with limitation to the low frequency range (50 Hz to 1000 Hz). If a driving source having flat output characteristics up to the high frequency range, e.g., a giant magnetostrictive speaker, is used, the vibration blocking characteristics over a wider frequency range can be obtained with use of this experimental method.

[1-7] Summary of Vibration Analysis Results and Experimental Results

Features of the vibration transfer characteristics of the insulator of the present embodiment can be summarized as follows from the vibration analysis results in Section [1-3], the experimental results in Section [1-6] where the vibration blocking characteristics in the low frequency range are measured, and the experimental results in Section [1-4] where the vibration blocking characteristics in the high frequency range are obtained on the basis of the impulse response.

That is, among the plurality of resonant frequencies of the single body of the resonant member (upper sleeve 1 in FIG. 1), a tone having the lowest frequency and the longest lingering sound is set as the fundamental tone having the frequency $f_1$. In the results of the experiment illustrated in FIG. 6, the frequency of the fundamental tone is $f_1$=3500 Hz. This frequency $f_1$ is the lowest-order resonant frequency due to elastic deformation of the resonant member in the broad sense. The resonant frequency due to the rigid body mode determined by the spring stiffness $K_Z$ (8.13 N/mm) of the acoustic material and the mass M (4.5 kg) of the audio device mounted on the insulator is set as $f_0$. In this case, $f_0$=6.77 Hz. In the insulator of the present embodiment, the vibration characteristics (FIG. 4) of the upper sleeve at the time when the upper sleeve is excited can be configured not to have any resonance point in the range between the resonant frequency $f_0$ and the resonant frequency $f_1$.

That is, the above vibration analysis results and the experimental results are:

(i) In the low frequency range ($f_0<f<f_1$), the vibration transfer between the audio device and the floor surface is blocked, and (ii) On the other hand, in the high frequency range ($f>f_1$), the vibration characteristics of the resonant member assists the high frequency vibration transfer.

It is examined by a specific means (FIG. 1) that the above (i) and (ii) that are basic concepts of the insulator of the present embodiment can be simultaneously achieved. Further, given that a lower limit of the human audible range is 20 Hz, the resonant frequency $f_0$ is preferably set so as to meet $f_0<20$ Hz.

In the insulator of the present embodiment (FIG. 1), for the vibration propagation path $\Phi_Z$ of "upper sleeve 1→lower sleeve 2", only the materials having small damping properties and high intrinsic acoustic impedances are used, and therefore the insulator has characteristics of a "highpass filter" that blocks vibration in the low frequency range and passes the vibration of the resonant member in the high frequency range. Most of many mechanical parts such as rubber, mass and spring, and damper have characteristics of a "lowpass filter" that passes vibration in the low frequency range and blocks the vibration in the high frequency range. In general, a combination of a mechanical element having the highpass filter characteristics and the mechanical element is not present. In this regard, the insulator of the present embodiment has the vibration transfer characteristics that are extremely special. Note that the highpass filter characteristics in the first embodiment correspond to a sufficient condition for obtaining the wind-bell effect, but do not correspond to a necessary condition. This will be described later in Supplement (1).

[1-8] Supplementary Description of First Embodiment

Supplement (1) Regarding the highpass filter characteristics in the vibration propagation path $\Phi_Z$ A mechanism for the vibration transfer of the insulator in the first embodiment is supplementarily described with reference to FIG. 1. In the case where the spring coil 5 having the thick wire diameter is regarded as the "sound tube" having a uniform cross section, the high frequency acoustic vibration generated by the audio device propagates from the load support part 8 into the spiral sound tube as indicated by an arrow 11. Here, a path of "audio device (not illustrated)→load support part 8 of upper sleeve 1→sound tube (spring coil 5)→lower sleeve 2→placement surface 9" through which the vibration transfers is, as described above, defined as the vibration propagation path $\Phi_Z$. In the embodiment, for the both members 1 and 2, metal (brass) having the large intrinsic acoustic impedance z that is of the same level as that of an intrinsic acoustic impedance of the spring coil 5 (copper) is used such that a sound wave entering from the load support part 8 can smoothly transmits into the sound tube (spring coil 5) and further propagate to the placement surface 9. Incidentally, given that p is a density of a medium, and c is a sound velocity, an intrinsic acoustic impedance is $z=\rho c$. Also, the vibration propagation path $\Phi_Z$ in the same embodiment is configured such that without making a material such as rubber or resin having a large damping property and small intrinsic acoustic impedance intervene, the high frequency vibration generated by the audio device transfers to the spring coil 5 only through the metallic material.

Table 5 lists a reference example of intrinsic acoustic impedances of various materials.

TABLE 5

| Medium | Intrinsic acoustic impedance (Ns/m³) |
| --- | --- |
| Copper | $3.90 \times 10^7$ |
| Aluminum | $1.44 \times 10^7$ |
| Brass (70 Cu, 30 Zn) | $3.37 \times 10^7$ |
| Natural rubber | $1.21 \times 10^6$ |
| Polyethylene | $1.76 \times 10^6$ |
| Concrete | $8.10 \times 10^6$ |

On the basis of this configuration, as indicated by the experimental result in FIG. 8a, the high frequency vibration having many resonance points is propagated from the audio device to the placement surface 9 through the sound tube 5. Here, the following assumptions are made:

(1) Between an upper surface of the spring coil 5 and the upper sleeve 1, a material (e.g., viscoelastic rubber) having a sufficiently large damping property is made to intervene.
(2) Between a lower surface of the spring coil 5 and the lower sleeve 2, the above material having the sufficiently large damping property is made to intervene.

In the case of the above (1), the wind-bell member (upper sleeve 1) and the above material (viscoelastic rubber) are brought into direct contact with each other to damp the high frequency vibration of the wind-bell member, and therefore the wind-bell effect is obviously reduced. In the case of the above (2), the high frequency vibration propagates to the lower surface of the spring coil 5, but does not transfer to the placement surface 9. For example, in the case of the experiment illustrated in FIG. 6, any vibration cannot be detected from the acceleration sensor (B) 155, and the wind-bell effect of the lower sleeve 2 cannot be expected. Also, an influence is exerted so as to damp the high frequency vibration of the upper sleeve 1 on an upstream side of the vibration propagation. In the cases of the above (1) and (2), the vibration transfer characteristics from the load support part 8 to the placement surface 9 has no highpass filter characteristics. In short, in order to use the mechanical spring (spring coil) as an acoustic material to make the wind-bell member easily excite the high frequency vibration, it is best for the respective members forming the vibration propagation path $\Phi_Z$ to use materials having small damping properties and high intrinsic acoustic impedances at the same level, specifically, materials having $z > 10^7$ Ns/m³. Note that the vibration system $\Phi_R$ of the wind-bell is present in parallel with the vibration system $\Phi_Z$, and therefore even in the case where in the vibration propagation path, a material having a large damping property intervenes, a resonance phenomenon of the wind-bell member (upper support member mounted with the audio device) is present, so that the wind-bell effect is obtained to some extent. In the case of, as the elastic member, using an air type that is used as the floating type insulator and seals air therein, or a magnet type that uses repulsive force based on magnetic force, a gap part intervenes in the vibration propagation path $\Phi_Z$, and therefore the vibration transfer characteristics from the load support part to the placement surface have no highpass filter characteristics. However, vibration damping performance of the gap part is low, so that the resonance phenomenon of the wind-bell member is not lost and the wind-bell effect can be obtained as in the case of using the spring coil.

Supplement (2) Fall Prevention

Even in the case where an impulsive horizontal disturbance load due to an earthquake or the like is applied to the audio device mounted on the insulator, the insulator for audio illustrated in FIG. 1 according to the first embodiment can minimize a tilt of the audio device to prevent the audio device from falling with use of the long tubular sleeve (resonant member) provided in order to obtain the above-described "wind-bell effect".

FIG. 25 is a model diagram illustrating a size relationship between the speaker and the insulator. $\delta$ is defined as a gap between the upper sleeve 1 (upper support member) and the lower sleeve 2 (lower support member), R as a radius of the lower sleeve 2, $\Phi$ as a tilt angle of the speaker 20, and $L_S$ as a height of the speaker 20. Also, from FIG. 1, L represents a length between the opening end 10 of the upper sleeve 1 at the time of mounting the speaker and the upper surface of the spring coil. L is defined as a tubular sleeve effective length. The gap $\delta$ between the upper sleeve 1 and the lower sleeve 2 is expressed by:

$$\delta = \sqrt{R^2 + L^2} \sin\phi \cos\alpha = L \sin\phi \quad \text{[Expression 3]}$$

where $$\cos\alpha = L/\sqrt{R^2 + L^2}.$$

An eccentric amount of the central part of an upper surface of the speaker is expressed by the following expression.

$$Y = L_s \sin\phi = \frac{L_s}{L}\delta \quad \text{[Expression 4]}$$

Accordingly, in Expression (4), if the gap is brought close to zero, i.e., $\delta \to 0$, the eccentric amount Y of the upper surface of the speaker can be made as small as possible even in the case where the disturbance load is applied. For this purpose, it is necessary to, with the spring coil 5 being attached to the both sleeves 1 and 2, accurately align the axes of the both sleeves 1 and 2 with each other. However, in order to accurately obtain parallelism and outside diameter concentricity between the both end surfaces of the spring coil that is an elastic body, there is a limitation in terms of processing. For this reason, to decrease the gap δ, there is a practical limitation. However, from Expression (4), by increasing the length L of the tubular upper sleeve 1, the limitation in processing accuracy of the spring coil can be compensated for. On the other hand, in order to the above-described "wind-bell effect", the upper sleeve preferably has the length L that is sufficiently long. That is, by increasing the length L of the upper sleeve, (1) decreasing a tilt amount of the speaker when a disturbance load is applied, and (2) obtaining the sufficient wind-bell effect can be simultaneously met. Given here that an allowable value of a maximum eccentric amount is denoted by $Y_0$ and an allowable tile amount is defined as $Y_0/L_S$, the following expression holds, and therefore δ/L can be set so as to meet Expression (5).

$$\frac{\delta}{L} \le \frac{Y_0}{L_s} \qquad \text{[Expression 5]}$$

Under the condition that several types of speakers respectively having different heights $L_S$ were mounted on the present insulator and a large horizontal disturbance load is applied to the speakers, stability/safety was evaluated. As a result, when X/L is set to meet X/L≤0.03, there is no practical problem, and the speaker main bodies are quickly restored to their normal postures. For example, given that $L_S$=1000 mm, $Y_0$=30 mm, and L=60 mm, $Y_0/L_S$=0.03, δ/L≤0.03, and δ≤1.8 mm. Also, when δ/L is set so as to meet δ/L≤0.02, a result without any problem is obtained. Further, as a result of an evaluation experiment on many audio files, even in the case where specifications (height, placement area, mass, and the like) of the speaker applied with the present insulator are changed, by setting the gap so as to meet δ≤1.0 mm, there is almost no trouble in practice even when the speaker is replaced. Opposite to the present embodiment, the present invention may be configured such that the lower sleeve 2 caps the upper sleeve 1. In the case where in a radial direction gap between the both sleeves 1 and 2, a soft elastic body for preventing dust from intruding is made to intervene, if the elastic body has no effect in preventing the mounted object from tilting, the size δ is defined as the gap between the both sleeves 1 and 2. In the gap between the both sleeves 1 and 2, another member having, for example, a ring shape may be made to intervene, and in short, it is only necessary to be effective in preventing the mounted object from tilting. The structure of the insulator described in the present embodiment can ensure the stability/safety in placing a device against a disturbance load even in the case of being applied to an audio device other than the speaker, such as an analog player, a CD player, or an amplifier. In this case, an allowable upper limit of δ/L may be larger; however, if the above-described constraint condition for δ/L is applied, it is safer.

[Second Embodiment]

FIG. 26 is a front cross-sectional view of an insulator for audio according to a second embodiment of the present invention, and illustrates the case where a mechanism for finely adjusting a height of the insulator is provided.

Reference numeral 251 represents an insulator main body part, 252 represents a lower sleeve (lower support member), and 253 represents a lower base part (base part), which is attached to the lower sleeve 252 through a screw part 254. A single body of a speaker having a voice coil and a permanent magnet is typically placed on a front side of the main body, and therefore the position of the center of gravity of the speaker main body is often eccentric toward the front side. In the case of attaching the present insulator, the speaker main body is placed with being tilted although an amount of the tilt is small. In this case, by using the screw part 254 provided between the lower base part 253 and the lower sleeve 252, and correcting the height of the insulator on the basis of the adjustment of a size H (FIG. 26), a reset can be performed so as to minimize an angle of the tilt. In the embodiment, the lower sleeve 252 is provided with the lower base part 253 for making the fine adjustment to the height; however, a member corresponding to the lower base part may be provided on the upper sleeve side. Also, in the case of arranging three insulators on a bottom surface of the speaker to support the speaker main body, support loads applied to the respective insulators are considerably different. Even in this case, a function of adjusting the height that the insulator of the present embodiment has can be applied. The present insulator provided with the height adjustment function can also be applied to an analog player, a CD player, and the like.

[Third Embodiment]

FIG. 27 is a front cross-sectional view illustrating an insulator for audio according to a third embodiment of the present invention and a method for supporting an audio device. FIG. 28 is a front cross-sectional view illustrating a state where the audio device is supported through a spike placed on the audio device side. Reference numeral 901 represents an upper sleeve (upper support member), 902 represents a lower sleeve (lower support member), 903 represents a tubular part that is formed in the central part of the lower sleeve 902 with protruding, 904 represents a surging prevention member, 905 represents a spring coil, and 906 and 907 represent spring coil aligning parts. Reference numeral 908 represents a spike tip receiving part, which is formed in the central part of the upper sleeve 901. Reference numeral 909 represents a through-hole that is formed in the central part of an upper end of the tubular part 903, and 910 represents a bolt that is fastened to the upper sleeve 901 with passing through the through-hole. When the present insulator is not applied with any load (FIG. 27), a head part 911 of the bolt 910 having a larger diameter than the through-hole 909 serves as a stopper to prevent the upper and lower sleeves 901 and 902 from being separated from each other, and also limit an upper limit of a height of the insulator. In FIG. 28, Reference numeral 912 represents the audio device, and 913 represents the spike attached to the audio device. Reference numerals 912 and 913 respectively represent grooves formed on an outer circumferential surface of the upper sleeve, which are formed in order for the resonant member to have more resonance modes. At the loading time when the present insulator is mounted with the audio device 912 (FIG. 28), the head part 911 of the bolt falls below a position of the through-hole 909, and therefore does not have any influence on a function as the insulator.

[Fourth Embodiment]

Figure 29A:
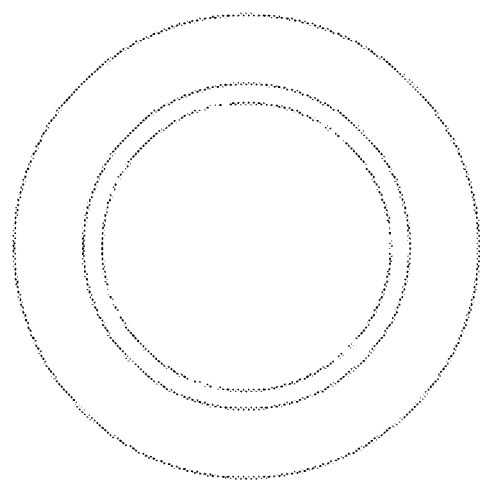
FIG. 29a is a top view.
Figure 29B:
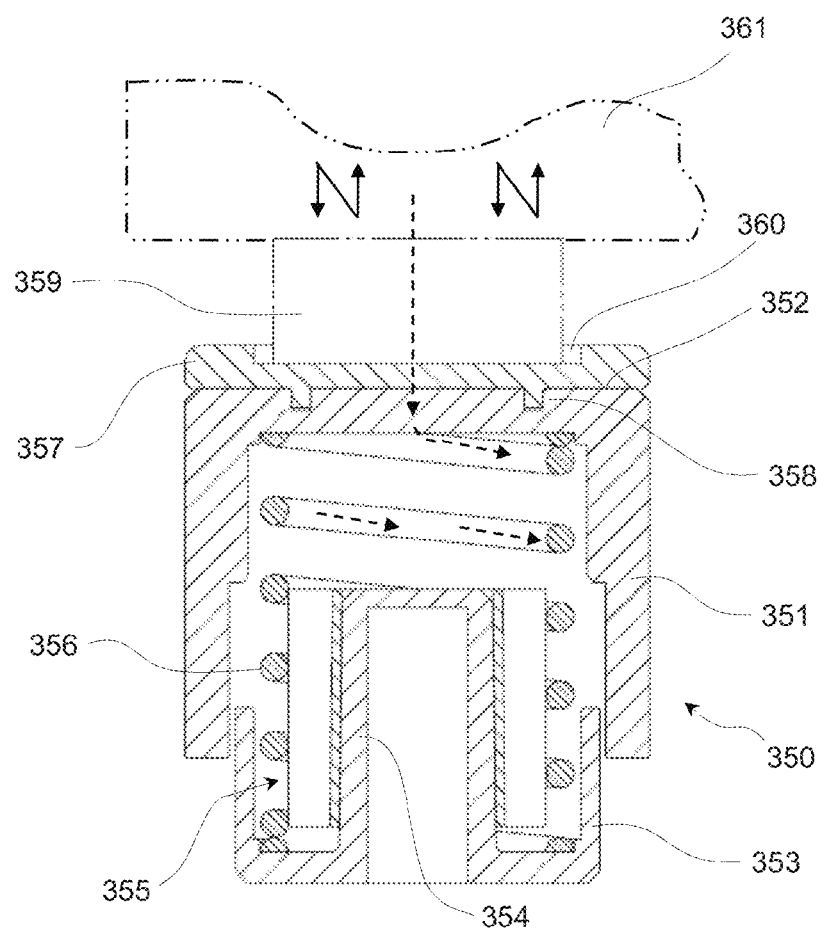
FIG. 29b is a front cross-sectional view.

FIG. 29 illustrates an insulator for audio according to a fourth embodiment of the present invention, and illustrates a configuration in which the present invention insulator and a hard material insulator having a different configuration from the present invention insulator are combined. FIG. 29*a* is a top view, and FIG. 29*b* is a front cross-sectional view. That is, by adding an assist effect of the different configuration insulator (see Supplements in Section 3) to the assist effect in the high range brought by the resonant member of the present invention insulator, reproduced sound can be easily tuned in a more various manner. Incidentally, the different configuration hard material insulator applied in the present embodiment refers to an insulator that can be used for an audio device by itself with respect to the present invention insulator. Reference numeral 350 represents the whole of the present invention insulator, 351 represents an upper sleeve (upper support member), 352 represents a load support part, 353 represents a lower sleeve (lower support member), 354 represents a tubular part that is formed in the central part of the lower sleeve with protruding, 355 represents a surging prevention member (vibration generation prevention means) that is attached to an outer circumferential part of the tubular part, 356 represents a spring coil (elastic member), and 357 represents a spacer that is provided on an upper surface of the upper sleeve 351 (resonant member). Reference numeral 358 represents a fitting part for aligning axes of both members 351 and 357 through a cross-sectionally concave groove formed on the upper surface of the upper sleeve in a ring shape and a cross-sectionally convex part formed on a lower surface of the spacer in a ring shape. Reference numeral 359 represents the different configuration insulator, and 360 represents a cross-sectionally concave-shaped insulator containing part that is formed on the spacer 357 and intended to prevent the different configuration insulator from being separated. The insulator containing part 360 enables the different configuration hard material insulator 359 (indicated by a dashed-two dotted line) to be stably attached on the insulator 350 of the present invention without a lateral slide and separation of the different configuration hard material insulator 359. On the different configuration hard material insulator 359, an audio device 361 (indicated by a dashed-two dotted line) such as a speaker or a CD player is mounted.

[Fifth Embodiment]

Figure 30A:
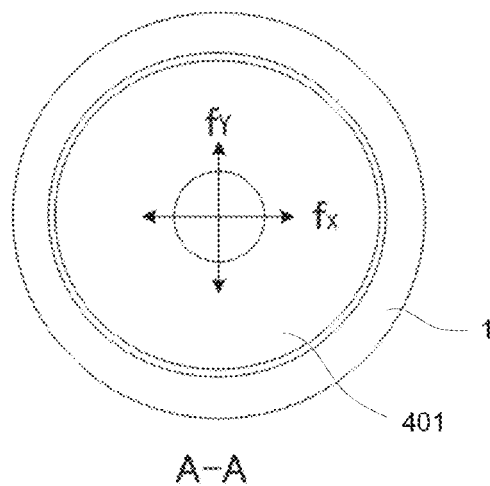
FIG. 30a is a top view.
Figure 30B:
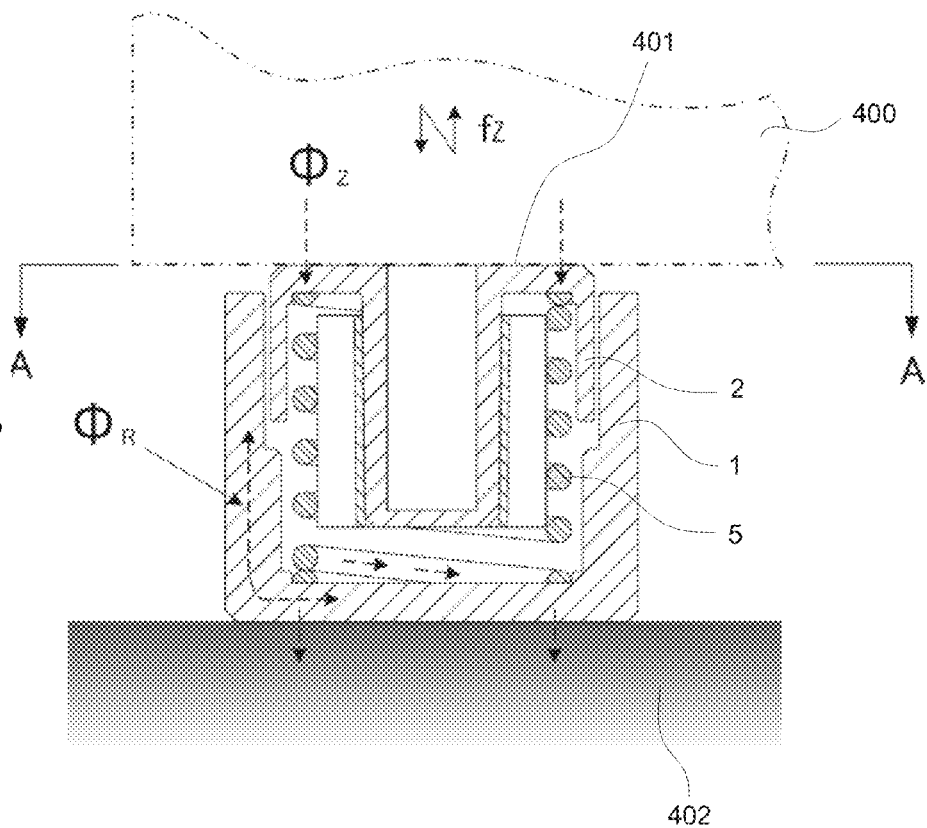
FIG. 30b is a front cross-sectional view.

FIG. 30 illustrates an insulator for audio according to a fifth embodiment of the present invention, and illustrates the case where the present invention insulator in the first embodiment is reversely arranged, on which an audio device is mounted (symbols are according to those in FIG. 1 illustrating the first embodiment). As illustrated in FIG. 30, even in the case of reversely arranging the upper sleeve 1 (upper support member) and the lower sleeve 2 (lower support member) and mounting the audio device on the lower sleeve side, the basic effects of the present invention can be obtained. Reference numeral 400 represents the audio device (dashed-two dotted line), 401 represents a load support part corresponding to an upper surface of the lower sleeve 2, and 402 represents a floor surface. That is, in the present embodiment, a vibration propagation path $\Phi Z$ of "audio device 400→load support part 401→sound tube (spring coil 5)→upper sleeve 1 (resonant member)→floor surface 402" is present. In this case, each of the tubular part of the lower sleeve 2 and the tubular part of the upper sleeve 1 has a vibration propagation path $\Phi_R$ branching from the main vibration propagation path $\Phi_Z$, and the "wind-bell effect" can be obtained to no small extent although the effect is not as notable as it is described in the first embodiment. Also, the point that by keeping the radial direction gap δ (not illustrated) between the upper sleeve 1 and the lower sleeves 2 narrow, the fall prevention effect against horizontal disturbance at the time of emergency can be obtained is the same as in the above-described embodiment. Accordingly, the effects described in all of the embodiments of the present invention can be similarly obtained even in the case of the present embodiment in which the insulator is reversely arranged. In the case of the present embodiment, as compared with the first embodiment, the wind-bell effect is reduced. By turning this to advantage, the first embodiment and the fifth embodiment (reverse arrangement) may be replaced by each other as needed according to a listener's taste, a music genre, characteristics of an audio device, or the like.

[Sixth Embodiment]

Figure 31:
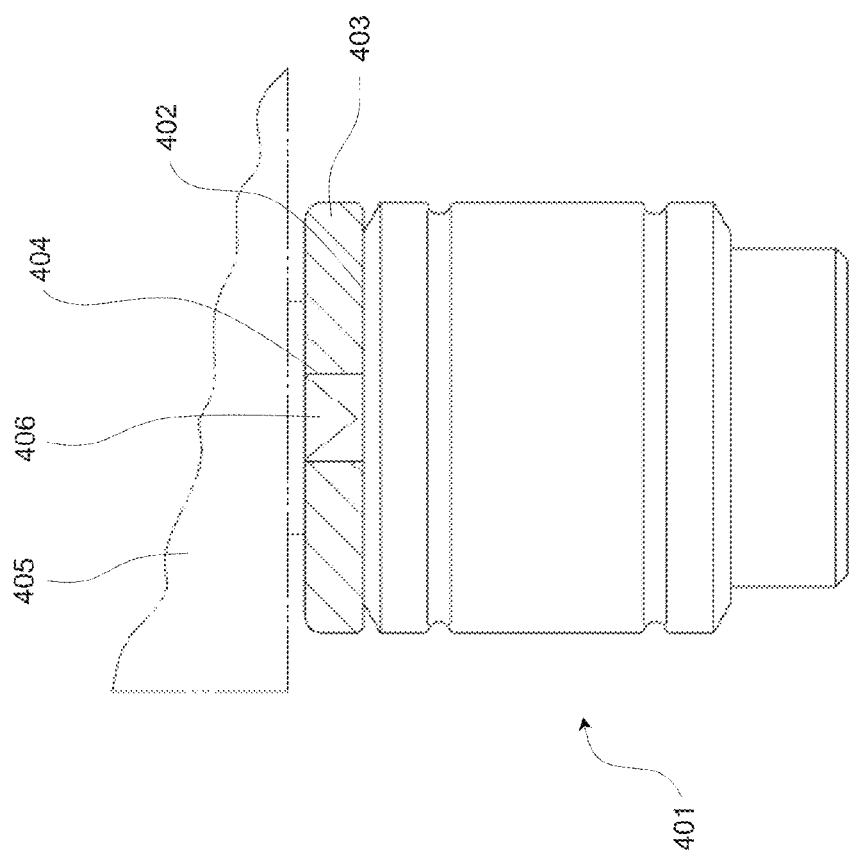
FIG. 31 is a front cross-sectional view of an insulator for audio according to a sixth embodiment of the present invention.

FIG. 31 illustrates an insulator for audio according to a sixth embodiment of the present invention, and illustrates the case where in order to further obtain the wind-bell effect, a spacer that disables a function of a spike is placed on the insulator. Reference numeral 401 represents an insulator main body, 402 represents a load support part, 403 represents the spacer that is attached on the load support part 402, 404 represents a spike containing part that is formed in the central part of the spacer 403, 405 represents an audio device (e.g., a speaker), and 406 represents a spike type insulator that is provided for the audio device. As described above, the cone-shaped spike utilizes the effect of easily transferring vibration in the direction of "column→cone→apex of cone→floor surface" but not easily transferring it in a direction opposite to the above direction, and is frequently used for placement of an audio device. It is also often the case that the spike type insulator is originally placed on an audio device main body, and difficult to remove from the device main body. As described above, the wind-bell effect found by the present invention is obtained in such a way that "a wind-bell member that branches from and is arranged in parallel with a main vibration propagation path $\Phi_Z$ assists high frequency vibration". However, in the case where between the audio device and the present invention insulator, the spike intervenes, as indicated by the experimental results in Section [1-6], the high frequency vibration propagated from the audio device to the present insulator is reduced to no small extent. Also, the opposite direction high frequency vibration that is propagated from the present insulator to the audio device is further significantly reduced. Further, from the results of the frequency response analysis in Section [1-3], by bringing the insulator and the audio device into contact with each other not through a point but through a plane having a large area, the various vibration modes of the wind-bell member can be utilized as the assist action in the high frequency range. The present embodiment is one focusing on this point, and by purposely disabling the function of the spike placed for the audio device contrary to common sense, the wind-bell effect can be further obtained.

[Seventh Embodiment]

FIG. 32 illustrates an insulator for audio according to a seventh embodiment of the present invention, and illustrates the case where, with respect to an audio device supported by a spike having a long axial length, a spacer that disables a function of the spacer is placed on the insulator as in the sixth embodiment.

Reference numeral 451 represents an insulator main body, 452 represents a load support part, 453 represents the spacer, 454 represents a spike containing part that is cylindrically formed in the central part of the spacer 453, 455 represents the audio device, and 456 represents the spike type insulator having the long axial length. In the present embodiment, the insulator and the audio device cannot be brought into contact with each other through a plane having a large area, and therefore the wind-bell effect is slightly reduced; however, the present embodiment can meet variously configured spike structures respectively having different axial lengths and/or outside diameters.

[Eighth Embodiment]

Figures 33, 33A, 33B:
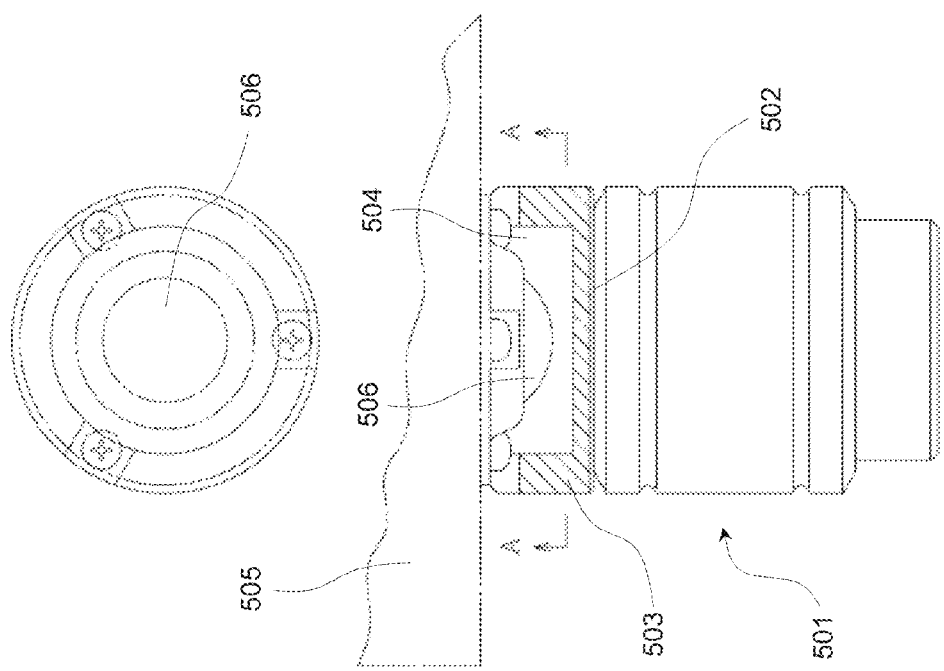
FIG. 33 is a front cross-sectional view of an insulator for audio according to an eighth embodiment of the present invention.

FIG. 33 illustrates an insulator for audio according to an eighth embodiment of the present invention, which has the same object as those of the sixth and seventh embodiments. That is, illustrated is the case where, in order to further obtain the wind-bell effect, a spacer that disables a roller for movement (moving means) placed for a heavyweight speaker or the like is placed on the insulator. Reference numeral 501 represents an insulator main body, 502 represents a load support part, 503 represents the spacer, 504 represents a roller containing part that is formed in the central part of the spacer 503, 505 represents an audio device, and 506 represents the roller for movement. Even in this case, the roller that is in point contact with an opposite surface can be disabled to bring the insulator and the audio device into contact with each other through a plane, and therefore the wind-bell effect is improved.

[Ninth Embodiment]

Figure 34:
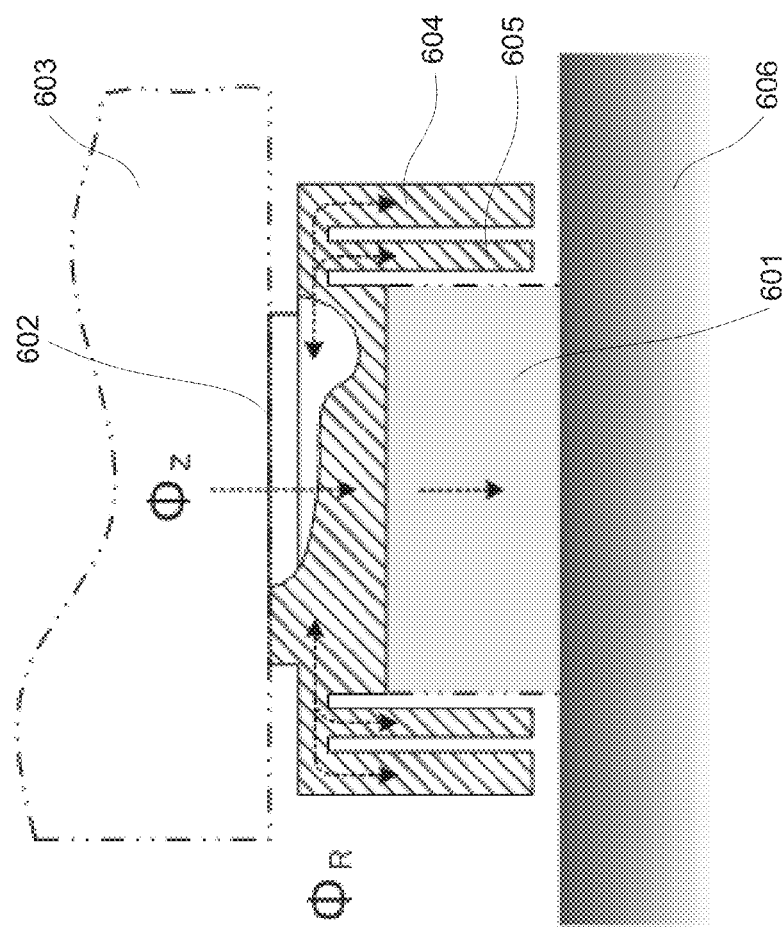
FIG. 34 is a front cross-sectional view of an insulator for audio according to a tenth embodiment of the present invention.

FIG. 34 illustrates an insulator for audio according to a ninth embodiment of the present invention, and illustrates the case where the above described insulator that can obtain the "wind-bell effect" is configured to be applicable with, without limitation to the spring coil type, any insulator.

Reference numeral 601 represents a main insulator (elastic member), on which an arbitrary type of insulator is detachably arranged. Reference numeral 602 represents a load support part (upper support member) that mounts an audio device 603 (indicated by a dashed-two dotted line), 604 represents an outer sleeve, 605 represents an inner sleeve, and 606 represents a floor surface. The outer sleeve 604 and the inner sleeve 605 are connected to each other in an upper end part of the load support part 602, and respectively formed in tubular shapes of which lower end parts are configured to be open-to-air ends, i.e., formed in shapes close to the "wind-bell" illustrated in FIG. 1. In the present embodiment, given that a vibration path from the load support part 602 to the main insulator 601 is defined as a vibration propagation path $\Phi_Z$, a vibration propagation path $\Phi_R$ branching from the vibration propagation path $\Phi_Z$ is configured to be the double tubular-shaped member. A part configured to include the outer sleeve 604 and the inner sleeve 605 is defined as a sub insulator (resonant member). That is, by combining the vibration system $\Phi_R$ (sub insulator) with the vibration propagation path $\Phi_Z$ (main insulator 601), an effect that the main insulator originally has is added with the "wind-bell effect" of the sub insulator. The reason why a sleeve of the sub insulator is configured to have the dual tubular structure, and radial direction thicknesses of the two sleeves 604 and 605 are made different is to provide a further depth and lingering sound to sound by making the vibration system have more intrinsic vibration modes. A system (principle, structure) of the main insulator 601 applicable in the present embodiment is not limited, but may be one that is conventionally used as an insulator for audio with being independent by itself.

In the case of the hard material insulator, it is only necessary to apply the "different configuration hard material insulator" (see Supplements in Section 3). In the case of applying the floating type insulator, the air floating type insulator, or an insulator using repulsive force based on magnetic force is also possible. As described above, in the case of the conventional floating type insulator, sound tuning using an acoustic material is difficult as compared with the hard material insulator. However, in the structure of the present embodiment, the vibration system $\Phi_R$ (sub insulator) of the wind-bell is present independently of $\Phi_Z$, and therefore by selecting a shape and/or acoustic member of the vibration system $\Phi_R$, sound can be tuned according to a listener's taste. It should be appreciated that the structure of the present embodiment can simultaneously have the effect of improving the senses of transparency and stereophony and resolution of sound as well, which the floating type originally has. In the case where a height of the main insulator is low as compared with that of the sub insulator, it is only necessary to arrange a spacer for correcting the height on or under the main insulator.

In the embodiment, the sub insulator integrated with the load support part 602 is detachably arranged on the main insulator 601 (on the audio device mounting side). In a way opposite to this configuration, the present invention may be configured to directly provide a load support part on an upper surface of the main insulator, and arrange the sub insulator under the main insulator (on the floor side). In the embodiment, the sub insulator is configured to have the dual tubular shape; however, the sub insulator may have a single tubular shape. In the case of forming the sub insulator in a multiple tubular shape that is a triple or more tubular shape, it is only necessary to structure the multiple tubular shape such that outside diameter sizes of respective cylindrical members are made different, and the respective cylindrical members can keep a state of not being in contact with each other with the stretchable telescopes being shortened. In the case of the multiple tubular shape, the present invention may be configured to make material types of the respective tubular members different. Also, sleeves themselves of the tubular members may be of stacked structure having different types of hard materials.

Figure 35:
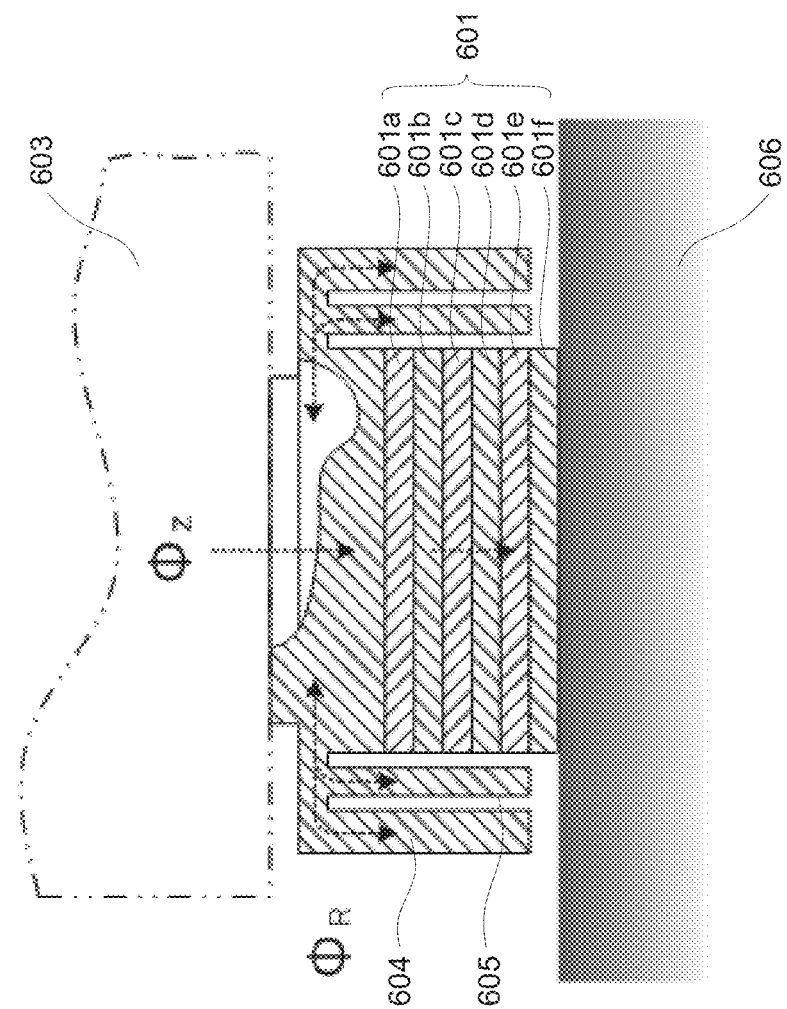
FIG. 35 is a front cross-sectional view in which as the main insulator according to the tenth embodiment of the present invention, a hard material insulator having multilayered structure is used.
Figure 38C:
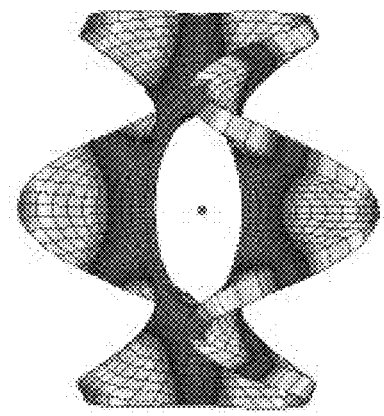
FIGS. 38a to 38c are diagrams illustrating results of the FEM eigenvalue analysis made on the thin disks.
Figure 38B:
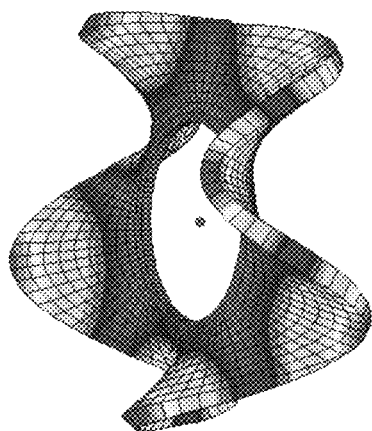
Figure 38A:
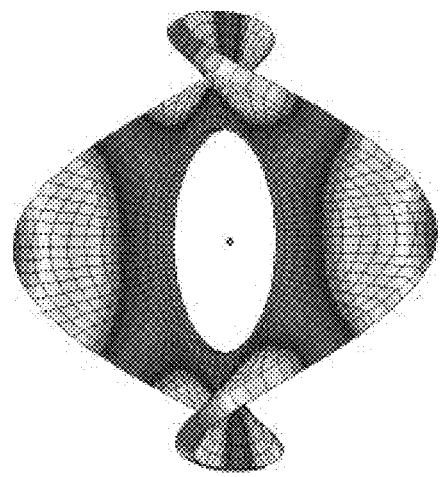

FIG. 35 illustrates a specific example where as the main insulator 601 according to the above-described ninth embodiment of the present invention, a hard material insulator having a multilayered structure is used. Reference numeral 601 represents the main insulator (elastic member) having the multilayered structure, which is configured to include acoustic materials 601a to 601f.

[Tenth Embodiment]

FIG. 36 illustrates an insulator for audio according to a tenth embodiment of the present invention, and illustrates the case where a plurality of thin disks are stacked in a multilayered manner to configure a resonant member. The present embodiment is one that focuses on the findings that the presence of many resonance modes (harmonic tones) in the high frequency range improves the sense of localization (sense of focus) and resolution of a sound image in stereo reproduction, and as more resonance modes are present, natural sound without any peculiarity can be obtained. FIG. 36a is a top view, and FIG. 36b is a front cross-sectional view. Reference numeral 651 represents an upper sleeve (upper support member), 652 a lower sleeve (lower support member), 653 a center shaft that is formed in the central part of the lower sleeve 652 with protruding, and 654 a surging prevention member (vibration generation prevention means) that is attached to an outer circumferential part of the center shaft 653. The upper sleeve 651 is arranged above the lower sleeve 652, and inside the both sleeves 651 and 652, a spring coil (elastic member) 655 is provided. Reference numerals 656 and 657 represent aligning parts that are formed on the both sleeves in order to keep a state where axes of the both sleeves 651 and 652 coincide with each other with the spring coil 655 being attached.

Reference numerals 658a to 658e are the disks attached to an outer circumferential part of the upper sleeve 651. The plurality of disks are fixed to the upper sleeve 651 at regular intervals with rings 659a to 659d attached between the respective disks, an upper sleeve lower end part 660, and a ring-shaped set screw 661 provided around an upper end part of the upper sleeve 651. By attaching/detaching the set screw 661, the respective disks can be freely replaced in the present embodiment. In the present embodiment, a part configured to include the upper sleeve 651 and the plurality of disks attached to the upper sleeve serves as the resonant member. FIGS. 37a to 37c, FIGS. 38a to 38c, and FIG. 39 illustrates an example of eigenvalue analysis results in the case where outside diameters of the disks are φ 74 mm, inside diameters of the disks are φ 60 mm, thicknesses of the disks are 5 mm, and as a material for the disks, a steel material is used, in which respective resonance modes in the range of a primary resonant frequency $f_1$=4400 Hz to 16200 Hz are illustrated. As a result, according to the structure of the present embodiment, by changing the thickness of each of the disks 658a to 658e, or changing a material for each of the disks 658a to 658e, resonant frequencies $f_1$ to $f_n$ of each of the disks can be changed with a configuration of each of the resonance modes remaining the same. By making a complicated shape that is not a perfect circular shape but an imperfect circular shape, more various vibration modes can be obtained. As an acoustic material used for the thin disks, a material used for the "different configuration hard material insulator" (see Supplements in Section 3) can be applied. Incidentally, the upper and lower sleeve in any of the other embodiments can also be applied with such a material.

[Eleventh Embodiment]

Figures 40A, 40B:
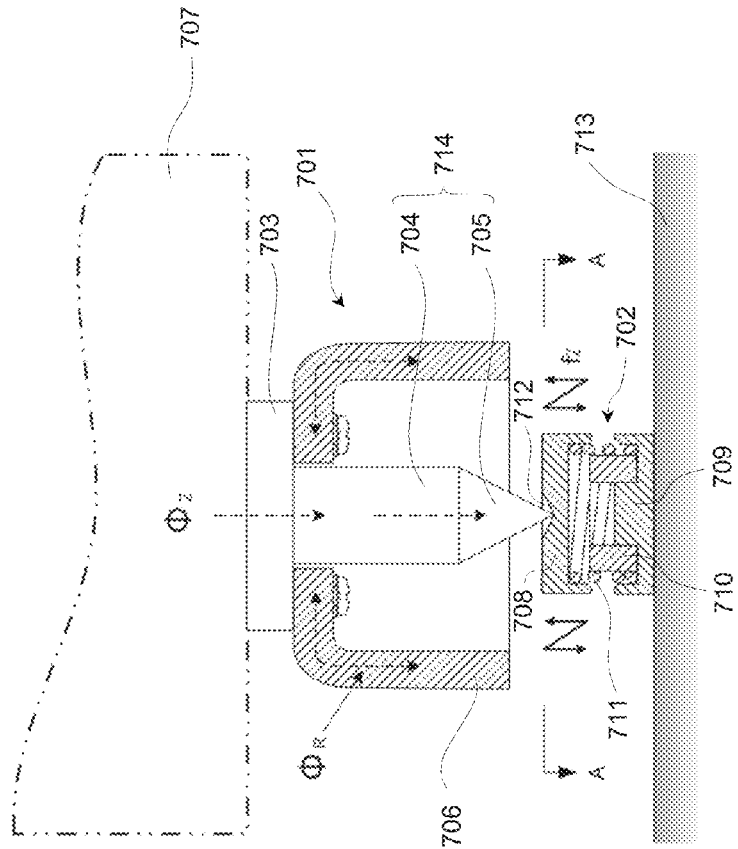
FIG. 40a is a top view.
FIG. 40b is a front cross-sectional view.

FIG. 40 illustrates an insulator for audio according to an eleventh embodiment of the present invention, and illustrates the case where a spike type insulator is attached with a resonant member. FIG. 40a is a top view (an A-A arrow view in FIG. 40b), and FIG. 40b is a front cross-sectional view.

Figures 41A, 41B:
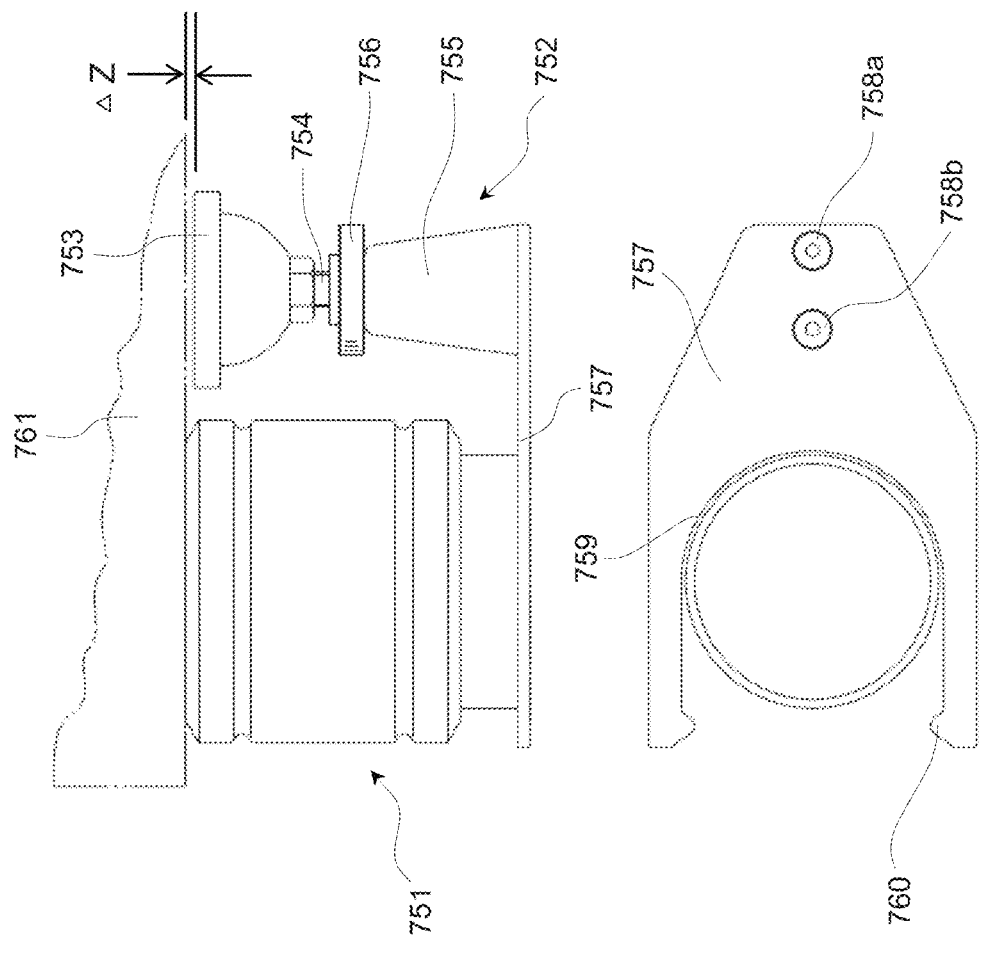
FIG. 41a is a front cross-sectional view.
FIG. 41b is a bottom view.

Structure of this insulator is configured to include a spike structure part 701 and a spike receiving part 702, and the spike structure part 701 is placed on an audio device side. Reference numeral 703 represents a spike fixing part (upper support member), 704 a spike columnar part, 705 a spike conical part, and 706 a spike side sleeve (resonant member) that is formed of thick metal and has a curved surface part. The spike columnar part 704 and the spike conical part 705 constitute a spike support part 714 (elastic member) that supports a load of an audio device. The members 703 to 706 constitute the spike structure part 701. Reference numeral 707 represents the audio device (imaginary line), 708 represents an upper tubular part, 709 represents a lower base, 710 represents a surging prevention member (vibration generation prevention means), 717 represents a spring coil (elastic member), and 712 represents a spike tip saucer. The members 708 to 712 constitute a small-diameter and small-sized spike receiving part 702 (lower support member). A main vibration path from the audio device 707 to the spike columnar part 704→spike conical part 705 of the spike structure part 701→the upper tubular part 708→spring coil 711 of the spike receiving part 702→floor surface 713 is defined as a vibration propagation path $\Phi_Z$. In the present embodiment, a vibration propagation path $\Phi_R$ (tubular-shaped member) that branches from the vibration propagation path $\Phi_Z$ and brings the wind-bell effect is formed on the spike structure part 701 side. That is, in the present embodiment, the spike side sleeve 706 has an inside cavity that contains the spike columnar part 704 and the spike conical part 705, and is formed in a tubular shape of which one end part has a sealed structure and the other end part is an open-to-air end, i.e., formed in a shape close to a "wind-bell". The audio device (e.g., a speaker) has, as illustrated in FIGS. 41a and 41b, vibration components fx, fY, and fz in directions of three axes of X, Y, and Z. In the present embodiment, the upper tubular part 708 that receives the tip of the spike conical part 705 is supported in an elastically deformable manner in the directions of the three axes of X, Y, and Z by the spring coil 711. Accordingly, if spring stiffness of the spring coil 711 is moderately soft, vibration F (=fx·i+fY·j+fz·k) generated by the audio device excites the spike side sleeve 706 (wind-bell member) in the three-axis directions. The vibration of the wind-bell member is propagated in a direction toward the spike receiving part 702 through the vibration propagation path $\Phi_R$ with passing through the vibration propagation path $\Phi_Z$. The points that as a result, lingering sound of the wind-bell member brings the sense of spatial extent (sense of depth, sense of presence) to reproduced sound, and also many resonance modes in the high frequency range improves the sense of localization (sense of focus) and resolution of a sound image are the same as in the above-described embodiments. Even in the case where a member corresponding to the spike receiving part 702 is configured with use of a perfect rigid body as with the conventional spike type, the wind-bell effect can be obtained to no small extent because the vibration components fx, fY, and fz in the three-axis directions are not completely eliminated. However, as compared with the present embodiment, a level of the effect is reduced. Also, the point that by setting a resonant frequency $f_0$ determined by axial stiffness $K_Z$ of the spring coil 711 incorporated in the spike receiving part 702 and a mass M of the mounted object to a value within or below the audible range, on the basis of frequency characteristics of a secondary vibration system determined by the mass M and the spring stiffness $K_Z$, the vibration blocking effect can be obtained at the resonant frequency $f_0$ or more is also the same as in the above-described embodiments. A configuration of the spike support part 714 is not limited to the structure combining the column and the cone. A spike of which a cross-sectional shape is a polygonal shape or circular shape, a spike of which a needle-like tip is positioned in a vertically reverse direction, a multistage spike structure, or the like can also be applied.

[Twelfth Embodiment]

FIG. 41 illustrates a twelfth embodiment of the present invention, in which in the case where a floating member such as a spring coil is used to configure the present invention insulator, placement stability of an audio device mounted on the insulator is improved. FIG. 41a is a front cross-sectional view, and FIG. 41b is a bottom view. Reference numeral 751 represents an insulator main body, and 752 represents a main body of an auxiliary unit for placement stabilization. Reference numeral 753 represents an upper surface support part (support part), 754 represents a screw part, 755 represents a screw containing part, 756 represents a nut for fastening the screw part 754 to the screw containing part 755, 757 represents a base part, 758a and 758b represents bolts for fastening the base part 757 and the screw containing part 755 to each other, 759 represents a lower end containing part of the insulator main body, 760 represents a convex part for preventing the placement stabilization unit 752 from being separated from the insulator main body 751, and 761 represents the audio device such as a speaker. The members 753 to 760 constitute the auxiliary unit that can reduce a tilt amount of the audio device and prevent the audio device from falling at the time of emergency. It is only necessary to mount the speaker on the present invention insulator, and then set a gap ΔZ between a bottom surface of the speaker and the upper surface support part 753 to a few millimeters (e.g., ΔZ<5 mm). There is no restriction on the auxiliary unit in terms of a mechanism, and in short, the auxiliary unit is only required to have a structure that can finely adjust the distance ΔZ between the auxiliary unit and the audio device bottom surface.

[Thirteenth Embodiment]

Figure 42:
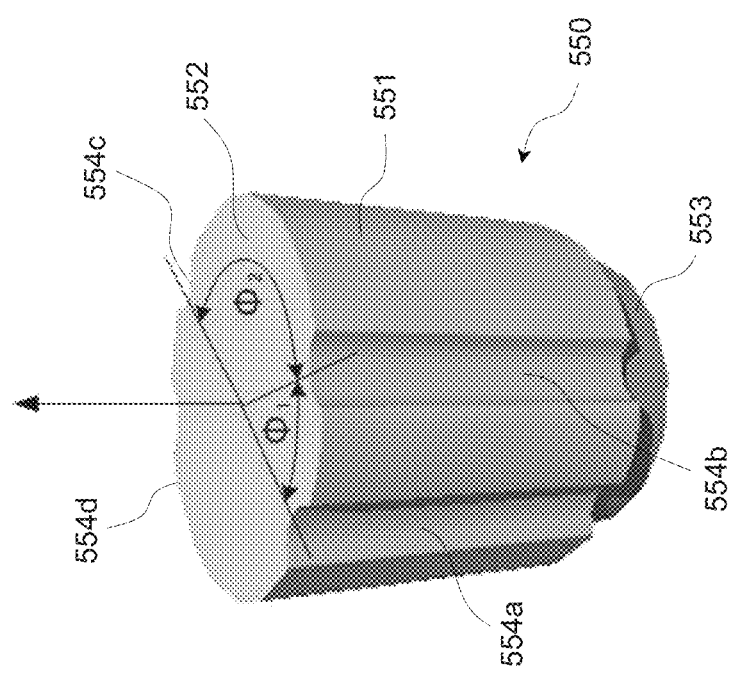
FIG. 42 is an appearance diagram of a ninth embodiment of the present invention.

FIG. 42 illustrates an insulator for audio according to a thirteenth embodiment of the present invention, and is an appearance diagram illustrating an example of a tubular sleeve shape that can more effectively obtain the "wind-bell effect".

Reference numeral 550 represents an insulator main body, 551 an upper sleeve (resonant member), 552 a load support part, and 553 a lower sleeve (fixed part). Reference numerals

554a to 554d are grooves that are formed on a lateral side of the upper sleeve 551 and respectively have semi-arc-shaped cross sections. Given that an angle between the grooves 554a and 554b is defined as $\Phi_1$, and an angle between the grooves 554b and 554c is defined as $\Phi_2$, $\Phi_1 \neq \Phi_2$. That is, a shape of the tubular sleeve is axially asymmetric, and therefore a vibration system $\Phi_R$ can be made to have more intrinsic vibration modes to provide a further depth and lingering sound to sound.

[Fourteenth Embodiment]

Figures 43A, 43B:
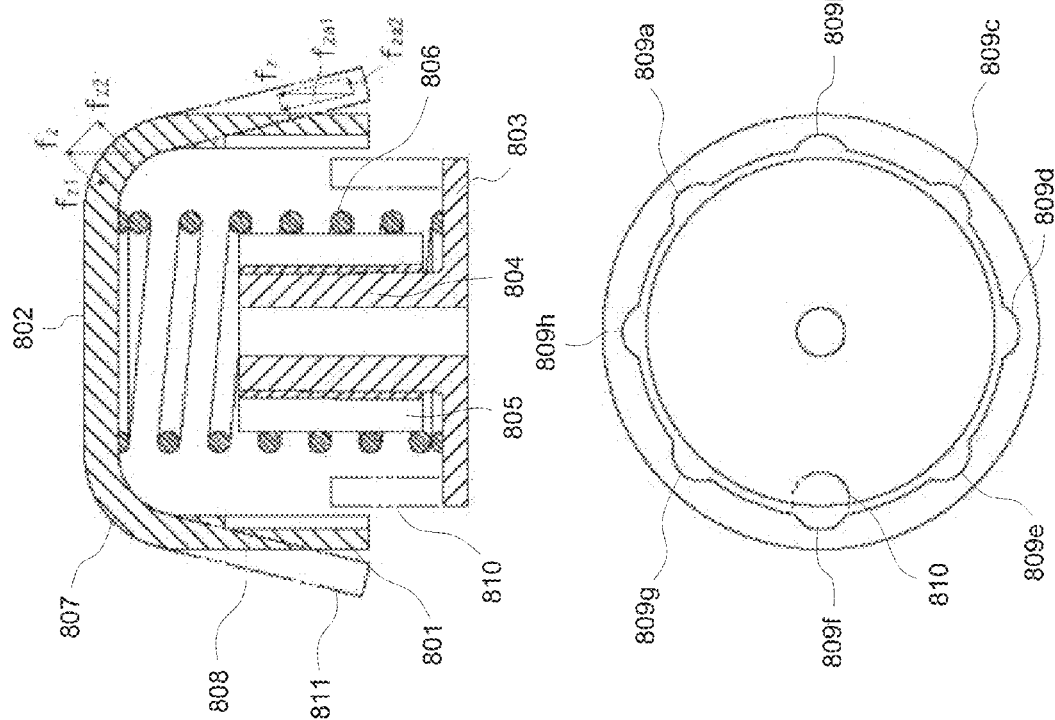
FIG. 43a is a front cross-sectional view.
FIG. 43b is a bottom view.

FIG. 43 illustrates a fourteenth embodiment of the present invention, in which in order to be able to further get the wind-bell effect, an appearance and inner surface shape of an upper sleeve are elaborated. FIG. 43a is a front cross-sectional view, and FIG. 43b is a bottom view. Reference numeral 801 represents the upper sleeve (resonant member), 802 a load support part as a flat end surface, 803 a lower base, 804 a tubular part that is formed in the central part of the lower base 803 with protruding, 805 a surging prevention member, and 806 a spring coil (elastic member). Reference numeral 807 represents a curved surface part that makes a connection between the upper flat end part (load support part 802) and a cylindrical part 808 of the upper sleeve 801. By forming the curved surface part, even in the case where exciting force fz only in a Z direction is applied from an audio device, a component fz2 of fz can excite various vibration modes of the wind-bell member.

Reference numerals 809a to 809h represent groove parts that are formed on an inner surface of the upper sleeve 801 in an axial direction. As described in the thirteenth embodiment, by forming the plurality of grooves on the upper sleeve 801, a vibration system $\Phi_R$ can be made to have more intrinsic vibration modes, and by performing groove processing of the inner circumferential surface, a fine appearance of the insulator as an audio device requiring an interior property can be prevented from being spoiled. Also, the groove parts can be easily formed by end milling (810 represents an outside diameter of a tool). Circumferential angles between the respective grooves are not required to be the same angle; a shape of the upper sleeve 801 may be axially asymmetric; and the grooves may be formed with being tilted with respect to the axial direction. Further, in addition to the grooves, a plurality of irregular concave-convex parts may be formed.

If the lower base 803 is formed in a sleeve shape as indicated by an imaginary line 810, by setting a narrow gap between the upper and lower sleeves in a radial direction, the audio device can be prevented from tilting. Also, if the cylindrical part of the upper sleeve is formed in a cross-sectionally trapezoidal shape as indicated by an imaginary line 811, a larger component fza2 of the exciting force fz can be generated, and therefore various vibration modes of the wind-bell member can be further excited. The method for further getting the wind-bell effect described in the present embodiment can be applied to all of the above-described embodiments.

[Fifteenth Embodiment]

Figure 44:
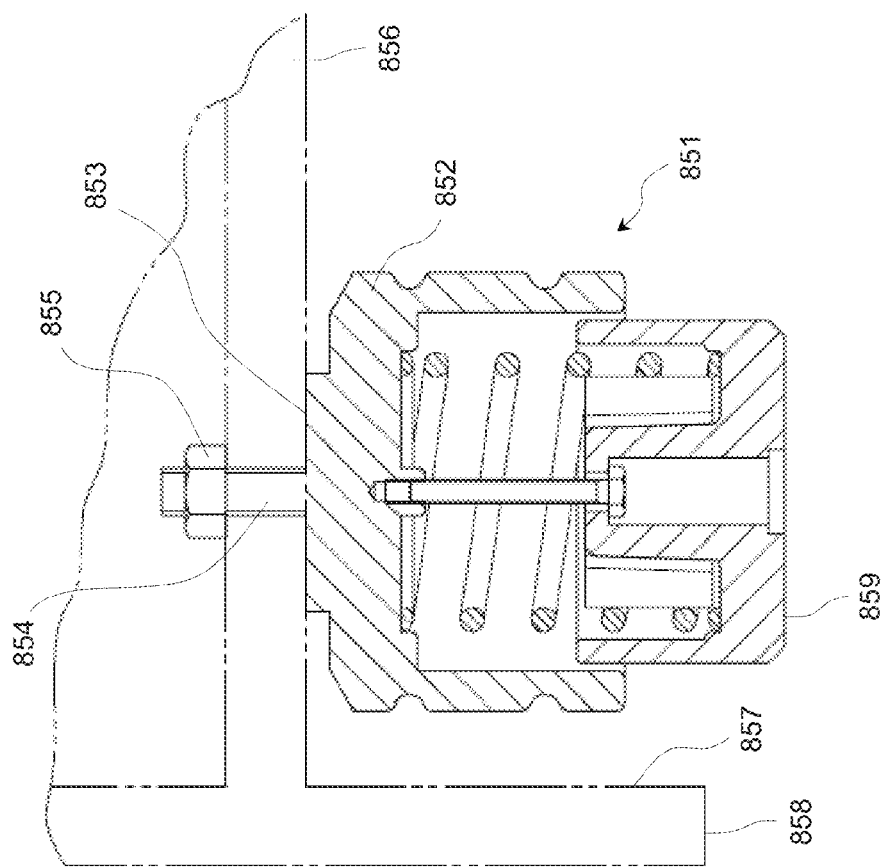
FIG. 44 is a front cross-sectional view of an insulator for audio according to a fifteenth embodiment of the present invention.

FIG. 44 is a diagram illustrating a fifteenth embodiment of the present invention, in which by completely fixing the present invention insulator on a bottom surface of an audio device (e.g., a speaker), the insulator and an audio device main body are integrated with each other. Reference numeral 851 represents a main body part of the present invention insulator, 852 represents an upper sleeve (resonant member), 853 represents a load support part of which an outside diameter is made smaller than that of the upper sleeve, 854 represents a screw part provided on the upper sleeve, 855 represents a nut, 856 represents the speaker, and 857 represents a concave part provided on a bottom surface of the speaker. By integrating the insulator and the audio device main body with each other, a problem that the insulator is separated from the audio device can be eliminated. By applying the present embodiment to, for example, a small-sized mini component stereo set, a radio cassette recorder, a personal computer for PC audio that focuses on sound quality, or the like, there is no problem in moving the device. The present invention may be configured to, instead of performing the fastening with the screw, for example, fit the insulator side and the audio device side into each other through concave and convex parts (not illustrated).

The present embodiment is configured to form the deep concave part 857 on the bottom surface of the audio device and contain the insulator 851 in the concave part. Also, if an end surface 858 of the concave part is adapted to, when the audio device is tilted at a certain angle or more, come into contact with a floor surface 859, the audio device can be prevented from falling.

[Sixteenth Embodiment]

Figure 45:
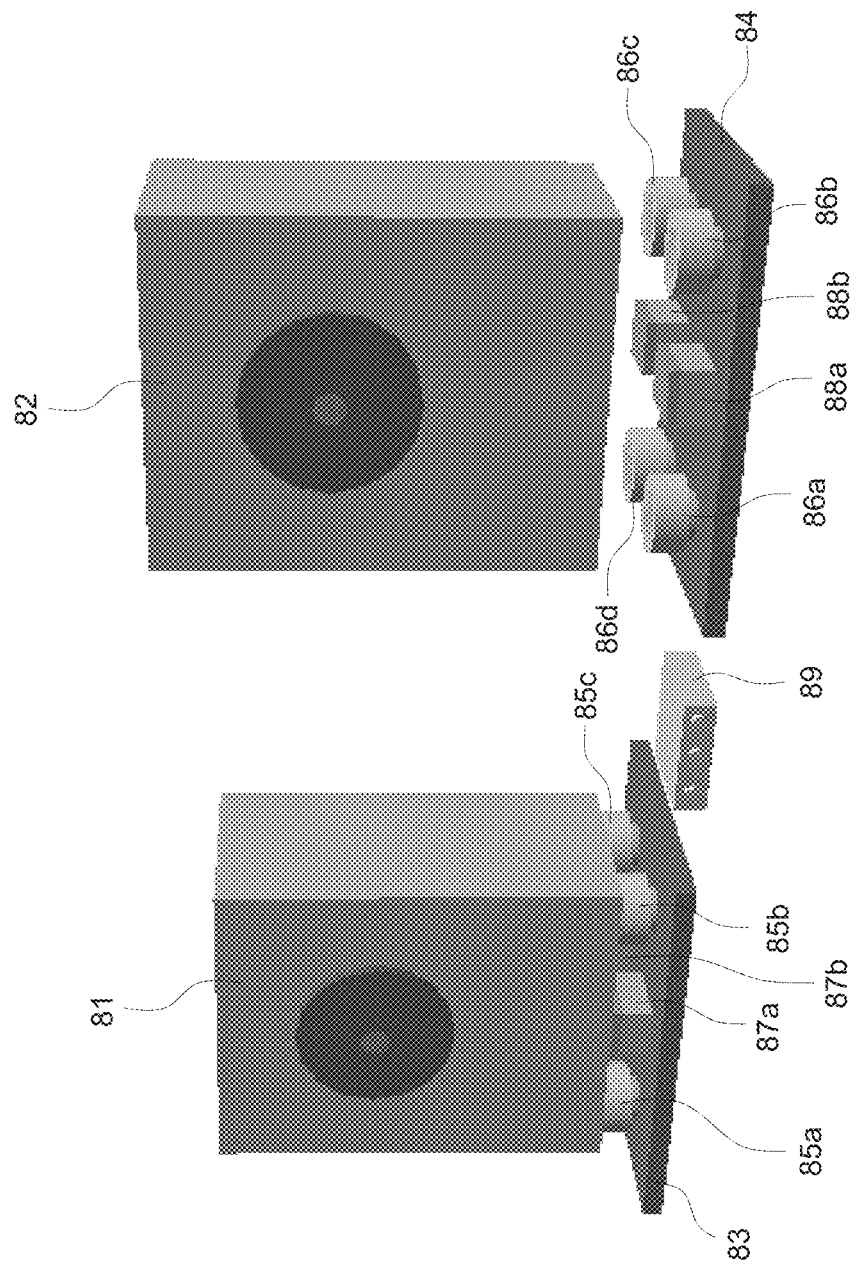
FIG. 45 is an arrow view of an audio system according to a sixteenth embodiment of the present invention.
Figure 46:
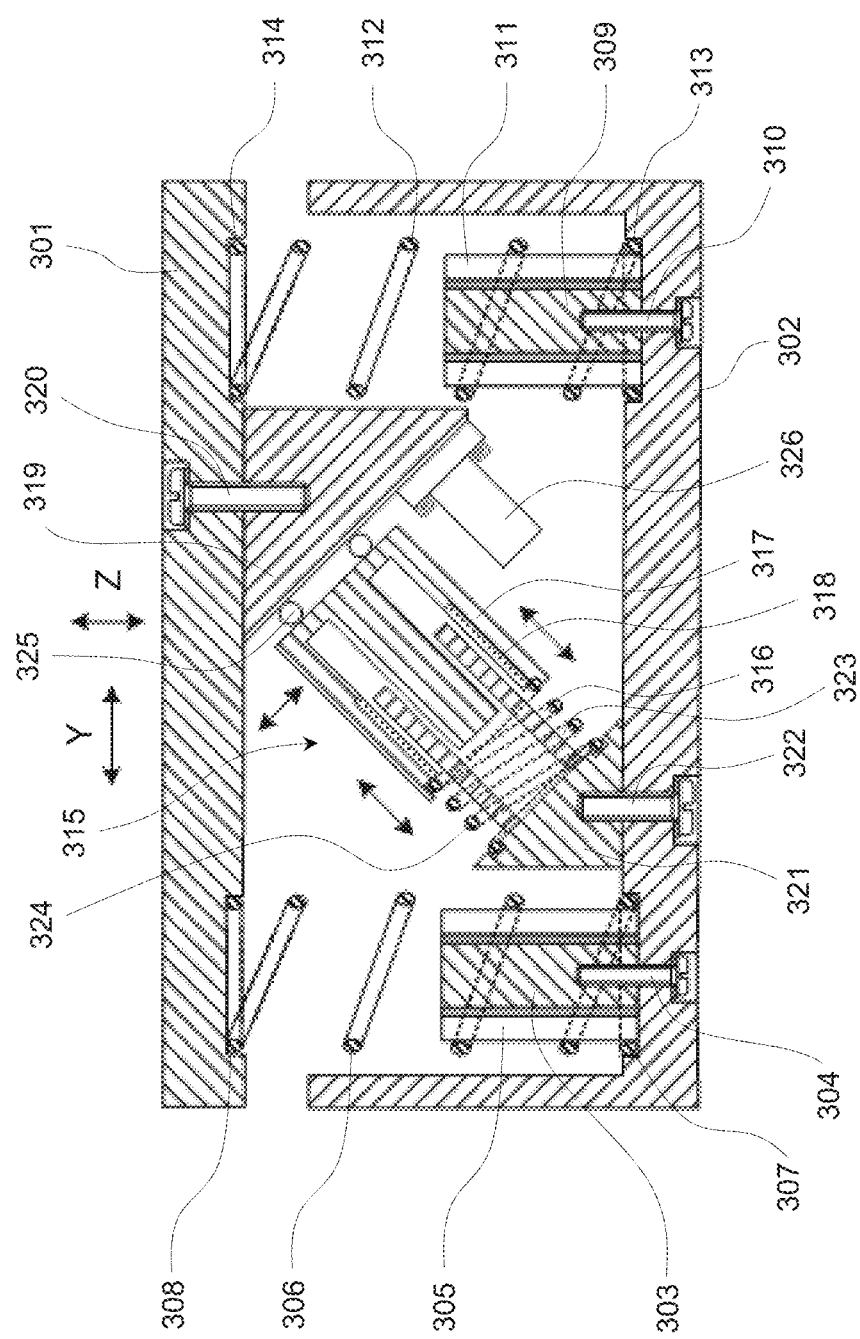
FIG. 46 is a front cross-sectional view of an active type insulator.
Figure 47:
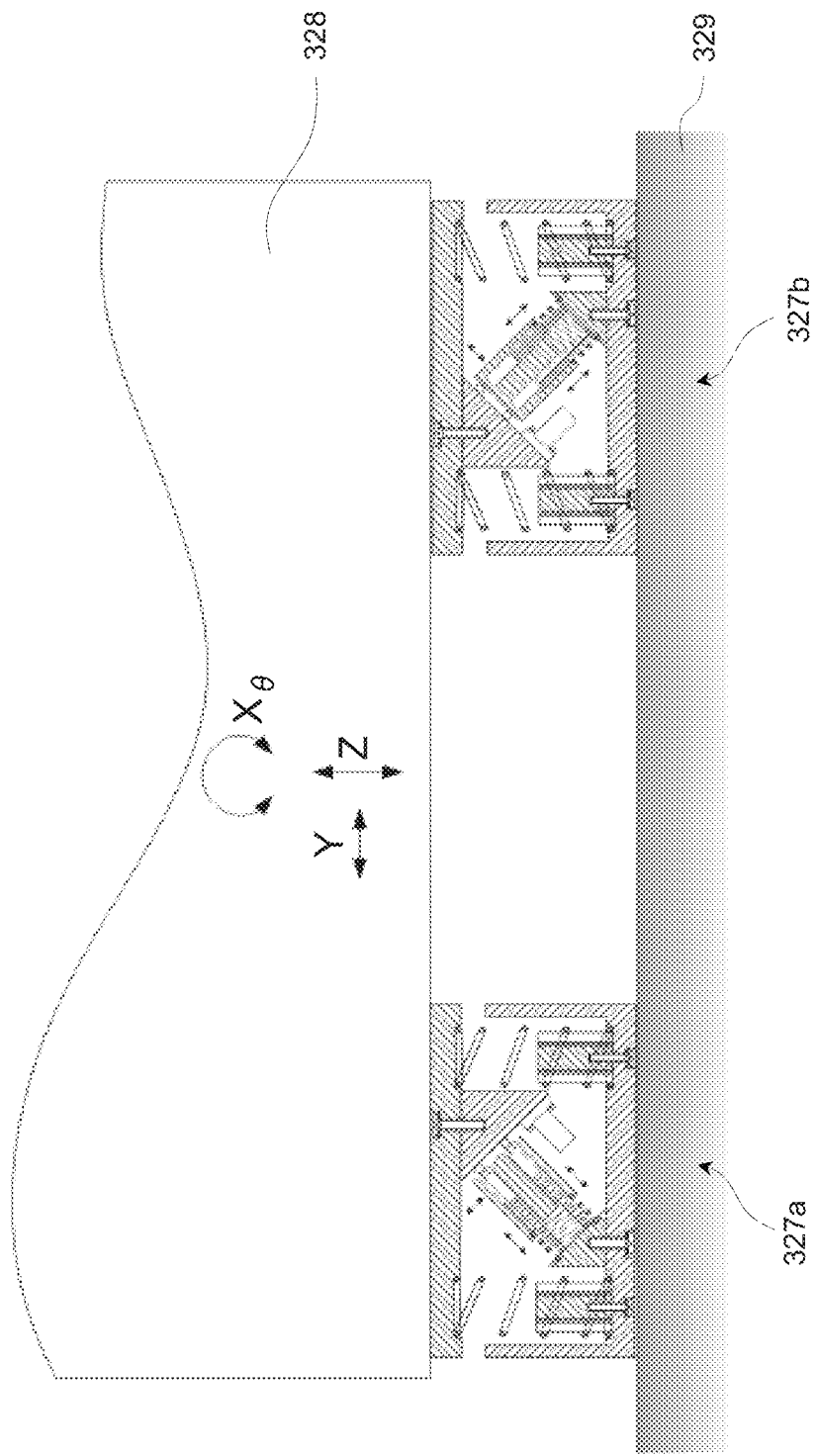
FIG. 47 is a front cross-sectional view in the case where two active insulators are arranged on front and rear sides of a bottom surface of a speaker.

FIGS. 45 to 47 are diagrams illustrating a sixteenth embodiment of the present invention, and also illustrating a measure adapted to effectively reduce an acoustic characteristic problem (e.g., a boomy phenomenon) resulting from vibration of an audio device main body, which is caused by a vibration excitation source that the audio device itself has. That is, the sixteenth embodiment is one in which, in order to support the audio device, in addition to the present invention insulator, an active insulator is arranged in parallel. FIG. 45 is an arrow view of an audio system according to the sixteenth embodiment of the present invention. Reference numerals 81 and 82 represent 2-channel stereo speakers that are respectively arranged left and right, and each of the speaker main body parts is supported by two active insulators and four present invention insulators, which are mounted on board 83 or 84.

(1) The present invention insulators support a static load of the speaker main body part, and also assist high frequency vibration.

(2) The active insulators use electronic control to reduce low frequency rigid body vibration of the speaker main body part due to reaction force (dynamic variable load) of a voice coil of the speaker.

Here, the active insulator is defined as an insulator in which mechanical elements such as a spring coil, viscoelastic rubber, or pneumatic spring, permanent magnet, and acoustic material are added with electronic control elements such as a sensor, voice coil motor, and controller. To simplify an arrangement method for the respective insulators, the right-hand side speaker 82 is illustrated with being floated. Reference numerals 85a to 85d or 86a to 86d represent the present invention insulators that are arranged at four corners of a bottom surface of the left or right speaker 81 or 82 (85d is not illustrated). Reference numerals 87a and 87b or 88a and 88b represent the active insulators that are arranged in the central part of the bottom surface of the left or right speaker 81 or 82, and 89 represents a controller that controls the active insulators. In the following, a specific configuration of each of the active insulators is described.

FIG. 46 is a front cross-sectional view illustrating the specific configuration of the active insulator. The present embodiment is one configured such that two active insulators each having an actuator of which a driving shaft is tilted are combined. For this reason, in the case of applying the present embodiment to a speaker, not only the pendular movement around the $X_\theta$ axis described above with FIG. 2 illustrating the speaker main body part, but also vibration in a Y axis direction can be suppressed. Regarding a basic configuration, spring coils (springs for actuator) are symmetrically arranged, and in the central part between them, a tilted voice coil motor is arranged. Reference numeral 301 represents an upper base plate (load support part), and 302 represents a lower base plate (fixed part). Reference numeral 303 represents a columnar part that is fixed on a left-hand side of the lower base plate 302, 304 represents a bolt that fixes the columnar part to the lower base plate 302, and 305 represents a surging prevention member (vibration generation prevention means) that is attached to an outer circumferential part of the columnar part 303. The surging prevention member 305 is configured to include a cylindrical tubular part and a plurality of viscoelastic pieces that are protruded with extending in a radial direction. The spring coil 306 (elastic member) is provided so as to be sandwiched between the upper base plate 301 and the lower base plate 302. The surging prevention member 305 is formed so as to make a height thereof smaller than a minimum size at the time when the spring coil 306 is compressed by a mounted object such as a speaker. The spring coil 306 is configured such that an outer circumferential part of a lower end thereof fits into an aligning part 307 formed on the lower base plate 302, and an outer circumferential part of an upper end thereof fits into an alignment part 308 formed on a bottom surface of the upper base plate 301. Also, the spring coil, the surging prevention member, and the like provided on a right-hand side of the insulator are symmetrically arranged. That is, the right-hand side of the insulator is configured to include a columnar part 309, bolt 310 that fixes the columnar part, surging prevention member 311, spring coil 312, and aligning parts 313 and 314 that fix lower and upper ends of the spring coil 312. Reference numeral 315 represents the voice coil motor that is provided with being tilted with respect to the lower base plate 302, which is configured to include a fixed side 316 and a movable side 317.

Reference numeral 318 represents a permanent magnet that is provided on the movable side, 319 represents an upper triangular prism member that is fixed to the upper base plate 301 with a bolt 320, 321 represents a lower triangular prism member that is fixed to the lower base plate 302 with a bolt 322, and 323 represents an electromagnetic coil part that is provide on the fixed side 316. Reference numeral 324 represents a spring coil for keeping concentricity between the fixed side 316 and movable side 317 of the voice coil motor. Reference numeral 325 represents bearings that are provided between the movable side 317 of the voice coil motor and the upper triangular prism member 319. By making the bearings intervene between both members 317 and 319, both members 317 and 319 can freely relatively slide in a tilted surface direction. Reference numeral 326 represents an acceleration sensor that is attached to the upper triangular prism member 319. By detecting a vibration state of the speaker with the acceleration sensor 326 to perform acceleration feedback, low frequency vibration of the speaker can be reduced. Also, by performing the acceleration feedback, a system eigenvalue can be further reduced, so that the vibration blocking performance can be further improved, and also the sense of depth, resolution, sense of transparency, and the like can be further improved.

FIG. 47 is a front cross-sectional view in the case where the two active insulators of the present embodiment are arranged on front and rear sides of the bottom surface of the speaker. Reference numerals 327*a* and 327*b* represent the active insulators, 328 the speaker, and 329 the floor surface. The audio system configured to include: the two active insulators arranged on the front and rear sides of the bottom surface of the speaker; and the plurality of present invention insulators can perform active damping control of displacement (around $X_\theta$ axis, in Y axis, or in Z axis) due to the variable load generated by the speaker itself.

[3] Supplements

Figure 48:
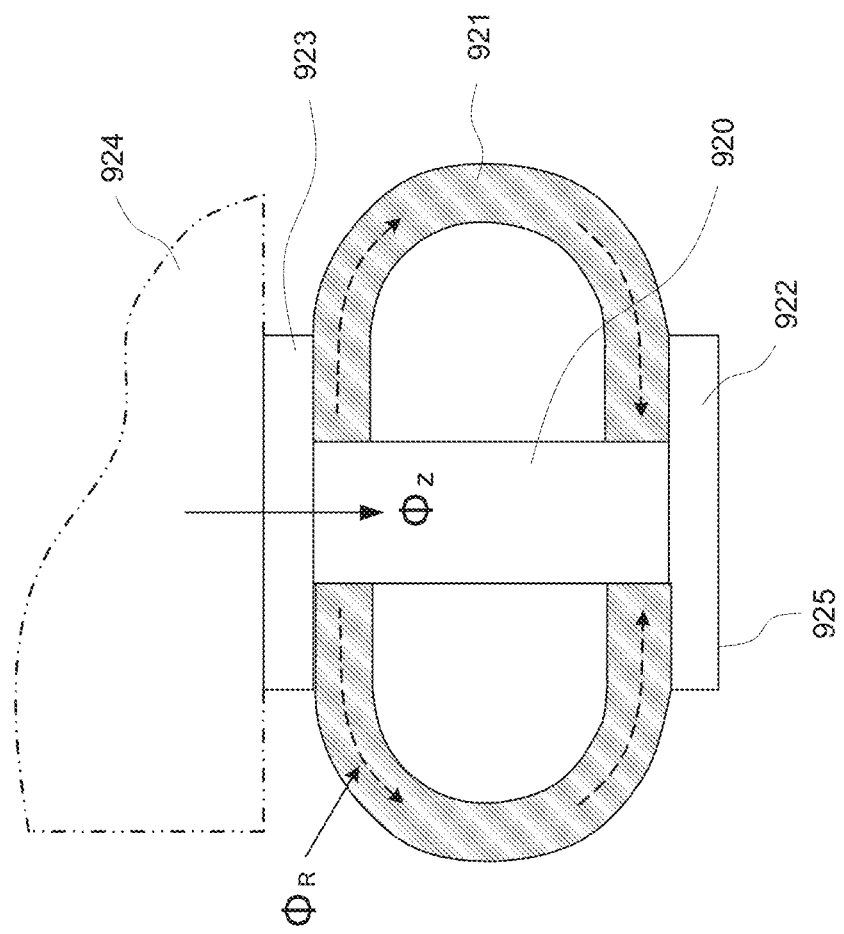
FIG. 48 is a front cross-sectional view of an insulator for audio in the case where a resonant member of which both ends are fixed ends is used.

An envelope of an outer circumferential part of the substantially tubular-shaped member used as the resonant member (wind-bell member) does not necessarily have a perfect circular shape, but may have a triangular or quadrangular shape, or alternatively an axially asymmetric polygonal shape. Also, not the tubular shape but a cutout part may be present on a circumference, and for example, a structure in which a plurality of prism blocks are arranged on the circumference is also possible. Further, the wind-bell member is not necessarily configured such that one end part has the sealed structure (fixed end) and the other end part is an open end (free end). For example, as illustrated in FIG. 48, the wind-bell member may be configured to have a "waistless barrel shape" of which both ends are fixed ends, and have a structure that has, in the central part of the barrel, an elastic member (e.g., a hard material) serving as a main vibration propagation path $\Phi_Z$. Reference numeral 920 represents a main insulator, 921 a sub insulator (resonant member), 922 represents a base part, 923 represents a load support part, 924 represents an audio device, and 925 represents a floor surface. In short, it is only necessary that a resonant member, which branches from the main vibration propagation path $\Phi_Z$ and has a vibration propagation path $\Phi_R$, is arranged in parallel with the main vibration propagation path $\Phi_Z$.

Figure 49:
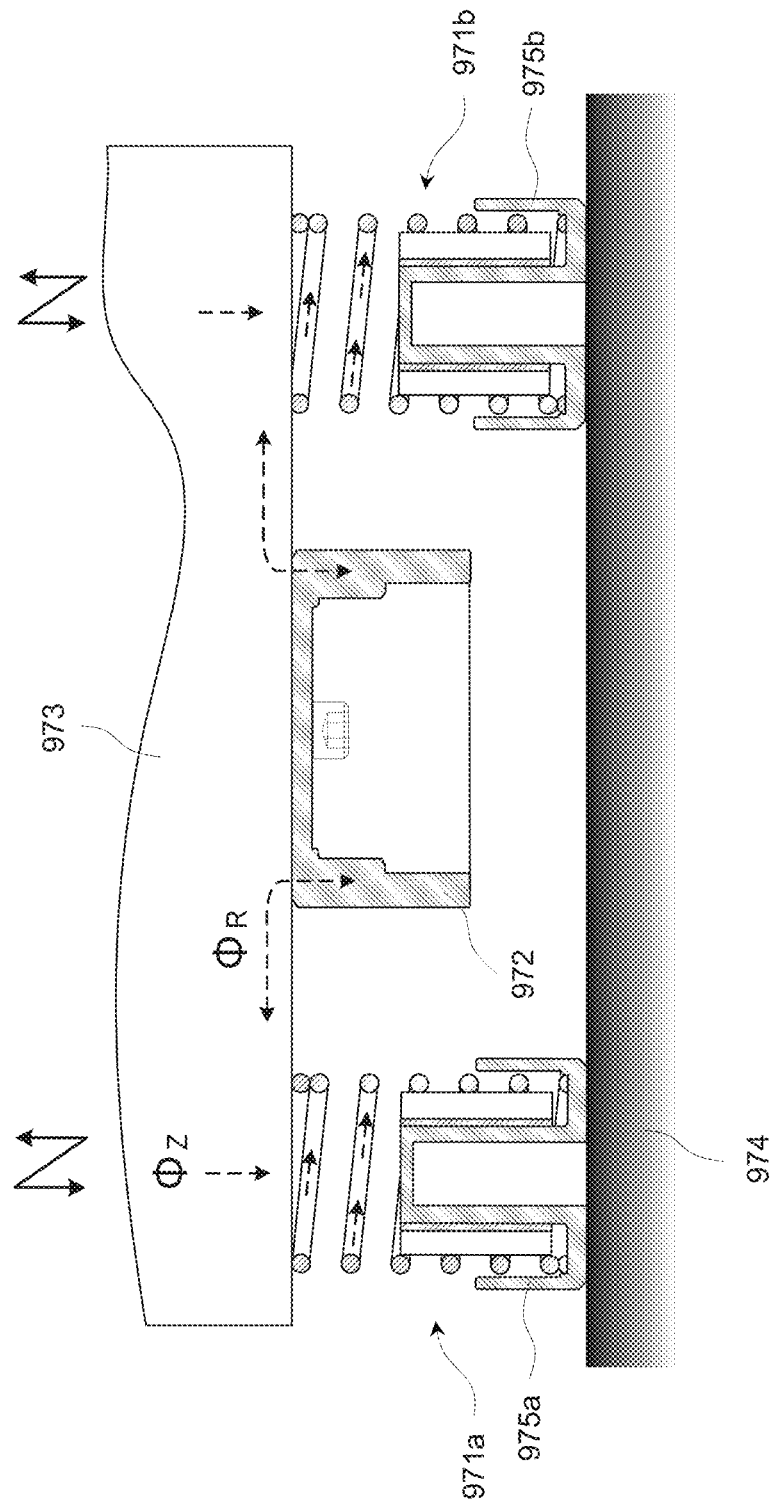
FIG. 49 is a front cross-sectional view in the case where an audio device is mounted with a resonant member and elastic members of an insulator for audio being separated from each other.

In any of the embodiments of the present invention, described is the example where the elastic member (coil spring) and the resonant member are coaxially arranged. However, even in the case where both are separately arranged, the effects that the present invention can obtain have no problem. In FIG. 49, Reference numerals 971*a* and 971*b* represent elastic support parts, 972 a resonant member, 973 an audio device (upper support member), 974 a floor surface, and 975*a* and 975*b* lower support members. Even in this case, vibration of the resonant member is superimposed on main vibration propagated from the audio device toward the elastic members.

In each of the embodiments, as the elastic member, the spring coil of which an outside diameter is uniform in an axial direction is used. If a cross-sectionally rectangular-shaped coil is used to make a height of the spring coil smaller than an outside diameter, lateral stiffness can be increased. The elastic member applicable to the insulator of the present invention is not limited to this. It is only necessary to select, for example, a conical coil spring, disc spring, structure in which the disc springs are stacked in a multistage manner, volute spring, ring spring, spiral spring, flat spring, laminated leaf spring, U-shaped spring, or the like in consideration of a shape, size, and the like required as the insulator for audio. In the present invention, these members are collectively referred to as mechanical springs.

In each of the embodiments, in order to prevent the surging phenomenon of the spring coil, the plurality of viscoelastic pieces that are protruded with extending from the cylindrical-shaped tubular part in the radial direction are used. The number of protruding viscoelastic pieces is, in the embodiments, eight at intervals of 45°; however, the number may be, without limitation, eight or less, or eight or more. Also, the effect as the "sound tube" is reduced for the after-mentioned reason; however, without use of the blade-like viscoelastic pieces, a structure in which a columnar viscoelastic member is pressed into the spring coil is also possible. Alternatively, a structure in which a thin plate-shaped viscoelastic member is brought into close contact with an inner surface of the spring coil is also possible. Still alternatively, one in which a material for the spring coil is covered with a viscoelastic material may be used. Note that the viscoelastic member is not limited to any of the above-described members, but may be formed of a material like low resilience rubber that has low elasticity but has resilience for resuming an original shape. Alternatively, a configuration in which a spring is immersed in liquid that has been used as surging prevention measures is also possible. Still alternatively, a structure that supports a lower end part of the spring with a single-stage or multistage spike to reduce a rebound of a shock wave propagated along the coil wire is also possible.

Regarding the reason why the spring coil used for the insulator in each of the embodiments plays a role as the "sound tube" that passes the high frequency vibration, a shape of the surging prevention member (4 in FIG. 1) largely contributes. As described above, in the first embodiment (FIG. 1*a*), the surging prevention member does not have structure in which a viscoelastic member is in completely close contact with the inner circumferential surface of the spring coil 5, but is configured such that the plurality of viscoelastic pieces 4*b* that are protruded with extending in the radial direction are in partial contact with the inner circumferential surface of the spring coil 5. For this reason, in the high frequency range where a wavelength is shorter, a probability of avoiding an influence of a vibration damping action by the viscoelastic pieces 4*b* to pass is increased. Also, in the case of the vibration in the high frequency range where a wavelength is shorter, an elastic wave causes partial expansion and contraction in an axial direction of the spring coil 5. Given that a tilt angle of the spring coil is $\Theta$, an axial component ($\sin \Theta$) that deforms the viscoelastic pieces contributes to the damping action; however, a circumferential component that only slides on inner surfaces of the viscoelastic pieces does not contribute to the vibration damping. Regarding the function of the spring coil as the "sound tube" that passes the high frequency vibration, a shape of each of the viscoelastic pieces 4*b* largely contributes.

It is assumed that the vibration generation prevention means adapted to suppress the high-order resonance phenomenon in the present invention includes a mechanism structure that generates only simple harmonic motion (primary natural frequency) determined only by a mass and a lumped spring constant. For example, a structure that pulls a U-shaped leaf spring with a wire, or another structure can also be applied. Alternatively, it is only necessary to provide resonance prevention means according to each of the various spring configurations.

The "different configuration hard material insulator" that is combined with the present invention insulator in each of the embodiments herein is as follows. That is, an insulator made of a single material such as a copper alloy, magnesium, natural quartz crystal, titanium, quartz, rosewood material, Japanese Zelkova material, coral, marble, high-carbon cast iron, or tempered glass is possible, or a multilayered structure insulator formed by combining such materials is also possible. Alternatively, a cone-shaped or sphere-shaped spike is also possible, and a structure formed by combining such spikes in series in a multistage manner (e.g., four to five stages) can also be applied as the different configuration hard material insulator.

Figure 50:
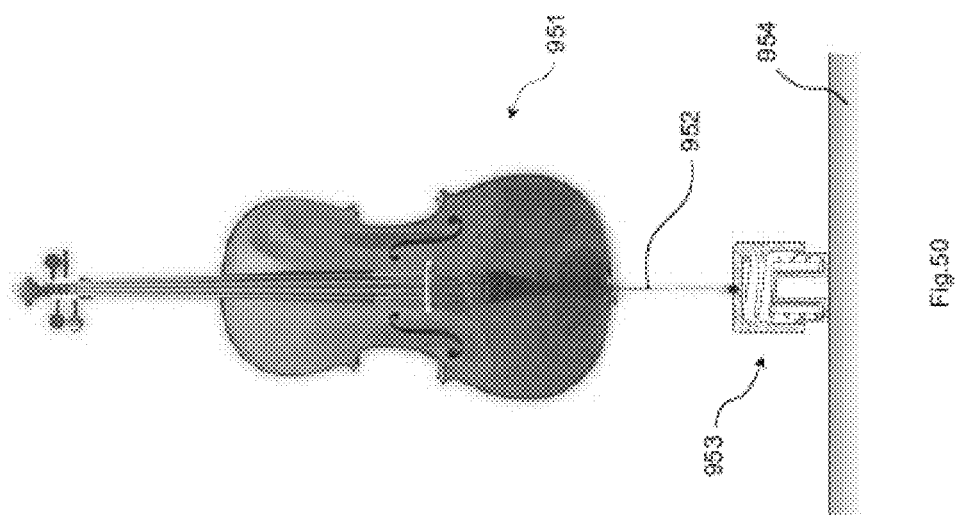
FIG. 50 is a diagram in the case where the insulator for audio of the present invention is applied to support an end pin of a cello.

In each of the embodiments, described is the case where the present invention insulator is applied to the speaker; however, the present invention insulator can be applied to any of a CD player, an analog player, a preamplifier, a power amplifier, and a personal computer for PC audio that are audio devices, various music instruments (e.g., acoustic instruments), piano, and the like, and the same effects can be obtained. Alternatively, by using the present invention insulator for a music instrument that is used with being placed on a floor surface, e.g., for a tip of an end pin of a cello or a contrabass (double bass), as a support for the music instrument, sound of the music instrument is significantly improved. In FIG. 50, reference numeral 951 represents a cello, 952 represents an end pin, 953 represents the present invention insulator, and 954 represents a floor surface. In this case, it is only necessary to form a concave part, which receives a tip of the end pin, on an upper surface (e.g., in FIG. 1, on the load support part 8 of the upper sleeve 1) of the insulator, or attach a spacer formed with a concave part to the load support part 8. The effect of improving quality of reproduced sound by reducing vibration due to mutual interference between an audio device and a placement surface and the wind-bell effect of improving acoustic characteristics in the high frequency range hold even in the case where the audio device is replaced by any of the above music instruments. Accordingly, "for audio" as part of the title of the present invention should be broadly interpreted, and such music instruments are also included within the scope of the application.

Also, in the embodiments, described are the cases where the insulators are all vertically arranged on the floor surfaces, respectively; however, the present invention can be applied even in the case where a posture of the insulator is made horizontal, and an audio device is horizontally arranged on, for example, a wall surface. Alternatively, the present invention can also be applied to a speaker of a type hung from a ceiling. For example, in the case of modifying and applying the insulator structure of the first embodiment, it is only necessary to hang the lower sleeve 2 side from a ceiling in a state where the load support part 8 is fixed to an upper surface of the speaker, and the spring coil 5 is completely fixed to the upper and lower sleeves.

[4] Speaker Preview Experiment on Insulator for Audio According to the Present Invention The insulator (FIG. 1) in the first embodiment was used to make the preview experiment with the resonant members having different materials (trial parts A to C listed in Table 4) being replaced by one another. The preview experiment in this section is also intended to examine the hypothesis (ii) on the wind-bell effect in Section [1-2]. An applied speaker is an electrostatic speaker (mass m=41 kg) that has an established reputation as a speaker for a monitor. The insulator parts other than the upper sleeve 1 (resonant member) and the lower sleeve 2 are all in common use, and the eigenvalue determined by the spring stiffness $K_Z$ (=8.13 N/mm) of the spring coil 5 and the mass m is $f_0$=4.49 Hz. As illustrated in FIG. 2, the insulators were arranged at the four corners of the bottom surface of the speaker to support the speaker. Evaluation results in Table 6 are ones summarized with an agreement from seven listeners joining the preview experiment. Preview experimental results in the case where the resonant member is absent, i.e., in the case where the upper sleeve 1 is removed to directly support the speaker with the spring coil 5, and those in the case where the insulator is not attached are listed in the table with being compared with each other. In Table 6, even in the case where the resonant member is not attached, on the basis of the frequency characteristics of the secondary vibration system, which are determined by the mass of the mounted object and the spring stiffness, the vibration blocking action at the resonant frequency $f_0$ or more is obtained. Accordingly, as compared with the case where the insulator main body is not attached (all x), remarkably superior characteristics are seen in each item. Note that to simplify the evaluation, superiority or inferiority is evaluated relative to the case where the resonant member is not attached (all A). The discussion of the results is as follows:

(i) As compared with the case where the resonant member is not attached, evaluations of the trial parts A to C are all improved in almost all items.

(ii) In the case of the trial part A of which the wind-bell time constant T is largest, evaluations are highest in all items. The trial part A is made of a copper alloy used as a wind-bell material. As lingering sound becomes longer, a wind-bell has a lower decay property, and easily excites more resonance peaks in the high frequency range. Such wind-bell characteristics of the trial part A is considered to contribute to the improvement in acoustic characteristics.

(iii) However, even in the case of the trial part C of which the wind-bell time constant T is smallest, in the items of the sense of depth, resolution, sense of transparency, transient characteristics, and the like, as compared with the case where the resonant member is absent, higher evaluations are obtained. As the reason for this, it can be considered that regardless of the length of lingering sound of a wind-bell, resonance peaks present in the high frequency range to some extent contribute to the improvement of the sense of localization, resolution, and the like of a sound image in stereo reproduction.

(iv) In the case of the trial part A, in the item of a "sound atmosphere" that is difficult to represent as a physical property, evaluation is remarkably high. From comparisons among the graphs in FIGS. 12 to 15, in the trial part A, the beats (fluctuation) are observed in the envelope of the decay curve. In the trial parts B and C, no beat is observed. It is considered that the beats bring comfortableness (sense of mellifluousness, sense of fruitfulness) of reproduced sound.

TABLE 6

| Evaluation item | Trial part with resonant member (Table 4) | | | Without attachment of resonant member | Without attachment of insulator |
| --- | --- | --- | --- | --- | --- |
| | A | B | C | | |
| Sense of depth | ◎ | ◎-○ | ○ | Δ | X |
| Resolution | ◎ | ○ | ○ | Δ | X |
| Sense of transparency | ◎ | ○ | ○ | Δ | X |
| Powerfulness in low range | ◎-○ | ○ | Δ | Δ | X |
| Transient characteristics | ◎ | ○ | Δ | Δ | X |
| Sound atmosphere | ◉ | ○ | ○ | Δ | X |
| Comprehensive evaluation | ◎ | ○ | ○-Δ | Δ | X |

In Table 6, details of the respective evaluation items are as follows:

(i) Sense of depth (extensity, sense of sound field, sense of stereophony)
Magnificent orchestra space is separated from the speaker and deeply spread behind the speaker.
(ii) Resolution (sense of localization, sense of focus)
A sense of existence of each music instrument can be felt as if the music instrument is visually seen, and a sound image can be clearly focused on.
(iii) Sense of transparency (S/N ratio)
Multi-tiered instrument sounds are not mixed but separated. A high range is delicate and has a small sense of distortion.
(iv) Powerfulness in low range (damping)
A low range is tightened, and low range sounds of strings in an orchestra, bass sounds in jazz can be clearly listened to with being localized.
(v) Transient characteristics
Senses of steep attach and decay (sound disappears steeply) can be obtained in silence.
(vi) Sound atmosphere
In an atmosphere having a sense of mellifluousness, not the details of sound but the whole of the music can be comfortably listened to.

Industrial Applicability

Differently from the conventional hard material insulator that is made to have various high frequency characteristics by using quartz, titanium, natural quartz crystal, marble, or the like as a difficult-to-process material, or stacking such materials, the insulator of the present invention using the wind-bell effect can dramatically improve acoustic characteristics and tune sound by selecting a single material and a wind-bell shape. The vibration characteristics of the present invention insulator, and main acoustic effects brought by the vibration characteristics are substantially summarized as follows:

(1) Many resonance modes of resonant member in high frequency range: improvement of sense of localization (sense of focus) and resolution of sound image
(2) Lingering sound of resonant member: improvement of sense of spatial extent (sense of depth, sense of presence)
(3) Beats (fluctuation) of resonant member: improvement of comfortableness, sense of mellifluousness, and sense of fruitfulness
(4) Vibration blocking characteristics in low frequency range: Makes above (1) to (3) more effective Differently from the conventional insulator for audio that must be dependent on developer's feelings and has been developed by trial and error, in the present invention insulator, the above (1) to (4) can be theoretically designed. Also, the effects above are remarkable.

The invention claimed is:

1. An insulator for audio comprising:
an elastic member that is held between an upper support member and a lower support member and supports a load of an audio device; and
a resonant member formed as the upper support member or separately therefrom that has a plurality of resonance points in a frequency range that is higher than a resonance frequency that is defined by a mass of the audio device and a static stiffness of the elastic member, wherein
the resonant member is arranged in parallel with the elastic member such that, given that vibration propagated from the audio device toward the elastic member is main vibration, vibration of the resonant member is superimposed on the main vibration.

2. The insulator for audio according to claim 1, wherein the resonant member is configured to be a substantially tubular-shaped member of which one end is a fixed end and the other end is a free end.

3. The insulator for audio according to claim 1, wherein the elastic member is a mechanical spring, air, or a magnetic body used for a floating type insulator.

4. The insulator for audio according to claim 1, wherein the elastic member is configured to include a mechanical spring, and also configured to include a surging prevention member that keeps a state of being in close contact with the mechanical spring.

5. The insulator for audio according to claim 1, comprising:
a fixing part that grips an end part of the elastic member, and
a tubular sleeve that grips an other end part of the elastic member and contains an inside part of the elastic member, and has a shape substantially tubularly extending toward the fixing part, wherein
the tubular sleeve and the fixing part are placed so as to be fitted into each other with a narrow radial direction gap being provided between the tubular sleeve and the fixing part.

6. The insulator for audio according to claim 5, wherein the gap is set so as to meet δ≤1.0 mm.

7. The insulator for audio according to claim 1, comprising a load support part that supports the load of the audio device, wherein
a concave part that contains a whole or part of a spike or a roller for movement attached to the audio device is formed on the load support part.

8. The insulator for audio according to claim 1, wherein given that impulse excitation is applied to a single body of the resonant member with a central part of the single body of the resonant member being fixed, and a time period during which an envelope of a sound pressure waveform obtained from a sound collecting microphone arranged near a wind-bell member decays to 36.8% of an initial value is a wind-bell time constant T, wherein T>0.05 seconds.

9. The insulator for audio according to claim 1, wherein a material and a shape of the resonant member are set such that with a central part of a single body of the resonant member being fixed, a fundamental tone frequency of the resonant member meets $f_1 > 1500$ Hz.

10. The insulator for audio according to claim 1, wherein with a central part of a single body of the resonant member being fixed, beats are superimposed on a decay curve of an impulse response of the resonant member.

11. The insulator for audio according to claim 3, wherein given that a resonant frequency due to a rigid body mode determined by a spring stiffness of the elastic member and a mass of the audio device mounted on the upper support member is $f_0$, and a lowest-order resonant frequency due to elastic deformation of the resonant member is $f_1$, vibration characteristics of the upper support member appearing when the upper support member is excited have no resonance point in a range between the resonant frequencies $f_0$ and $f_1$.

12. The insulator for audio according to claim 1, wherein: the upper support member is made to have a role as a spike fixing part; the lower support member is made to have a role as a spike receiving part; and the elastic member is made to have a role as a spike supporting part.

13. The insulator for audio according to claim 1, further comprising
a control device that is configured to include: an actuator provided between the audio device and a base; and a sensor that detects a displacement and/or a vibration state of the audio device, and performs active control of the displacement and/or the vibration state of the audio device on a basis of information from the sensor so as to suppress vibration of the audio device itself, the vibration being generated by a vibration excitation source that the audio device itself has.

14. The insulator for audio according to claim 1, wherein on an outer circumferential surface or an inner circumferential surface of the resonant member, at least one groove in a longitudinal direction, a circumferential direction, or a tilted direction, or a concavo-convex surface is formed.

15. The insulator for audio according to claim 1, wherein the resonant member is formed of a material having an intrinsic acoustic impedance of $10^7$ Ns/m$^3$ or more.

16. The insulator for audio according to claim 1, wherein a vibration propagation path from the upper support member to the lower support member is formed of a material having an intrinsic acoustic impedance of $10^7$ Ns/m$^3$ or more.

17. An audio system comprising:
an insulator for audio including an elastic member that is held between an upper support member and a lower support member and supports a load of an audio device, and a resonant member formed as the upper support member or separately therefrom that has a plurality of resonance points in a frequency range that is higher than a resonance frequency that is defined by a mass of the audio device and a static stiffness of the elastic member, wherein the resonant member is arranged in parallel with the elastic member such that, given that vibration propagated from the audio device toward the elastic member is main vibration, vibration of the resonant member is superimposed on the main vibration; and
an audio device supported by the insulator for audio.

18. The audio system according to claim 17, further comprising
an auxiliary unit that is arranged in parallel with the insulator for audio and intended for placement stabilization of the audio device, wherein
a gap between a bottom surface of the audio device and a support part of the auxiliary unit can be set by height adjustment of the auxiliary unit so as to be able to suppress a tilt amount of the audio device.

19. A method for evaluating the insulator for audio including an elastic member that is held between an upper support member and a lower support member and supports a load of an audio device, and a resonant member that has a plurality of resonance points, wherein the resonant member is arranged in parallel with the elastic member such that, given that vibration propagated from the audio device toward the elastic member is main vibration, vibration of the resonant member is superimposed on the main vibration, the method comprising:
on a basis of wind bell characteristics including a length of lingering sound before vibration at a time of exciting a resonant member decays, beats included in a decay curve, and a resonance mode of the resonant member in a high frequency range, selecting the resonant member according to a music genre, characteristics of an audio device, or a listener's taste.

* * * * *